US009727423B2

(12) United States Patent
Dornquast et al.

(10) Patent No.: US 9,727,423 B2
(45) Date of Patent: Aug. 8, 2017

(54) SHARED FILE SYSTEM PREDICTIVE STORAGE TECHNIQUES

(71) Applicant: Code 42 Software, Inc., Minneapolis, MN (US)

(72) Inventors: Matthew Dornquast, Minneapolis, MN (US); Brian Bispala, Minneapolis, MN (US); Samuel Schroeder, Minneapolis, MN (US); Christopher Gwinn, Minneapolis, MN (US); Justin Grammens, St. Paul, MN (US); Thomas (Tony) Lindquist, Minneapolis, MN (US); Peter Lindquist, St. Paul, MN (US)

(73) Assignee: Code 42 Software, Inc., Minneapolis, MN (US)

( * ) Notice: Subject to any disclaimer, the term of this patent is extended or adjusted under 35 U.S.C. 154(b) by 89 days.

(21) Appl. No.: 14/587,142

(22) Filed: Dec. 31, 2014

(65) Prior Publication Data
US 2016/0092465 A1    Mar. 31, 2016

Related U.S. Application Data

(60) Provisional application No. 62/057,492, filed on Sep. 30, 2014.

(51) Int. Cl.
*G06N 5/00*   (2006.01)
*G06F 1/00*   (2006.01)
*G06F 11/14*  (2006.01)
*G06F 17/30*  (2006.01)
(Continued)

(52) U.S. Cl.
CPC ...... *G06F 11/1453* (2013.01); *G06F 11/1435* (2013.01); *G06F 11/1451* (2013.01);
(Continued)

(58) Field of Classification Search
CPC ......... G06N 7/005; G06Q 50/01; H04L 51/32
See application file for complete search history.

(56) References Cited

U.S. PATENT DOCUMENTS 5,771,354 A   6/1998  Crawford
7,672,979 B1  3/2010  Appellof et al.
(Continued)

OTHER PUBLICATIONS

"U.S. Appl. No. 14/587,168, Notice of Allowance mailed Mar. 23, 2015", 17 pgs.

*Primary Examiner* — Stanley K Hill
*Assistant Examiner* — Kalpana Bharadwaj
(74) *Attorney, Agent, or Firm* — Schwegman Lundberg & Woessner, P.A.

(57) ABSTRACT

Disclosed in some examples are predictive storage techniques for use in a distributed data system. The predictive storage techniques may be used to manage locally stored elements of a shared data collection, such as the storage of files on nodes of the distributed data system that are limited in local storage space. The predictive storage techniques may achieve a balance between consumption of local resources and timely access of important elements in the shared data collection. For example, the predictive storage techniques may be used for keeping or pre-caching certain items of a collection that are determined as likely to be used in local storage for convenient access, and allowing access the remaining items on request over a network.

21 Claims, 35 Drawing Sheets

(51) Int. Cl.
*G06F 21/55* (2013.01)
*G06F 21/60* (2013.01)
*G06N 99/00* (2010.01)
*H04L 29/08* (2006.01)
*H04L 12/911* (2013.01)
*H04L 29/06* (2006.01)

(52) U.S. Cl.
CPC ...... *G06F 11/1464* (2013.01); *G06F 17/3023* (2013.01); *G06F 17/30156* (2013.01); *G06F 17/30174* (2013.01); *G06F 17/30194* (2013.01); *G06F 17/30203* (2013.01); *G06F 17/30215* (2013.01); *G06F 17/30356* (2013.01); *G06F 17/30581* (2013.01); *G06F 21/552* (2013.01); *G06F 21/604* (2013.01); *G06N 99/005* (2013.01); *H04L 47/821* (2013.01); *H04L 67/1072* (2013.01); *H04L 67/22* (2013.01); *G06F 2221/2111* (2013.01); *H04L 63/0428* (2013.01)

(56) References Cited

U.S. PATENT DOCUMENTS

| | | |
|---|---|---|
| 8,352,430 B1 | 1/2013 | Myhill et al. |
| 9,053,124 B1 | 6/2015 | Dornquast et al. |
| 2005/0021950 A1 | 1/2005 | Rothbarth et al. |
| 2007/0027936 A1 | 2/2007 | Stakutis et al. |
| 2011/0246427 A1 | 10/2011 | Modak et al. |
| 2012/0226776 A1 | 9/2012 | Keebler et al. |
| 2013/0124458 A1 | 5/2013 | Barreto et al. |
| 2014/0244580 A1* | 8/2014 | Eisner ............... G06F 17/30082 707/623 |
| 2014/0289868 A1 | 9/2014 | Byrne et al. |
| 2014/0337482 A1 | 11/2014 | Houston et al. |
| 2015/0046467 A1* | 2/2015 | Hummel ........... G06F 17/30867 707/748 |
| 2015/0363443 A1* | 12/2015 | Kaushik ........... G06F 17/30315 707/723 |

* cited by examiner

SHARED FILE SYSTEM PREDICTIVE STORAGE TECHNIQUES

CLAIM OF PRIORITY

This patent application claims the benefit of priority, under 35 U.S.C. §119, to U.S. Provisional Patent Application Ser. No. 62/057,492, titled "Data Distribution System," filed on Sep. 30, 2014, which is hereby incorporated by reference herein in its entirety.

BACKGROUND

Data Distribution Mechanisms keep file system elements such as files and directories of computer systems synchronized across multiple nodes. Thus, for example, if a file is modified on a first device, those changes may be propagated to a second node. Typically, this synchronization happens across a network, such as a Local Area Network (LAN), a Wide Area Network (WAN)—such as the Internet, a Cellular Network, or a combination of networks. The synchronization may be across nodes owned by a common user as well as across nodes owned by different users.

BRIEF DESCRIPTION OF DRAWINGS

Some embodiments are illustrated by way of example and not limitation in the figures of the accompanying drawings.

DETAILED DESCRIPTION

Figure 1:
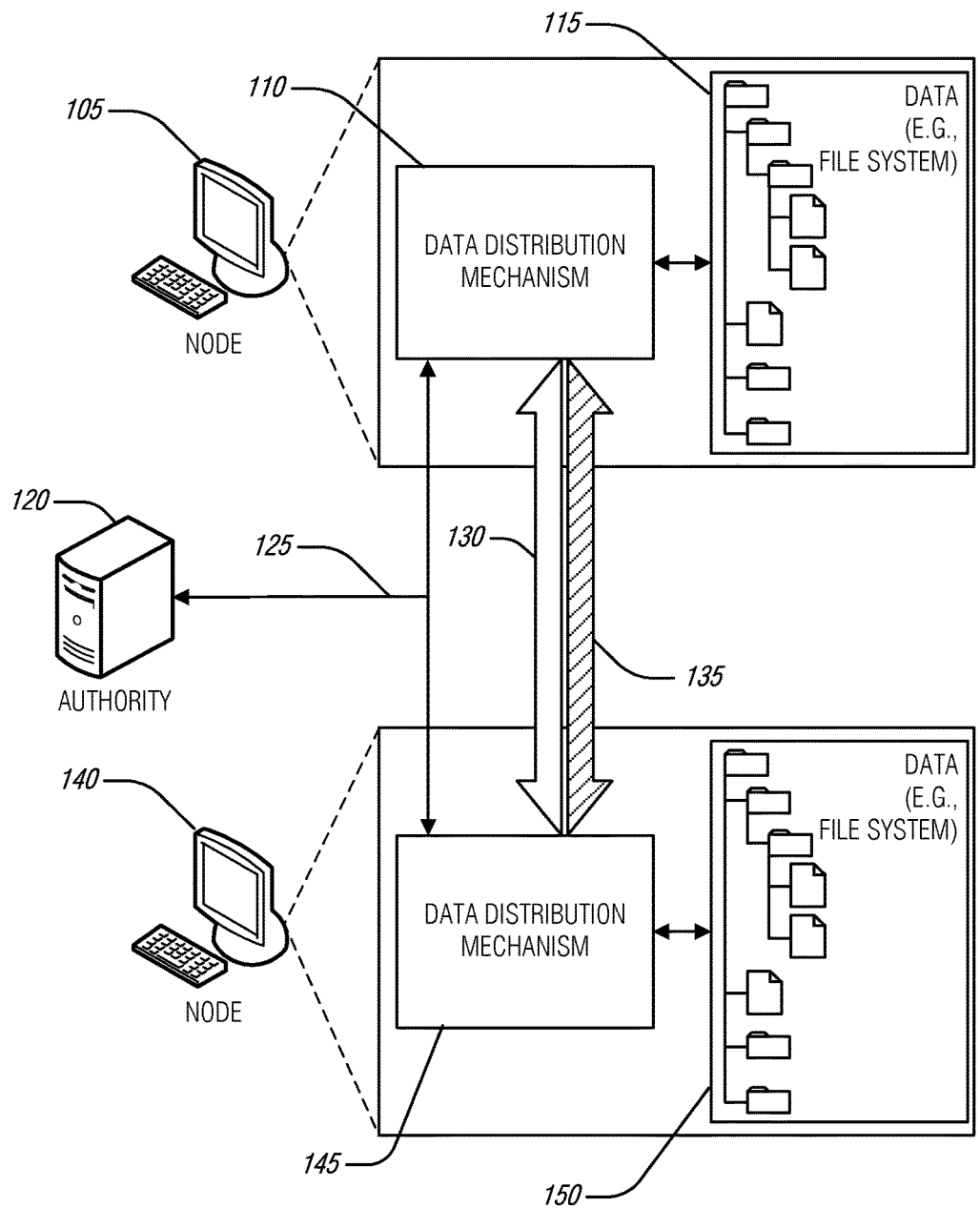
FIG. 1 is a block diagram of an example of a system implementing a data distribution mechanism, according to an example.

FIG. 1 is a block diagram of an example of a system 100 implementing a data distribution mechanism. The system 100 can include a plurality of nodes (e.g., Nodes 105 and 140) and an Authority 120. Each of Node 105, Node 140, or the Authority 120 are implemented on a machine (e.g., computing device, cluster of computing devices, etc.), such as that described below with respect to FIG. 35. As further described herein, this data distribution mechanism may be used in connection with data synchronization, sharing, backup, archiving, and versioning operations for a plurality of connected machines on behalf of one or a plurality of users.

The Node 105 can include a data distribution mechanism 110 and a data store 115. The data store 115 includes data corresponding to file system elements. As used herein, a file system element is one of a directory (e.g., folder) or a file. File system elements can include meta data and content. For example, in the case of a directory, the meta data can include a name, path, creation date or time, modification date or time, deletion date or time, permissions, corresponding markers (e.g., icons), etc., and the content can include the files or directories contained within the directory. In the case of a file, the meta data can include all of the meta data described above for a directory and also include application affiliation (e.g., what application created the file, what application can read the file, etc.), and the content can include the bits of the file. Examples of the data store 115 can include a file system, a database, or other storage mechanisms in which file element content and file element meta data can be stored.

The data distribution mechanism 110 can be coupled to or integrated with the data store 115 when in operation. In an example, the communications between the data distribution mechanism 110 and the data store 115 can include notification of file system element events (e.g., create, read, write, delete, move, rename, etc.). In an example, this notification can be effectuated by monitoring file system events. For example, changes made by applications on the node 105 to data on the data store 115 causes a notification to be sent by a file system of data store 115 to the data distribution mechanism 110. In an example, the data distribution mechanism may monitor to detect changes in the data store 115 made by applications over time (e.g., comparing blocks of file A at time T1 with the blocks of file A at time T2).

In the previous examples, changes are detected to data on the data store 115 by interfacing with the file system. In other examples, applications may directly request file system element actions (e.g., create, read, write, move, rename, etc.) from the data distribution mechanism 110. In these examples, the coupling or integration with the data distribution mechanism can include access to a storage medium underlying the data store 115. For example, the data store 115 can be a file system in which the data is stored to a hard disk drive. In this example, the data distribution mechanism 110 can analyze the blocks stored on the hard drive without using the file system.

The data distribution mechanism 110 can also be coupled to another Node 140, for example, to the data distribution mechanism 145 on the Node 140, when in operation. In an example, the coupling or integration with the data distribution mechanism can occur via any available network connection, such as a wired or wireless connection. In an example, the coupling or integration with the data distribution mechanism further includes an encrypted tunnel operating over a physical link between the Node 105 and the Node 140. The encrypted tunnel can include use of asymmetric or symmetric encryption, for example using 256-bit AES transport security. In the example of symmetric encryption, the key can be shared between the Node 105 and the Node 140 via, for example, the Authority 120. In the example of asymmetric encryption, standard public key cryptographic techniques can be used. As used herein, the physical link can include physical layers, media access layers, or application layers below the application layer for the data distribution mechanism. Thus, a Transmission Control Protocol/Internet Protocol (TCP/IP) connection over Ethernet can be considered a physical link.

In an example, the coupling can include two logical channels, a data channel 130 and an event channel 135, operating over the same physical link between the two Nodes 105 and 140. In an example, the data channel 130 and the event channel 135 can operate over different and distinct physical links. For example, the event channel 135 may be better served by an always-on physical link whereas the data channel 130 may be better served by a less expensive (e.g., per byte transferred) or faster link. Thus, in the example of a mobile device, the event channel 135 can use a cellular radio physical link while the data channel 130 can be restricted to a local area network physical link.

The event channel 135 can pass file system element events from the first data distribution mechanism 110 to the second data distribution mechanism 145 or vice versa. File system element events can include any one or more of the following: creation, modification, deletion, or movement (e.g., moving a file from one file system location to another). In an example, only a portion of the data store 115 can be managed by the data distribution mechanism 110 for distribution to Node 140. In this example, file system element events can include the inclusion or exclusion of a file system element from the portion of the data store 115.

As used throughout, this portion of the data store 115 that is managed by the data distribution mechanism 110 for distribution to other nodes is known as a collection (e.g., file system element collection or "plan"). In an example, a collection can be one of a plurality of collection types. Example collection types can include a multi-user collection, a personal collection, or a backup collection. A multi-user collection is a collection of file system elements that may be shared and synchronized between different users of the data distribution mechanism. A personal collection may be a collection of file system elements that may be restricted to a single user of the data distribution mechanism but that may be shared across file distribution mechanisms operated by the single user and executing on different nodes. A backup collection may be a collection of file system elements that may be backed up to versioned storage by the data distribution mechanism. For brevity, the examples discussed below use the term "collection" to refer to a multi-user collection unless otherwise noted.

In an example, the Node 105 can include a plurality of collections. In an example, the data distribution mechanism 110 can manage one or more collections from the plurality of collections. The respective collections of the plurality of collections managed by the data distribution mechanism 110 may be different collection types. Thus, for example, the data distribution mechanism 110 may simultaneously manage one or more multi-user collections, personal collections, and backup collections. In another example, the data distribution mechanism 110 manages a single collection from the plurality of collections. Thus, each of a plurality of data distribution mechanisms on the Node 105 respectively manages a single collection of the plurality of collections with data in the data store 115.

The event channel 135 can also pass non-file system element events between the two Nodes 105 and 140. Example non-file system element events can include requests to another node (e.g., the Node 140), lifecycle notifications (e.g., that Node 105 is up, going down, etc.), or other events corresponding to the data distribution mechanism 110 that are not directly tied to a file system element. In an example, events can be organized on the Nodes 105 and 140 as a stream, or collection of events. In an example, the event channel 135 can be used to synchronize event streams between the two Nodes 105 and 140. In an example, the event channel 135 is specific to a collection. That is, there is a separate event channel 135 for each collection in examples where the Node 105 includes a plurality of collections. In this example, all events on the event channel 135 correspond to the collection without the need to specifically label each event with a collection affiliation (e.g., to which collection an event pertains). In an example, the event channel 135 is shared by a plurality of collections. In this example, the events can be marked with the collection to which the event applies. In an example, an event can apply to more than one collection and thus can include a list of collections to which the event applies.

The data channel 130 can pass data between the Nodes 105 and 140 not passed by the event channel. For example, the data channel 130 can pass block data to be stored in a data store (e.g., data stores 115 or 150), but the data channel 130 does not pass event data used to manage or control data distribution activities for the collection via the data distribution mechanism. For example, a notification that a file has changed and what has changed on the file is event data, whereas the bits constituting the new material in the file are file system element data. Thus, the data distribution mechanism 110 can notify the data distribution mechanism 145 that a file X has been created in the data store 115 via the event channel 135. The data distribution mechanism 145 can receive this event and request the contents of the file X from the data distribution mechanism 110. The data distribution mechanism 110 can transfer the contents of the file X to the data distribution mechanism 145 via the data channel 130 and store the received contents in the data store 150. In an example, the data channel 130 can use different transfer characteristics than the event channel 135. For example, data transfer of file system elements may be less sensitive to latency but more sensitive to lost bandwidth due to signaling overhead. Thus, the data channel 130 may collate data into greater transmission packages than the event channel 135.

The Authority 120 can be coupled to the Nodes 105 and 140 when in operation. The coupling can be over any physical link, and can be encrypted, for example, as described above with respect to inter-node communication. In an example, the Nodes 105 and 140 can establish a bi-directional link to the Authority 120. Communication between the Authority 120 and the Nodes 105 and 140 occurs over the logical link 125. The logical link 125 can be implemented over one or more physical links.

The Authority 120 can manage parameters of the data distribution between the Nodes 105 and 140. The parameters can include which nodes are part of the data distribution, what users are part of the data distribution, user permissions, encryption standards, protocols, shared information (e.g., encryption keys), what data is distributed, etc. The Authority 120 can manage these parameters by providing interfaces to create, update, and delete these parameters. In an example, the interfaces can include application programming interfaces (APIs). Thus, the Authority 120 is responsible for provisioning members of the collection. In an example, the interfaces can include user interfaces.

The Authority 120 can maintain one or more data structures to store and manage the data distribution parameters. The Authority 120 can communicate a subset of the data distribution parameters to the Nodes 105 and 140 to permit those nodes to participate in the data distribution. As described above, a collection is a portion of data in a data store (e.g., the data store 115) that is distributed. In this example, the data distribution parameters are known as a collection schema (e.g., plan). The collection schema includes parameters that define the file system elements in the collection that are to be distributed, as well as management information for the data distribution. In an example, all collection schema changes are handled by the Authority 120. For example, if a user adds or associates a file system element to a collection, a request can be made from the data distribution mechanism 110 to the Authority 120 to add the file system element to the collection. The Authority 120 can modify the corresponding collection schema to include the file system element. The Authority 120 can communicate to the data distribution mechanisms 110 and 145 that the file system element is now part of the collection. The data distribution mechanism 145 can request, for example via the event channel 135, the meta data or content of the new file system element from the data distribution mechanism 110. The request can be satisfied by a data communication from the data store 115 by data distribution mechanism 110 via the data channel 130.

Figure 2:
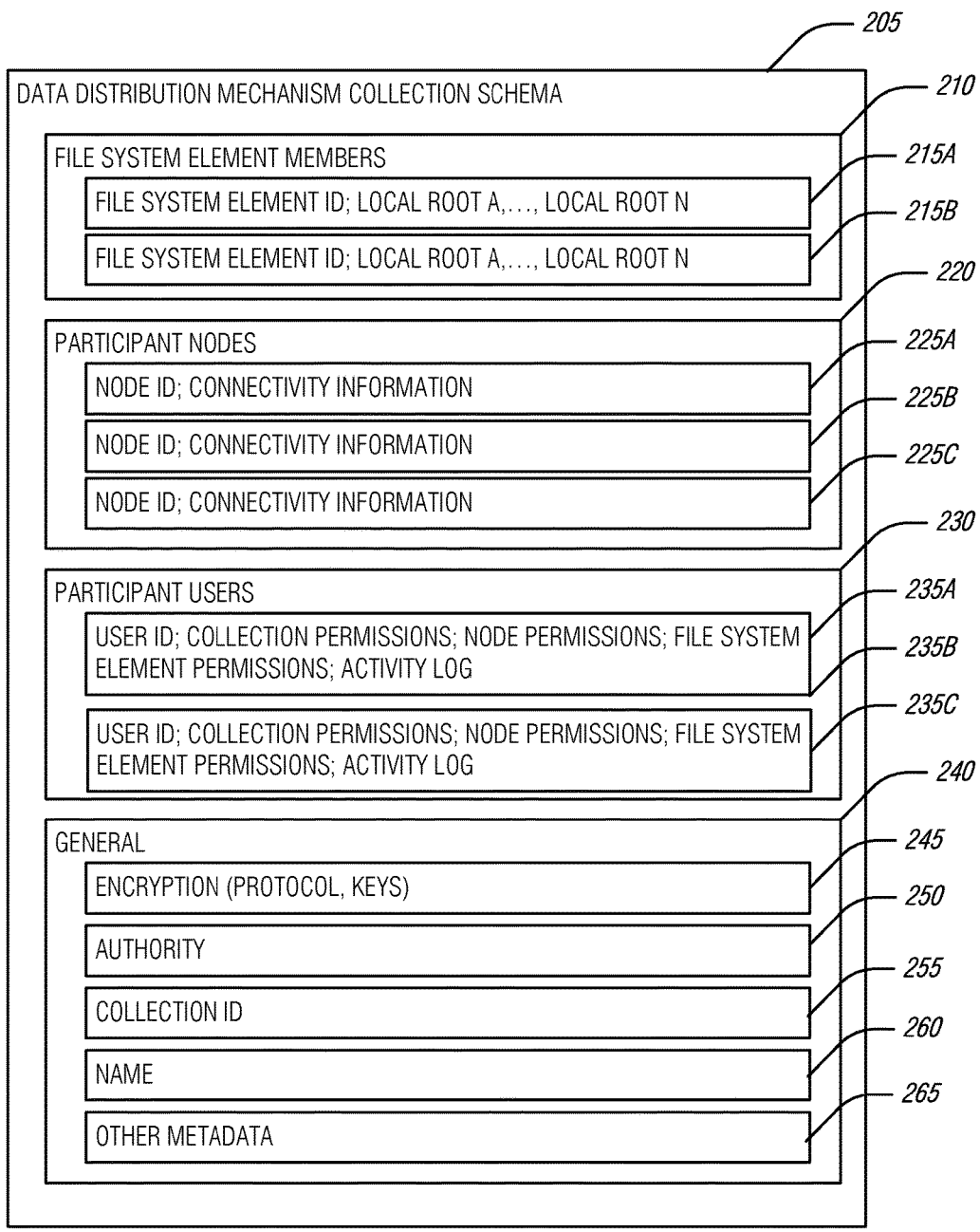
FIG. 2 is a relationship diagram of an example of a data distribution mechanism collection schema, according to an example.

FIG. 2 illustrates a relationship diagram 200 of a data distribution mechanism collection schema (e.g., collection schema or plan schema). The collection schema 205 can be a single data structure or a set of data structures with corresponding relationship data (e.g., a many-to-many table correlating a collection information 255 (such as a collection ID or "CID") with participant users 230). However, as used herein, the collection schema 205 provides a definition of the collection including file system element members 210, participant nodes 220 (e.g., collection devices), participant users 230, and general collection information 240.

The file system element members 210 include entries 215A, 215B corresponding to individual file system elements that are part of the collection. Each entry, such as entry 215A, corresponds to a single file system element and includes information pertaining to that file system element. For example, information in the entry 215A can include a file system element identification (e.g., FID), and a list of local root paths. Each local root path in the entry 215A corresponds to a file system path of the file system element on a particular node participating in the collection. In an example, an unspecified local root path can be overridden by to a default value for a local root directory. This default value can be referred to as a "landing zone." In an example, the default value for the local root path can be specific to a node type. In an example, node types can be differentiated by a device type (e.g., a mobile phone vs. a data center server) or an operating system (e.g., a tablet operating system vs. a sophisticated multi-user operating system). In an example, a collection can include a restriction on local root directories of the file system element members. In an example, the restriction specifies that the local root directory must be the landing zone.

In an example, the entry 215A can also include file system element meta data with respect to the collection. This file system element meta data may indicate information such as when the file system element was added to the collection, the user responsible adding the file system element, the last time the file system element was modified, the last time the file system element was distributed to this node or from this node, information on what version of multiple versions the file element is, etc.

The participant nodes 220 include entries 225A, 225B, 225C corresponding to individual nodes. Each entry, such as entry 225A, includes a node identification (e.g., NID) to uniquely identify one node from another. The entry 225A can also include connectivity information about the node. In an example, the connectivity information can include a routable address that can be used to reach the node of the entry 225A. For example, if the node can be connected to from the internet (e.g., if the node has an internet routable internet protocol (IP) address), that address can be included in the connectivity information. In an example, the connectivity information can include a connected status (e.g., node is connected, node is connected but unavailable, etc.). In an example, the connectivity information can include connection quality information, such as latency or bandwidth metrics, the operating state of the node (e.g., a laptop on battery power), or processing capabilities of the node (e.g., high available storage input-output (IO) of the node). In an example, the connectivity information can be a connectivity score supplied by the node of the entry 225A.

The participant users 230 include entries 235A, 235B corresponding to individual entities to which collection permissions can be assigned. Thus, participant users need not correspond to a specific person or even group of people, but can include permissions assigned to a third party data consumer (e.g., an auditing enterprise or a social network). In an example, the nodes in the collection of nodes 220 are assigned to the collection via a user entry. For example, when a node connects to an Authority, the node authenticates using credentials in a user entry. Thus, the permissions of the particular user entry (e.g., the user entry 235A) accrue to the node.

The user entry 235A can include a user identification (e.g., UID), collection permissions, node permissions, file system element permissions, or an activity log. The collection permissions are general to the collection as a whole, such as granting other users permissions to the collection, updating collection parameters, etc. Node permissions can be specific to nodes that are part of the collection but, for example, not under the control of the user. Node permissions can include permissions for operations such as a remote wipe (e.g., forcible delete of remote node), local file overwrite (e.g., forcing the overwriting of a file system element on the remote node), etc. The file system element permissions can include read or write permissions to individual file system element members 210. The activity log can store the activity of the user. In an example, the activity log is composed of event stream events attributable to the user. In this fashion, the participants in the collection can establish various permissions for the collection, including implementing permission categories of the collection such as guest (read-only permission to file system elements), contributor (read/write permission to file system elements), and administrator (complete control over file system elements and the collection). In an example, a user who invites another user can specify the permission level to provide to the another user.

The collection can also include general collection information (e.g., meta data) 240. The general collection information 240 serves as a repository for single items with applicability to the collection. For example, the collection data can be encrypted, such as with the use of 256-bit AES data encryption. The encryption data 245 can include keys (symmetric or asymmetric) to encrypt or decrypt the data. The encryption data 245 can include or otherwise indicate acceptable encryption protocols. The Authority entry 250 can be used when a central Authority manages the collection or the collection schema 205. The Authority entry 250 can identify or otherwise indicate the one or more machines housing an Authority. The collection identification 255 (e.g., CID) can uniquely identify the collection among other collections present on the nodes or managed by the Authority. The name entry 260 can provide a name for the collection. This can be useful to allow persons to identify collections without resorting to collection IDs. The general collection information 240 can also include one or more entries for other meta data 265. The other meta data can include such information as when the collection was created, who or what created the collection, whether the collection is active, inactive, archived, etc.

Figure 3:
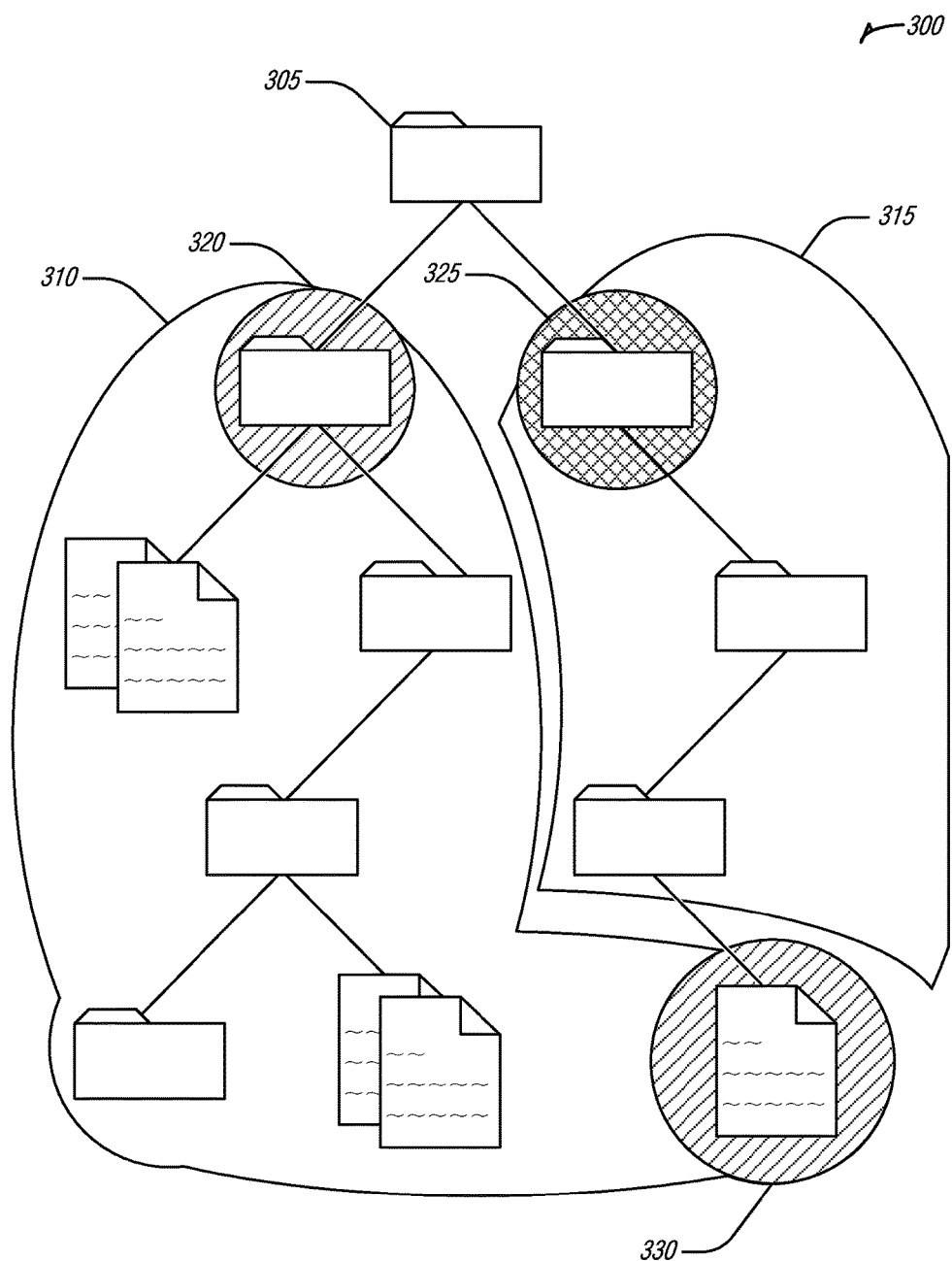
FIG. 3 is a diagram of an example of a file system with multiple collections, according to an example.

FIG. 3 illustrates an example of a hierarchy-based file system 300 with multiple collections, the collection 310 and the collection 315. The file system 300 is depicted as being hosted on a single node (e.g., the Node 105 described above with respect to FIG. 1). However, in clustered computing environments, the node can include a plurality of physical machines and storage devices that manage and store the file system 300 (e.g., a distributed or clustered file system). As illustrated, file system element 305 is the single root of the file system 300. The collection 310 includes two file system element members, file system element 320 and file system element 330. The contents of the file system element member 320 include the file system elements below the file system element member 320 in the file system 300 hierarchy as illustrated by the collection 310 outline excluding file system element member 330. The same is true of file system element member 325 of the collection 315. The inclusion of the file system element member 330 in the collection 310 removes the file system element member 330 from the contents of the file system element member 325 even though file system element member 330 is within the file system hierarchy rooted at file system element member 325. Accordingly, a file system hierarchy can define the contents of a file system element (e.g., a directory) until such hierarchy conflicts with the specific inclusion of a file system element as a file system element member of a different collection.

Figure 4:
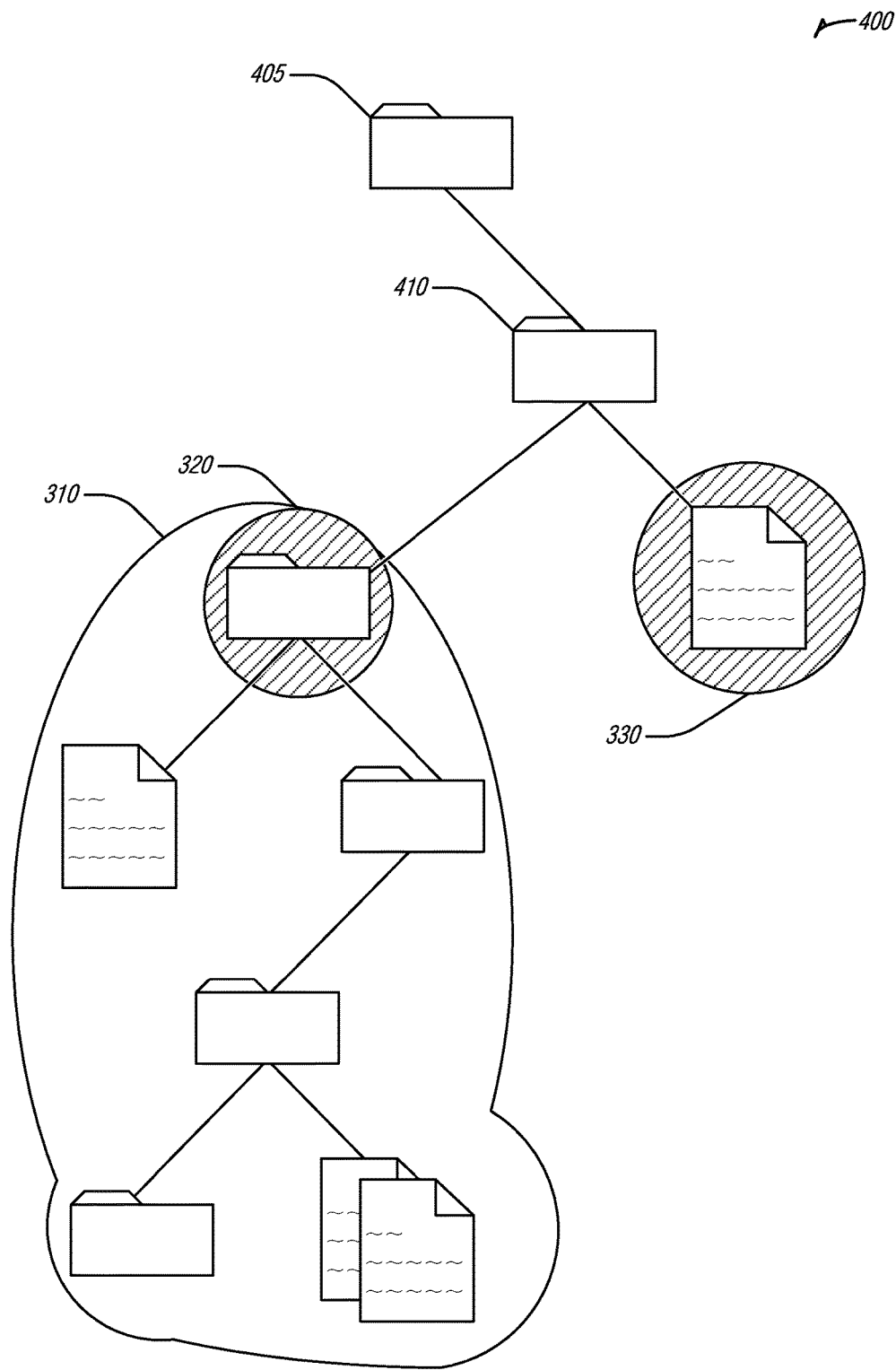
FIG. 4 is a diagram of an example of a file system including a collection from a different node, according to an example.

FIG. 4 illustrates an example of a file system 400 including the collection 310 (described previously in FIG. 3), the file system 400 being on a different node (e.g., the Node 140 described above with respect to FIG. 1) than the node hosting the file system 300 described with respect to FIG. 3. The file system element 410 is a root node for the collection 310 in the file system 400. This hierarchy, when contrasted to that of the file system 300, illustrates that the local root for a file system element member of a collection may vary between nodes. Further, the change in hierarchical position of the file system element member 330 between the file system 300 and the file system 400 illustrates the flexibility of having a local root node attribute that specifies the local root for each element in the collection for each node (e.g., see FIG. 2, 215A-215B) in the collection schema. The contents of the file system element members 320 has not changed, as illustrated in the preserved hierarchy of file system elements in the file system element 320 between the file system 300 and 400. Thus, file system element members of the presently described collections provide great flexibility in managing file system elements than maintaining a single hierarchy. Further, the file system element members of the presently described collections also relieve the system of the need for managing every file system element in a collection at the collection level.

While FIGS. 3 and 4 illustrate movement of a file system element from one root on a first node to another root on a second node using the local root data for a collection, a scenario may arise in which the local root data is out-of-sync with the collection. For example, a user can use file system tools on the node of FIG. 3 to move the file system element 320 to root other than root file system element 305 while the data distribution mechanism is unable to notice this change at the time (e.g., the data distribution mechanism was disabled or off). In this scenario, when the data distribution mechanism is able, it can verify the local root data for the node and determine that the file system element 320 is no longer present at the specified local root. The data distribution mechanism may then search for the file system element 320 and, if found, update the local root data to reflect the new local root for the file system element 320.

In an example, to aid the in the search, the file system element 320 can be tagged to allow it to be identified if found. For example, when the file system element is a directory, a file (e.g., a hidden file) can be placed in the directory that specifies the collection affiliation of the file system element 320. In an example, such as with file systems that permit labels, tags, or other meta data, the collection affiliation can be placed in such meta data. This technique can work equally well with both file and directory file system elements. In an example, specific file types can include flexible meta data that can accept the collection affiliation, thus, the collection affiliation can be placed in this meta data.

In an example, for identification purposes, the file system element can be assigned an identifier computed from the file system element itself. Thus, the identifier can be stored in a database of the data distribution mechanism, and each file system element checked can have its identifier computed and verified against the database. For example, a hash of the file meta data, contents, etc., can be used as an identifier for the file system element and stored in the database. Then, during the search of the file system, each encountered file system element can be similarly hashed and compared against the database records. If the hashes match, the local root data for that file system element can be updated to reflect its new location.

Figure 5A:
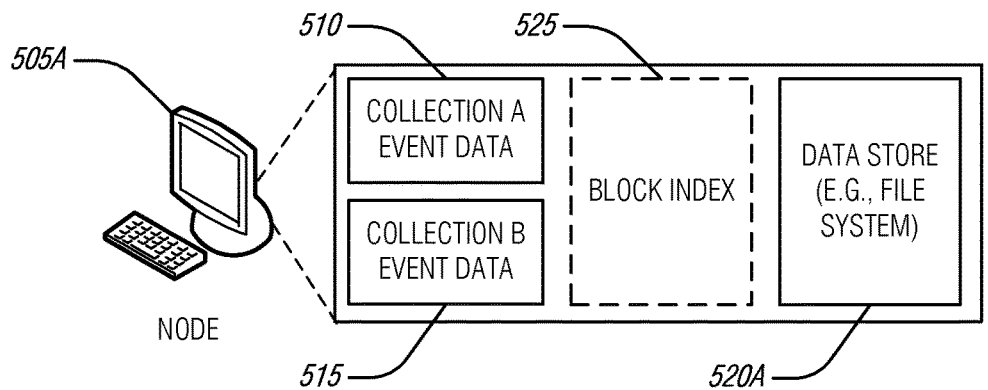
FIGS. 5A and 5B are block diagrams of examples of participant nodes, according to an example.

FIG. 5A illustrates an example of a participant Node 505A. The Node 505A can include both Collection A event data 510 and Collection B event data 515. That is, the Node 505A is a member of two collections and participates in the event stream of these collections. The Node 505A can also include a local data store 520A. In an example, the local data store 520A is a file system of the Node 505A. The local data store 520A can store the contents of file system elements that are part of one or both collections A or B.

In an example, the contents of file system elements are managed at a block level. That is, instead of managing the contents of file system elements as a single entity, the contents of file system elements may be divided into blocks for data distribution (and in some cases, data storage). In an example, the blocks are variable length. In an example, the Node 505A may include a block index 525 to manage the blocks independently from the file system elements of the collections. Individual block management may facilitate a reduction in data that needs to be transmitted on the data channel when transferring, for example, files between two nodes. For example, a first node may create an event indicating that file X in Collection A was created. In an example, the file creation event can include the blocks that constitute file X. In an example, the file creation event may refrain from including the blocks that constitute file X and instead provide notice of those blocks in a separate event. The Node 505A may have access to the file creation event and the constituent block notification for file X in the Collection A event data 510 (e.g., via a synchronized event stream with the first node). In an example, the Node 510A may act on the received event to create a local representation of the file X in the local data store 520A. In the process of creating the local file X, the Node 505A may reference the block index 525 to determine if the local data store 520A already has a copy of one or more constituent blocks of the file X. For example, if the same file, e.g., an image, exists in both Collections A and B, the Collection B data in the local data store 520A may include those blocks. Thus, the Node 505A can create the local copy of the file X by copying the blocks from a Collection B file system element as opposed to transferring those blocks from the first node (e.g., over the data channel).

Figure 5B:
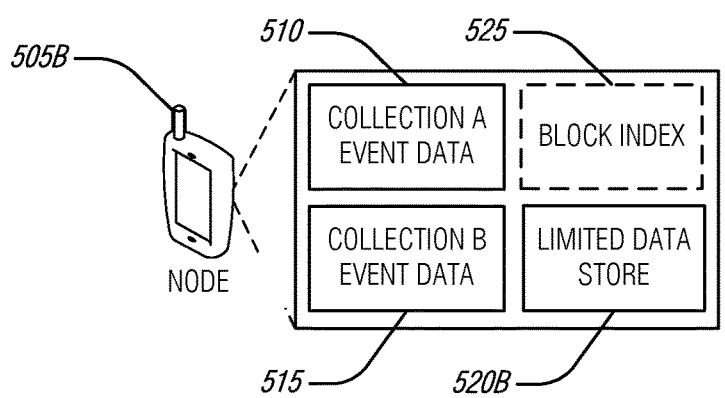

FIG. 5B illustrates an example of a participant Node 505B. The Node 505B differs from the Node 505A in that the local data store 520B is limited. A limited data store is a data store that is restricted from holding the contents of every file system element member of the collections to which the node is a member. In an example, the data store can be restricted via a lack of available storage capacity or via user defined quota, and the like. This is typically the case with mobile computing devices, such as cellular telephones, tablets, etc., which typically include significantly less storage than other classes of computers (e.g., desktop or server machines). However, a desktop with great storage capacity in the local data store 520B would be considered a limited data store if such desktop is also restricted from holding the contents of every file system element member of the collection to which the desktop is a member. In an example, the set of elements of the collection for which the node stores the contents may be referred to as the "locally available" set of elements. In the case of a node, such as Node 505A, the locally available set may be the entire collection. In the case of Node 505B with a limited data store, the locally available set may be a subset of the entire collection. The selection of elements to include in the locally available set of elements will be discussed later with respect to FIGS. 25-30.

Figure 6:
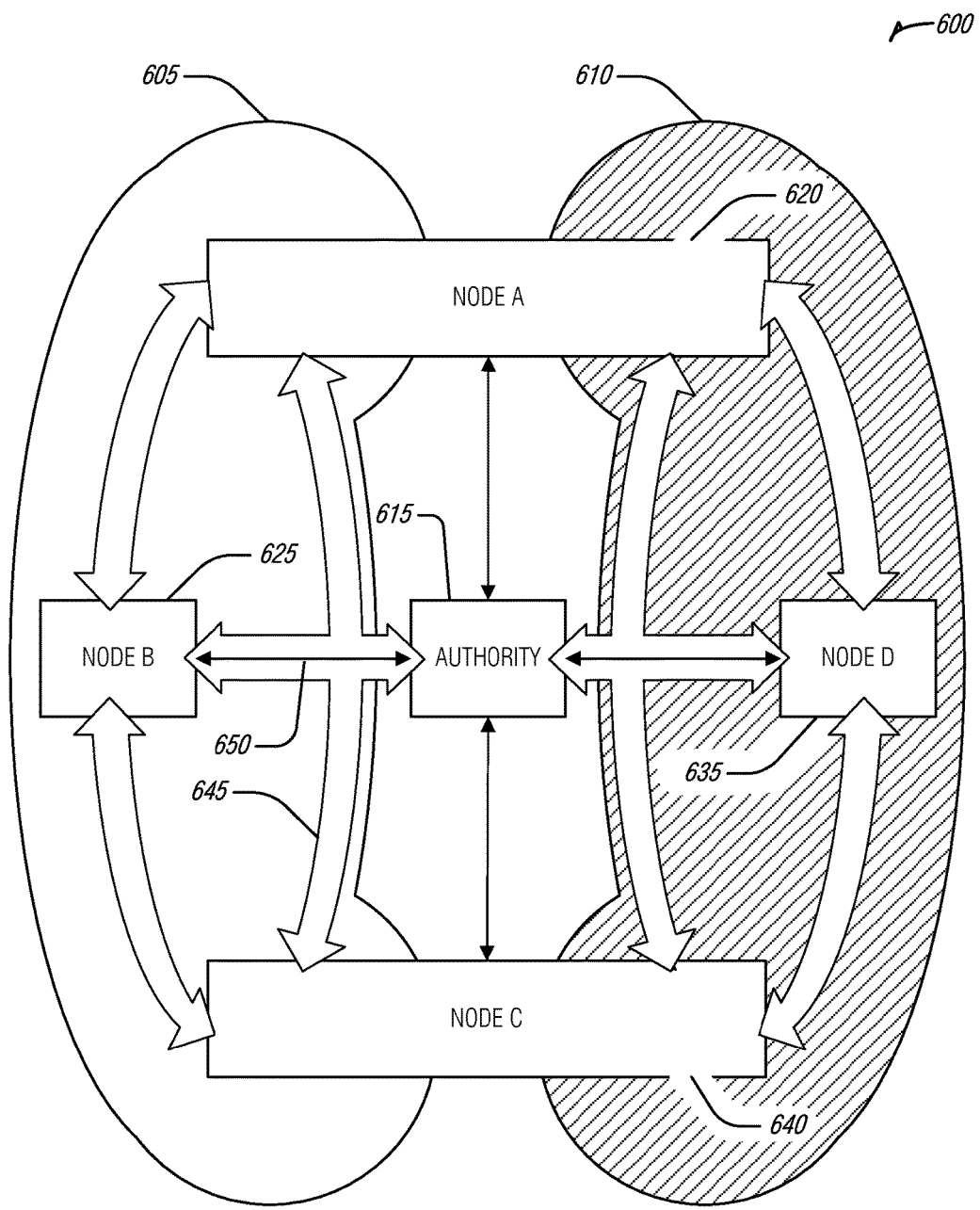
FIG. 6 is a network communication diagram of an example data distribution system, according to an example.

FIG. 6 is a network communication diagram of an example data distribution system 600. The data distribution system 600 includes four nodes, Nodes A 620, B, 625, C 640, and D 635. Also illustrated, are Collection A 605 and Collection B 610. Nodes A 620, B 625, and C 640 are participants in the Collection A 605. Nodes A 620, D 635, and C 640 are participants in the Collection B 610. The Authority 615 is illustrated outside of either Collection A 605 or B 610. The Authority 615 is communicatively coupled to every participant node, illustrated by the thin lines (e.g., line 650). As described above with respect to FIG. 1, the Authority 615 manages schemas for the collections A 605 and B 610. As part of this management, the Authority 615 authenticates the nodes (e.g., via a participant user of the schema) and tracks node availability for a given collection. The Authority 615 also provides portions of the collections' schemas to the nodes (e.g., to a data distribution mechanism on the nodes). These portions can include file system element members, general information (e.g., encryption data), or participant nodes (as described above with respect to FIG. 2.)

The thick lines (e.g., line 645) illustrate inter-node communication within a collection. The inter-node communication can include an event channel. In an example, the inter-node communication can also include a data channel. For example, Node B 625 can connect to Collection A 605 participant Nodes A 620 and C 640 after receiving notice that Nodes A 620 and C 640 are participants to the Collection A 605 (e.g., via the Authority 615 transmitting the collection schema for the Collection A to the Node B 625). In an example, the Authority 615 does not participate in providing events or data to the connected nodes via inter-node communications. However, in the example illustrated in FIG. 6, the Node B 625 can establish an inter-node communication to the Authority 615. The inter-node communication to the Authority 615 can facilitate, for example, event sharing from Node B 625 to Node C 640 in a circumstance where direct node-to-node communication is infeasible or impossible. (As further detailed in FIG. 11 below, a store point node, and not the authority, may facilitate event and data flow in such circumstances where direct node-to-node communication is not available between endpoint nodes.)

In an example, establishing inter-node communication includes connecting from the Node B 625 to Node A 620 using a physical link. Information enabling the connection (e.g., protocol, address, authentication information, etc.) can be obtained from the collection schema for the Collection A 605. In an example, a node connects to every other participant node in the collection that the node can reach. In an example, a node connects to a subset of participant nodes to the collection, the subset specified in the collection schema. In an example, participant nodes in the collection schema can include connection metrics used to order or prefer nodes for connections. Connection metrics can include measurements of bandwidth, latency, cost of the connection (e.g., bytes transferred, etc.), storage capacity, security (e.g., has a virus, is secured below a threshold, etc.), power (e.g., battery power, mains power, intermittent power such as wind or solar, etc.), among other things. Thus, for example, if Node A 620 is running on battery power and has a high-cost physical connection (e.g., a metered cellular physical link), and Node C 640 is a server machine on the same local area network as Node B 625, and Node B 625 is restricted to connecting to a single other node, Node B 625 can choose (or be directed by the Authority 615) to connect to Node C 640. Additional examples of inter-node connections are discussed below with respect to FIG. 9.

As noted above, a part of the inter-node communication is an event channel. In an example, part of establishing the inter-node communication, after the physical link is established, is synchronizing the event channel of the connecting node (e.g., Node B 625) to every connected node (e.g., Nodes A 620 and C 640). As events are shared, each node maintains some subset of events that the node has received. In an example, the subset is the entirety of all received events. In an example, the subset is the result of trimming (e.g., discarding or disregarding a portion of) the received events. In an example, the trimming is based on time. Thus, old events can be discarded. In an example, the trimming can be based on a superseding event. For example, a first event indicating modification of a file X from version one to version two can be superseded, and thus trimmed, when a subsequent second event indicates modification of the file from version two to version three. A superseded event has no information relevant to a current version of a file system element that is not included in a subsequent event. Thus, if the changed contents of a file system element are indicated incrementally (e.g., only the blocks that change from one version to the next are indicated as opposed to all blocks that make up the current version), then it is less likely that a modification event will be superseded by a later event.

In an example, version vectors are used to perform event trimming. The version at issue is a version of an object to which the event pertains, such as a file system element. The following includes example scenarios and uses of versioned vectors for event synchronization and event trimming (e.g., pruning)

Version vectors can be used to determine causality within partial-ordered events that occur in a distributed system with optimistic replication. Optimistic replication means that clients can make their own updates without first getting permission from a central source or verifying with all other clients. Partial ordering means that some events occur sequentially but others may occur concurrently, and have no set order based on a previous event. Causality says that one event not only succeeded another, but it was also occurred as a consequence of the previous event, it has a direct relationship. All of this means that given a file with 2 updates A and B, we can determine if A was based on B, B was based on A, or they are unrelated.

Version vectors can be represented as an associative array or map. Each node has an entry in the vector with a key that identifies the node and a value that describes their version. The version value can be a timestamp or counter. In this example, it is a counter, incremented so that the new version of the file is one greater than the maximum version in the existing vector held by the node doing the incrementing.

As an example, consider nodes P1 and P2 with identifiers 123 and 456. P1 creates a file and sets is initial version vector=[123,1]. P2 gets the file, and makes an update, the version vector is now [123,1], [456,2]. P1 receives the update from P2 and makes a further change, updating the version vector to [123,3],[456,2].

Causality is established when one vector dominates another. A vector $V_x$ is said to dominate $V_y$ when $V_{x<y<x<} V_y(\ )$ then $V_y$ causally succeeds $V_x$. If neither vector dominates the other then they are causally concurrent, and potentially in conflict.

Consider the previous example, when P1 receives the update from P2. It compares each element in the incoming vector with its own to determine dominance:

P2[123,1]=P1[123,1]

P2[456,2]>P1[456,0] (assume value zero if no local entry for a node)

P2>=P1 across all vector elements, so P2 is dominant; it causally succeeds P1's update.

To demonstrate concurrent updates, continue the previous example where P1 and P2 share the same version [123,3], [456,2]. Now both make an update and send each other the updated version vector, but neither vector will dominate:

P1[123,4],[456,2]≠P2[123,3],[456,4]

Version vectors allow the determination of causality given any arbitrary object updates. Version vectors also allow us to detect when a concurrent (conflicting) update has occurred.

As used in the discussed collection framework: in an example, each node can use its GUID as the identifier for its element in the vector; in an example, only nodes that have contributed an update to an object will have an element in the version vector; and in an example, a node only increments the version vector for an object when it publishes the update to the collection, not necessarily when file changes are detected locally.

Vector pruning (e.g., trimming) may occur according to an example. As more nodes contribute to an object, the size of its version vector grows. In the vast majority of cases an object typically only has a small set of contributors (writers), most peers are just readers, and so the size of the version vector is not an issue. A bad case scenario can involve a large corporate collection that includes every employee (such as a human resources collection with 250,000+ contributors), who have each contributed a single edit to an object. Even though most people will never contribute again to this file, they are forever carried along in the version vector.

Given a size for each element in a vector as 12 bytes, an 8 byte GUID and 4 byte version value, in the HR collection scenario, the version vector that was carried along with each object change/update would require 2.86 MB. In an example, the premise that causality can be determined using only the vector elements from recent contributors—e.g., assuming that after sometime, every node's vector reflects the same value for old entries, so only the recent ones would differ—each element in the vector can include a timestamp of when the element was last modified. The decision to prune a vector element can be determined by two configurable attributes: the size of the vector and the age of the element. Each of these attributes is a range. When a vector is at least large enough, and an element is at least old enough, the element is removed from the vector. An issue that can arise involves two nodes that are exchanging version vectors and they have not been equally pruned. This may lead to a false reporting of conflicts. As an example, consider two nodes that initially have the same version vector, [123,101], [456,98], [789,2]. P1 makes an update [123,102], but also detects that it is time to prune the aged element for 789, and then transmits its changes to P2. When P2 compares the vectors, it finds that P1 is missing an element for 789, and so will use a default value of 0:

P2[123,101],[456,98],[789,2]≠P1[123,102],[456,98], [789,0]

The vector comparison will be incorrectly detected as concurrent. If P1 had sent the actual vector element for 789, P2 would have correctly determined that its vector was dominated by P1.

Virtual pruning can be used to address the unequally pruned vector problem mentioned above. With virtual pruning, a vector comparison is done only between the common elements in the two version vectors only when it is deemed likely that any differences are due to unsynchronized pruning With virtual pruning P2 would have detected that the element for 789 had been pruned by P1, and would not have considered it in its vector comparison, correctly determining that P2[123,101],[456,98]<P1[123,102], [456,98].

In operation, with virtual pruning, when a node compares two version vectors, it first will identify any elements that exist in its own vector but are not present in the other vector. For each of these elements the node looks to see if any are eligible to be pruned. When reconciling using virtual pruning some slop time is added to the elements' age to compensate for clock sync issues. Next, the node does the opposite operation to find any elements from the other vector that are missing from the local vector. Again it determines if any of these elements should have been pruned by the other node. Any eligible elements are virtually pruned in each vector, and the final vectors are then compared.

Virtual pruning can greatly reduce false conflicts. In an example, a Collection Time (e.g., synchronized clock across collection participants) can allow greater reliance on virtual pruning as it can be assumed that the clocks to of two nodes are loosely synchronized, provided time-based operations are based on Collection Time in each node.

In an example, detected conflicts can be resolved using a last-write-wins rule where the object contents winning object change remains the same whether a conflict is detected or not. The detection of the conflict may incur additional storage costs locally, as the losing file can be copied elsewhere to prevent data loss.

Revisiting the example above using virtual pruning, assume values of vector max size >50 and element age >20 sec. Because an 8 byte timestamp is now included, the size of each vector element is 20 bytes. If there were a sudden flurry of edits by every member, the vector could reach a large size of 4.77 MB, and pass the size threshold of 50. But for the next 20 seconds the element age threshold would not be met. After 20 seconds of system degradation, pruning would take effect and the vector would now contain the latest 50 entries, with a vector size=1000 bytes. After 24 hours the max age range is passed, and the vector is pruned down to its smallest size (10), yielding a normalized size=200 bytes.

Event stream synchronization can be based on an event sequence, for example, that is globally, or collection wide, unique. Thus, Node B 625 can connect to Node C 640 and request Node C's 640 last event sequence. If the last event sequence matches its counterpart in Node B's 625 event stream, then Node B 625 can determine that the event streams are synchronized. Similarly, if the last event sequence of Node C 640 indicates an earlier event than the last event sequence of Node B 625, Node B 625 transmits the events between the last event sequence of Node C 640 and the last event sequence of Node B 625.

After event stream synchronization, the nodes (e.g., Nodes A 620, B 625, and C 640 for Collection A 605) can continue to pass events to each other via the inter-node communication. As described above with respect to FIG. 1, these events can include file system element events as well as data distribution element events. In an example, every event generated by a given node (e.g., Node B 625) is transmitted to every connected node in the collection (e.g., Collection A 605). In an example, an event can be specifically addressed to a particular node. For example, although Node B 625 is connected to both Nodes A 620 and C 640, Node B 625 addressed the event to Node C 640. In an example, addressing the event can include only sending the event to the desired node. In an example, the event can include a destination identifier on the event when the event is communicated to one or more connected nodes. This may be useful when, for example, the destination node is not directly connected to the source node, but there is a connection path (e.g., including an intervening node) between the two nodes. Specifically addressed events allow for specific requests to be made from nodes uniquely suited to handle the request while avoiding transmission to nodes not suited to the request. For example, Node C 640 can include multiple versions of file system elements for Collection A 605 while Nodes A 620 and B 625 include only the latest versions of these file system elements. Thus, if Node B 625 wishes to restore a file, for example, to a previous version, Node A 620 cannot satisfy the request while Node C 640 can.

As noted above, the inter-node communication can include a data channel. As described above with respect to FIG. 1, in an example, the data channel can be differentiated from the event channel by its optimization for data transfers. Thus, while control information is passed in the event channel, the data channel operates to push raw or bulk data, such as file system element content data, between nodes. For example, an event can include a current version indicator of a file with a listing of blocks making up that file. The listing can include block identifiers, but not the actual blocks themselves. An example identifier can be all or part (e.g., the most significant half of bits) of a hash value (such as an MD5 checksum). The identifiers can be used to determine which blocks are available locally and which blocks need to be obtained to reconstruct the entirety of the file. An event can be sent to identify or request these blocks. When the blocks are transmitted, they are transmitted via the data channel. The data distribution system thus is a two-step event-based system. Rather than a push model, where a central server pushes data (e.g., files or changes to files) to participants, nodes may exchange events and each individual node may request (e.g., pull) the data corresponding to the events.

In an example, every event is acted on, or executed, when the event is received by a node. In an example, the node can defer activation of all or some events (e.g., file system element events). Such a node can be referred to as a passive node. A passive node has a synchronized event stream, but not necessarily a synchronized local data store. Such an arrangement can be useful in nodes with a limited local data store, such as that described above with respect to FIG. 5B. A node that neither receives nor acts on events can be termed an inactive node if such node was ever a participant node in the collection schema.

As illustrated in FIG. 6, inter-node communication can be specific to a collection. Thus, the nodes in Collection A 605 establish inter-node communication between each other and the nodes in Collection B 610 establish inter-node communication between each other. However, nodes can be participants in more than one collection, as illustrated in Nodes A 620 and C 640. In an example, the inter-node communication between these nodes can share a physical link. Thus, Node A 620 can establish Collection A 605 inter-node communication and Collection B inter-node communication to Node C 640 over a single physical link (e.g., the same TCP/IP connection).

As illustrated in FIG. 6, nodes communicate meta data throughout participant nodes in a collection. By engaging in this distributed meta data sharing about the collection data, including file system element data, the data distribution can be resilient to disruption, and also offer timely sharing of data between the participant nodes. Managing the collection schema from the Authority 615 can also address concerns for managing the distributed design of the collection without overly burdening participating nodes, thus allowing more nodes to participate in the data distribution capabilities of the collections. Thus, a robust and efficient data distribution mechanism can be implemented using the communication network illustrated in FIG. 6.

Figure 7:
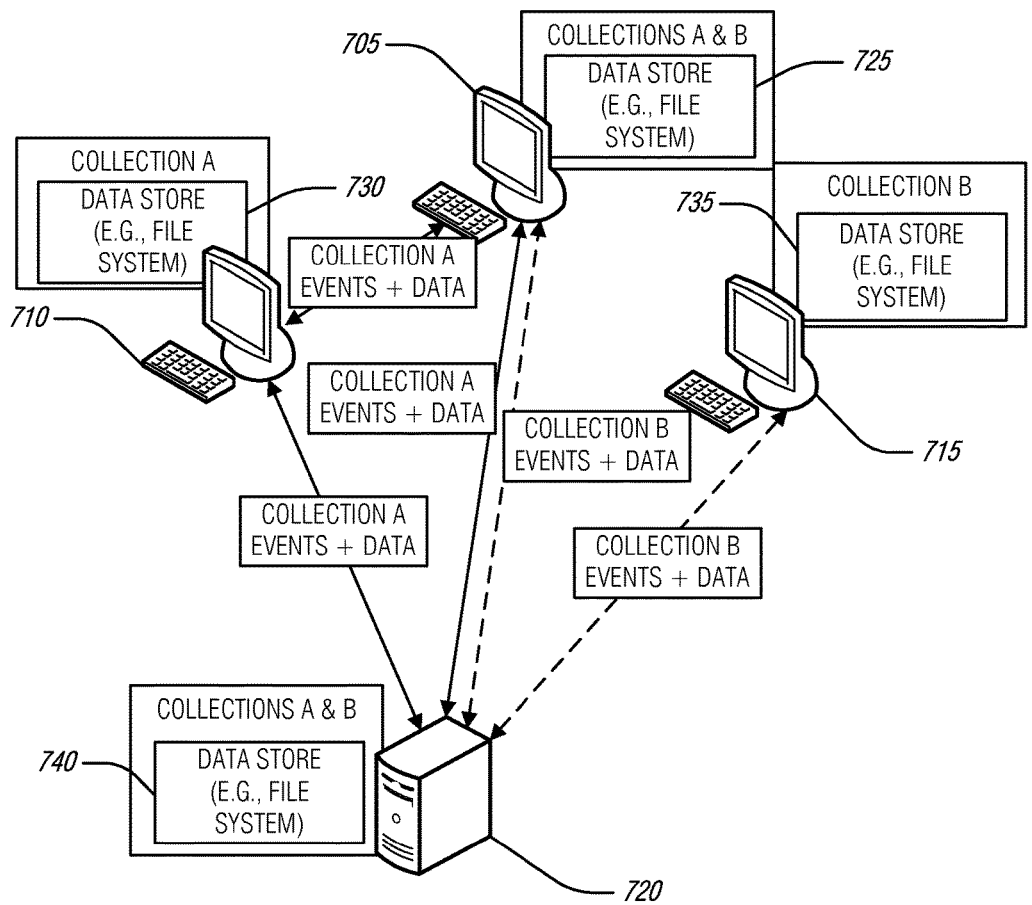
FIG. 7 is a diagram of an example implementation of a participant node network, according to an example.

FIG. 7 illustrates an example implementation of a participant node network 700. Implementing the general network data distribution system 600 discussed above with respect to FIG. 6, the network 700 can include Nodes 705, 710, 715, and 720 with respective local data stores 725, 730, 735, and 740. Nodes 705, 710, and 720 are participants to Collection A, with Collection A data distributed between them. Nodes 705, 715, and 720 are participants to Collection B, with Collection B data distributed between them. The Collection A and B data is stored in local data stores—local data stores 725, 730, 735, and 740—of the nodes. As illustrated, the solid connecting lines are Collection A inter-node communication while the dashed connecting lines are Collection B inter-node communication. All of the illustrated inter-node communications include both events and data (e.g., an event channel and a data channel). While all of Collection A's participant nodes are inter connected, FIG. 7 illustrates a case in which Node 705 is not directly connected to Node 715 although both are Collection B participants. In this case, events and data (unless Node 720 is passive) originating from the Node 715 will be synchronized with Node 720. Because Node 705 maintains its synchronization with Node 720, the changes originating from Node 715 will propagate to Node 705 via Node 720. In an example, a node (e.g., Node 720) can rebroadcast all events received to every other connected node within the collection. This example allows every node to act as a network repeater for the inter-node communication.

Figure 8:
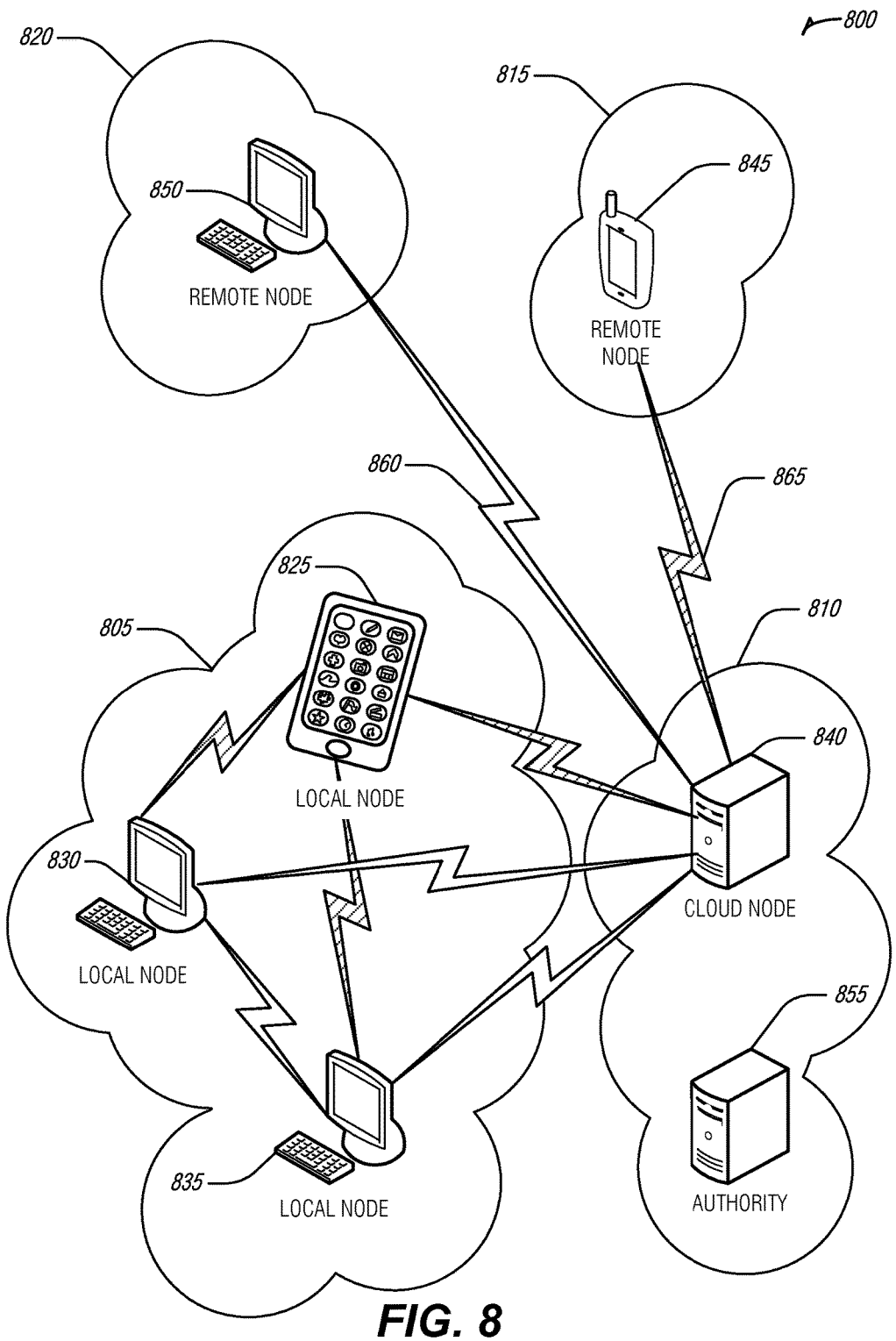
FIG. 8 is a diagram of an example implementation of a participant node network with a multi-segment physical network, according to an example.

FIG. 8 illustrates an example implementation of a participant node network 800 with a multi-segment physical network. As illustrated, all nodes are participants of a single collection. The shaded network connections (e.g., connection 865) represent event only communication (e.g., passive participant communication) and the unshaded connections (e.g., connection 860) represent event and data communication. The network 800 includes four network segments, a local area network (LAN) 805, a cloud network 810, a remote site 820, and a wide area network (WAN) 815. Thus, with respect to LAN 805, Nodes 825, 830, and 835 can be considered local nodes, node 840 can be considered a cloud node, and both of nodes 850 and 845 can be considered remote nodes. The Authority 855 is included for completeness, occupying in some examples central position within the topology. The Authority 855 may operate as described above.

The network 800 illustrates a scenario in which nodes in different network segments can experience limited abilities to connect to participant nodes in other network segments. For example, it is typical to assign local nodes a connectable address specific to the LAN 805. Thus, Node 840 would be unlikely to initiate a connection to Node 825, for example. However, if node 840 were assigned a generally routable address, then every other node (e.g., Nodes 825, 830, 835, 850, and 845) would be able to establish the physical link to Node 840. Over this physical link, bi-directional inter-node communication can be established as discussed above with respect to FIG. 6. Note that, where possible, the participant nodes establish connections to multiple other participant nodes, as illustrated by the interconnectedness of the local nodes, Node 825, Node 830, and Node 835. FIG. 8 also illustrates likely passive nodes, such as tablets (e.g., Node 825) and mobile devices (e.g., Node 845).

Figure 9:
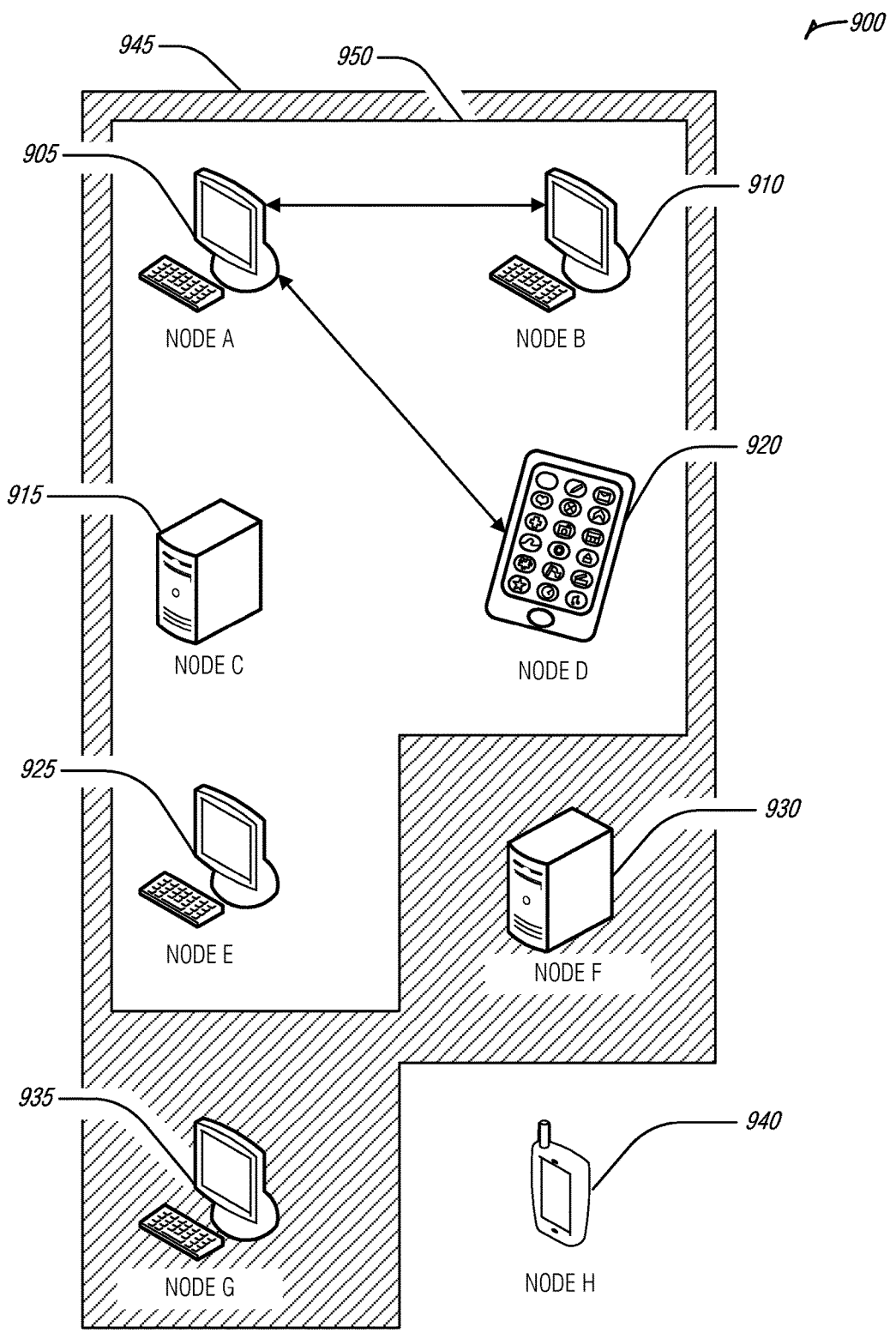
FIG. 9 is a diagram of an example of different participant node classifications for a node set based on connection information, according to an example.

As illustrated in FIGS. 6, 7, and 8, participant nodes can establish inter-node communication to as many participant nodes as they are able. However, such interconnectedness can waste computing resources, such as when the participant node count is high. The description of FIG. 6 above includes a discussion of using connection metrics to connect to only a subset of participant nodes in a collection. Further, the description of FIG. 2 includes a description of tracking participant node connection quality information in a collection schema. FIG. 9 illustrates an example of different participant node classifications for a node set 900 based on connection information. As illustrated, the classifications are in regard to Node A 905 as a target node.

Participant node classifications can include the entire node set 900, an active participant node subset 945, and a preferred participant node subset 950. The entire node set 900 includes all of Nodes A 905, B 910, C 915, D 920, E 925, F 930, G 935, and H 940. The participant node subset 945 is a subset of the entire node set 900 and includes Nodes A 905, B 910, C 915, D 920, E 925, F 930, and G 935. The preferred participant node subset 950 is a subset of the participant node subset 945 and includes Nodes A 905, B 910, C 915, D 920, and E 925. As illustrated, Node A 905 has limited inter-node communications to a connected subset of the preferred participant node subset 950 including Nodes B 910 and D 920.

The entire node set 900 can be all nodes that have contacted an Authority serving the collection to which Node A 905 is a participant. In an example, the entire node set 900 is limited to nodes that have, at some time, authenticated to an Authority for access to the collection. In an example, the entire node subset includes all nodes that are participants to the collection, including nodes that are inactive (e.g., indicated as not participating in an event channel or a data channel within the collection), such as Node H 940. The participant node subset 945 includes all nodes that are active or passive participants in the collection. For example, the complete connection paradigm illustrated in FIG. 6 and described above would involve connecting to all of the nodes in the participant node subset 945 (e.g., Nodes A 905, B 910, C 915, D 920, E 925, F 930, and G 935).

The preferred participant node subset 950 is selected from among the participant node subset 945 based on connectivity characteristics. These characteristics can include network performance, node cost, or monetary measurements, such as cost per byte transferred, latency, bandwidth, power source (e.g., mains power, battery, solar, wind, etc.), power remaining (in the case of a battery, fuel cell, etc.), processing power of the node, storage capacity of the node, additional features of the node (e.g., data versioning, hard site designation, physical location, etc.), proximity to the target node (e.g., Node A 905), among other things.

In an example, the connectivity characteristics can be determined by the Authority and communicated to the target node in the collection schema. In an example, other nodes (e.g., Nodes B 910, C 915, D 920, E 925, F 930, G 935, and H 940) report one or more of their connectivity characteristics to the Authority, for example, when they connect to the Authority. The Authority can sort the participant node subset 945 based on the connectivity characteristics. For example, the Authority can first sort the nodes based on the bandwidth measurement. To the extent that there are ties (e.g., equal weighting), the Authority can break the ties based on latency, and break further ties with a third measurement. In an example, each measurement can be weighted and combined to arrive at an overall score used for sorting the nodes. In an example, the measurements can be normalized to a single value range and combined.

Of the sorted subset of participant nodes 945, the subset of preferred participant nodes 950 can be selected via a threshold. For example, a threshold of four can lead the Authority to select the top four nodes from the sorted participant node subset 945. In an example, the threshold is a score threshold. That is, every node, regardless of how many nodes that may be, whose sort score is above the threshold will be included in the subset of preferred participant nodes 950. In an example, the collection schema not only indicates which nodes are in the subset of preferred participant nodes 950, but also indicates the score of each node. In an example, the portion of the collection schema sent to the target node (e.g., Node 1 905) does not include any nodes other than the subset of preferred participant nodes 950.

Once the target node has the subset of preferred participant nodes 950, the target node can decide to which of these nodes that the target node will connect with, such as Nodes B 910 and D 920 when Node A 905 is the target node. In an example, the decision is based on the sort score in the collection schema. In an example, the decision can be random. In an example, the number of nodes to connect to is based on a predetermined threshold. In an example, the number of nodes to connect to is based on a resource policy for the target node. In an example, the connected nodes can include a node with a particular service, such as a versioning service. In an example, if the target node loses a connection, a new node from the subset of preferred participant nodes is selected. For example, if Node A 905 loses its connection to Node D 920, Node A 905 can choose to connect to either Node C 915 or Node E 925.

Managing node connects as described above can provide efficient use of resources while still enabling robust and highly efficient data distribution. Further, the differentiated central management of selecting the subset of preferred nodes and local management of selecting connected nodes permits a highly dynamic and flexible connection methodology to increase performance or resiliency in inter-node communication within a collection.

Figure 10A:
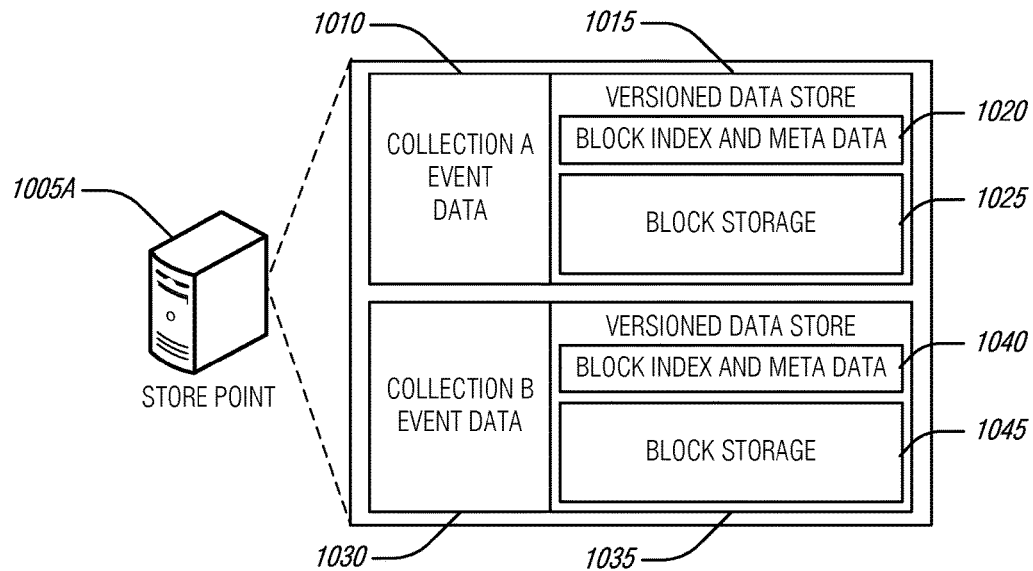
FIGS. 10A and 10B are block diagrams of examples of store point nodes, according to an example.
Figure 10B:
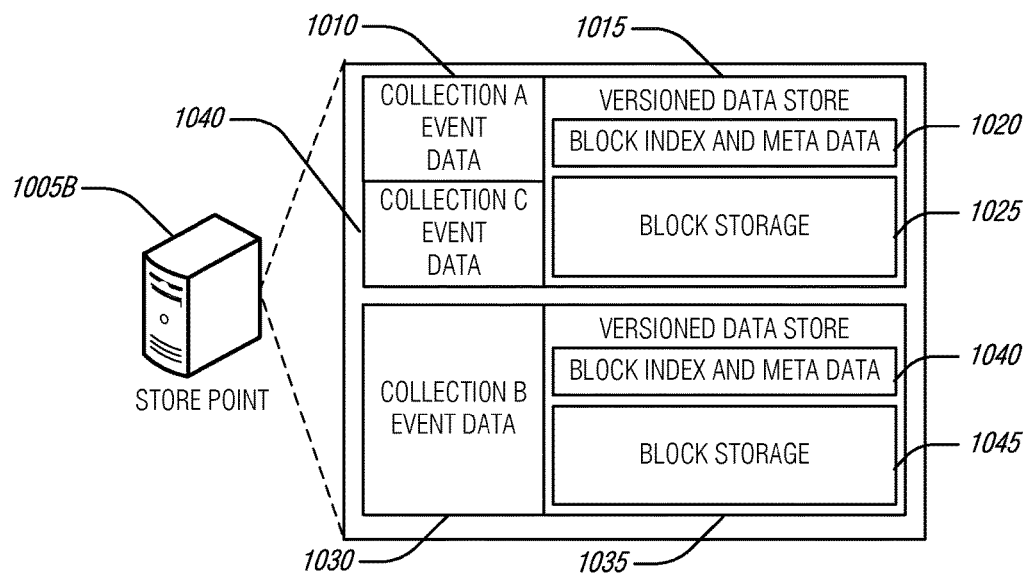

FIGS. 10A and 10B illustrate two examples of a participant node providing a versioned data store for collection data, referred to as a "store point" node. Up to this point, collection participant nodes (e.g., nodes that are not the authority) have received equal treatment in describing how data is distributed among the nodes. Store point nodes do not operate any differently from this perspective. However, a distinction can be made between store point nodes and endpoint nodes in both the nature of the local data store and the services offered.

FIG. 10A illustrates an example of a store point node 1005A with Collection A event data 1010 and Collection B event data 1030. Instead of a traditional file system, such as may be provided from a common local data store in an endpoint node, the store point node 1005A includes a versioned data store for each collection to which the store point node is a participant, namely versioned data store 1015 and versioned data store 1035. The versioned data stores are configured to store block index and meta data as well as blocks. For example, the versioned data store 1015 includes block and meta data 1020 and block storage 1025 for Collection A and the versioned data store 1035 includes block and meta data 1040 and block storage 1045 for Collection B.

The versioned data store facilitates file system element versioning and data storage deduplication by managing file system element meta data including a version of the file system element and its constituent blocks, and storing those blocks. For example, if version one of file X consist of blocks M and N, and version two of file X consists of blocks M and 0, the versioned data store can store blocks M, N, and 0 once, and also track which blocks belong to which version of the file. Thus, unlike a file system, which may already have a block locally for a newly created file system element, the block is not copied to the new file system element, but rather simply mapped to that element.

The versioned data store can be encrypted, for example, using a collection key. Thus, as illustrated, each collection has its own versioned data store. Such an arrangement permits the store point to facilitate data versioning for disparate parties without fear that any party can access another's data. However, as illustrated in FIG. 5B, if two collections, such as Collection A and Collection C (e.g., store point 1005 has Collection C event data (block and meta data 1040)) share a key, they can share a versioned data store 1015. This situation may arise, for example, if Collection A is a personal collection and Collection C is a backup collection for a single user. The more collections that can be safely (e.g., securely) condensed into a single versioned data store, the more data duplication can occur.

In an example, the collection key can be withheld from the versioned data store. In this example, the endpoint nodes have the collection key and encrypt blocks individually before sending to the store point node. All block fingerprints are thus based on the encrypted block. In this manner, the nodes may exchange blocks and block meta data with a store point node that is not under control of a party to the collection without fear that the data will be exposed to the store point administrator. In an example, the versioned data store can store file information, such as a unique ID of the file (e.g., unique to the collection or unique amongst all files), file version, or other meta data that does not reveal information about the file contents. In this example, the file name, or path, for example, can be stored in a group of meta data blocks that are part of the file, and thus encrypted prior to arrival at the versioned data store.

Figure 11:
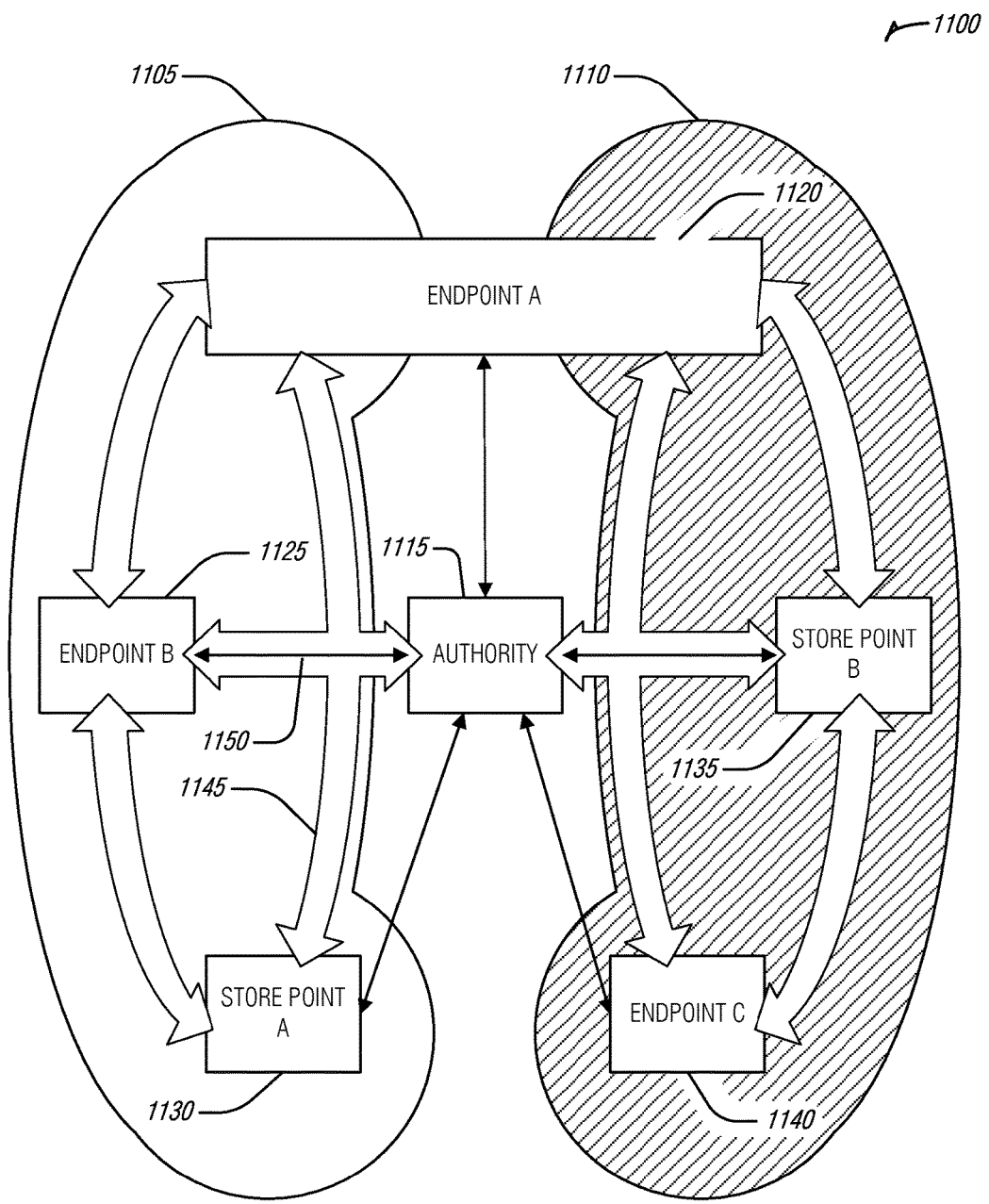
FIG. 11 is network communication diagram of an example data distribution system including both store point nodes and endpoint nodes, according to an example.

FIG. 11 is a network communication diagram of an example data distribution system 1100, including both store point nodes (e.g., Store Points A 1130 and B 1135) and endpoint nodes (e.g., Endpoints A 1120, B 1125, and C 1140). As described above in FIG. 6, the thin lines (e.g., line 1150) are Authority communication channels, and the thick lines (e.g., line 1145) are inter-node communications. Similarly, the nodes belong to either Collection A 1105 or Collection B 1110. Endpoint A 1120 participates in both Collections A 1105 and B 1110, while Endpoint B 1125 and Store Point A 1130 only participate in Collection A 1105 and Store Point B 1135 and Endpoint C 1140 only participate in Collection B 1110. The communications between nodes and the Authority 1115 and between nodes work in the same manner described above with respect to FIG. 6. That is, for standard data distribution, there is no distinction between store point nodes and endpoint nodes. However, as discussed above, if a node desires versioned data, they must request the versioned data from a store point node. Thus, for example, if the current version of File X is the third version, and a user on Endpoint B 1125 desires the second version of file X, Endpoint B 1125 can make a request (e.g., via an event channel) to Store Point A in Collection A 1105 for version two of File X. In an example, the Store Point A 1103 provides the meta data of version two of file X to Endpoint B 1125 in response to the request. Endpoint B can then determine which blocks of file X version two that Endpoint B already possesses and request the missing blocks from Store Point A 1130. In an example, store points further store a complete event stream. Thus, in this example, the event stream trimming discussed above occurs at endpoint nodes. In other examples, store point nodes will also perform variations of event stream trimming.

Figure 12:
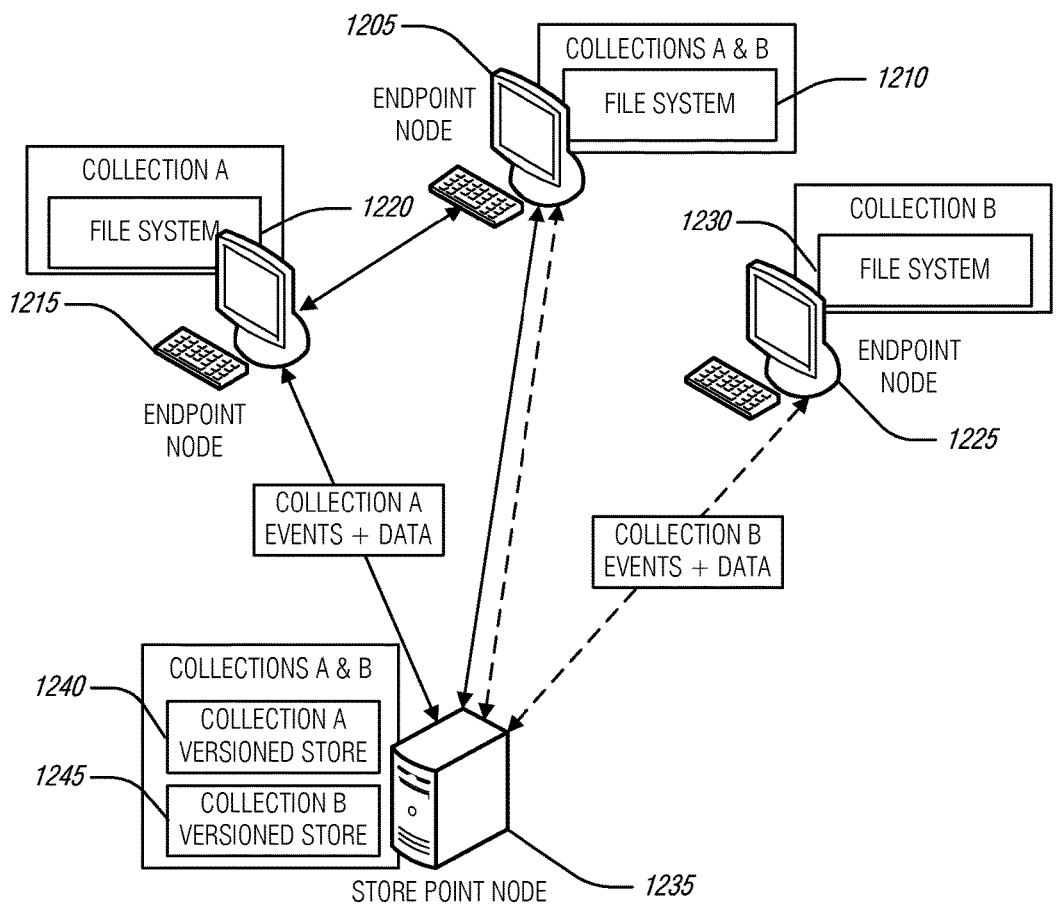
FIG. 12 is a diagram of an example implementation of a participant node network including store point nodes and endpoint nodes, according to an example.

FIG. 12 illustrates an example implementation of a participant node network 1200 including store point nodes and endpoint nodes. Implementing the network data distribution system 1100 discussed above with respect to FIG. 11, the network 1200 can include Endpoint Nodes 1205, 1215, and 1225, and Store Point Node 1235. Nodes 1205, 1215, and 1235 are participants to Collection A. Nodes 1205, 1225, and 1235 are participants to Collection B. The Endpoint Nodes 1205, 1215, and 1230 have single local data stores 1210, 1220, and 1230 respectively. Thus, Endpoint Node 1205 stores both Collection A data and Collection B data in the single local data store 1210. In contrast, Store Point Node 1235 separate local data stores 1240 and 1245 to respectively store Collection A data and Collection B data. Further, as discussed above with respect to FIG. 11, local data stores 1240 and 1245 are versioned data stores and thus maintain the necessary meta data and content (e.g., block data) to maintain file system element versions. As illustrated, the solid connecting lines are Collection A inter-node communication while the dashed connecting lines are Collection B inter-node communication. All of the illustrated inter-node communications include both events and data (e.g., an event channel and a data channel).

While all of Collection A's participant nodes may be inter connected, FIG. 12 illustrates the case in which End Point Node 1205 is not directly connected to Endpoint Node 1225 although both are Collection B participants. In this case, events and data originating from the Endpoint Node 1225 will be synchronized with Store Point Node 1235. Because Endpoint Node 1205 maintains its synchronization with Store Point Node 1235, the changes originating from Endpoint Node 1225 will propagate to Endpoint Node 1205 via Store Point Node 1235. This example illustrates that the Store Point Node 1235 operates just like an endpoint node during data distribution. However, where any of the illustrated endpoint nodes are instructed to retrieve historical file system element information or data, they would need to make the request of Store Point Node 1235 because the local data stores 1210, 1220, or 1230 do not include versioned data stores.

Figure 13:
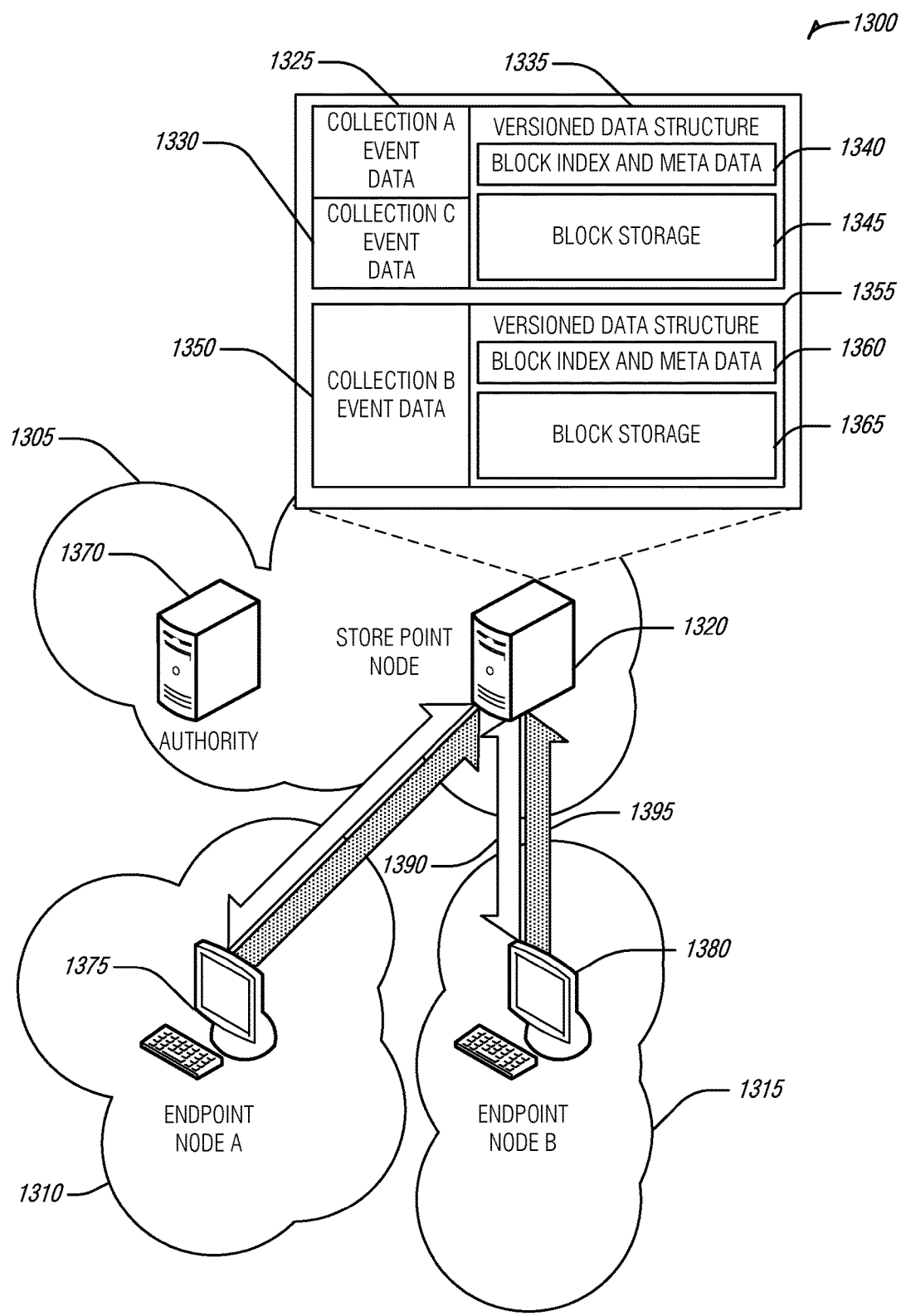
FIG. 13 is a diagram of an example implementation of a participant node network with endpoint and store point nodes in a multi-segment physical network, according to an example.

FIG. 13 illustrates an example implementation of a participant node network 1300 with endpoint and store point nodes in a multi-segment physical network. As illustrated, all nodes are participants of a single collection. The shaded network connections (e.g., connection 1395) represent versioned data communication (e.g., requests for historical file system element information or data) and the unshaded connections (e.g., connection 1390) represent event and data communication (such as that described above with respect to FIG. 11). The network 1300 includes three network segments, a cloud network 1305, a LAN 1310, and a remote site 1315. The Authority 1370 is included for completeness, occupying a likely central position within the topology at the cloud network 1305. The Authority 1370 operates as described above. The Store Point Node 1320 is also illustrated as occupying a likely central position in the cloud network 1305. However, as store points are simply participants with respect to event and data transmission, additional store points could be included in any of the networks, such as the LAN 1310 or remote site 1315. Moreover, the Store Point Node 1320 could be absent from the cloud network 1305 and place in either of the LAN 1310 or remote site 1315.

The Store Point Node 1320 can operate as described above with respect to FIG. 10. As illustrated, the Store Point Node 1320 participates in three collections, Collection A, Collection B, and Collection C. Thus, the Store Point Node 1320 at least includes Collection A event data 1325, Collection B event data 1350, and Collection C event data 1330. Further, Store Point Node 1320 includes two local data stores, versioned data structure 1335 and 1355. Versioned data structure 1335 includes file system element meta data 1340 and file system element content data 1345. Similarly, versioned data structure 1355 includes file system element meta data 1360 and file system element content data 1365. Versioned data structure 1335 differs from versioned data structure 1355 based on the multiple collection storage of Collections A and C on versioned data structure 1335. As described above, where policy allows, combining collections into a single versioned data store provides greater benefits to storage space utilization. In this example, the policy may be embodied with use of an encryption key to secure the contents of the versioned data structure 1335 that is common between the Collections A and C. Such as situation can arise, for example, if both Collections A and C are personal to a user. For example, Collection A can be backup collection and Collection C and be a personal synchronization collection.

Due to the use of the versioned data structures 1335 and 1355, the Store Point Node 1320 can perform a service for other participant nodes that Endpoint Nodes 1375 and 1380 cannot; namely providing historical file system element information. Accordingly, the requests for this historical data are one way, from Endpoint Nodes 1375 and 1380 to Store Point Node 1320. In an example, the request can be performed as an event (e.g., via the event channel of inter-node communication). In an example, the request can be in a separate channel. Store Point Node 1320 can respond to the request using the inter-node communication described above. Store Point Node 1320 is depicted in FIG. 13 as a single machine, but in some examples, the functionality of the Store Point Node 1320 may be distributed across several interconnected servers and machines.

Inter-Node Communications

As previously discussed with respect to FIGS. 8-9, nodes in a particular collection may connect with each other in a peer-to-peer fashion. These connections may be utilized to exchange data (e.g., file contents and signals) with these other nodes. This node-to-node data exchange allows for the data distribution system to operate in a distributed, fault tolerant way. Rather than relying upon a centralized server to fulfill requests (which is a single point of failure for many data distribution systems), each node in the data distribution system may connect to one of many nodes to fulfill the request. Accordingly, each peer can fully operate with a connection to 0-n peers, and a centralized server peer is not required.

These node-to-node connections also allow for the creation of policies that promote greater resource efficiency. For example, as discussed in FIG. 8, these connections allow nodes to obtain content and events locally, e.g., in the same Local Area Network (LAN), from other nodes rather than connect to the cloud node 840, which may require connecting across a Wide Area Network (WAN) (e.g., the Internet). In the case of an enterprise environment in which the collection may be shared amongst several users on several devices within the same organization, the use of local connections may reduce the impact the collection has on network gateway computing resources. This is the direct result of less traffic between the server nodes (such as Cloud Node 840) and the Local Nodes (e.g., Local Nodes 825, 830, 835, and the like) to fulfill requests for events and data.

As previously detailed with respect to FIG. 9, nodes in a collection can be classified into a number of different sets: the entire node set 900, an active participant node subset 945, and a preferred participant node subset 950. When a node first joins a collection, the node may obtain information describing the entire node set 900. The node may then discover which nodes in this set are online and actively participating in the collection to determine the active participant node subset 945. The set of all the nodes in the collection may be obtained from an authority (or in other examples, a cloud-based node, or other accessible participant nodes). However, as discussed in the examples below, the nodes may self-determine which other nodes with whom to communicate.

In an example, the node may also obtain a subset of the entire node set 900 which is a preferred node set. The preferred node set include nodes which have been determined (as described later) to be optimal for that node to connect to. The node may then discover which nodes in this set are online and actively participating in the collection to determine a preferred participant node subset. In some examples, the node may only connect with nodes in the preferred participant node subset. In some examples, the node may also connect with one or more nodes that are active and online (e.g., participating) and that are not in the preferred list (but are in the entire node set). For example, if there are no participating nodes in the preferred list (e.g., they are all off-line). For ease of understanding, the remaining portions of this section will use the example in which the node connects only to those nodes that are part of the preferred participant node subset, but it will be understood by one of ordinary skill in the art with the benefit of this disclosure that the same techniques discussed herein could be applied to connections with nodes that are not part of the preferred participant node subset.

To determine if a particular node is active and participating, a participating node may attempt to establish communications with the particular node. For example, the nodes may engage in a discovery process. The entire node set and the preferred participant node subset may be updated on a regular basis as nodes are added and removed from the collection and as nodes power on and off and leave and join networks.

The set of nodes in the preferred node subset may be selected based upon a selection algorithm that may factor in one or more node characteristics of nodes of the collection. For example, the preferred node subset may be selected so that the nodes in the preferred node subset may be participant nodes which are in a same network segment (e.g., a same corporate network). This may be determined by a node's Internet Protocol (IP) addresses. In other examples, other various metrics may be utilized. For example, each participant node may calculate one or more network metrics that describe a bandwidth, reliability, or latency of the network connection between itself and the other participant nodes in the collection and these network metrics may be utilized to select the preferred set. In an example, the individual characteristics of the node may be utilized when determining the optimal set. For example, mobile devices may have limited resources and therefore may not be very reliable for transfer of events or block data. The preferred set may ensure that a node does not connect with too many mobile devices. Thus a more powerful node with better bandwidth may be placed in the preferred set instead of a mobile device which may be closer, network-wise. Other characteristics used in determining the preferred set may include: processing power of a participant node, memory of a participant node, the size of the locally available storage on the participant node (which may operate in connection with anticipatory caching/pre-fetching techniques), remaining battery life of the participant node, and the like. These device characteristics may be reported by the participant nodes themselves.

In an example, participant nodes may attempt to connect to all of the participant nodes in the preferred participant node set. If participant node 830 from FIG. 8 has a preferred participant node set {Node 825, Node 835} then the participant node 830 would connect (as shown in FIG. 8) to those nodes. In another example, the participant nodes may connect to a subset of the preferred participant node set. For example, a participating node may have a limited ability to maintain connections with more than a particular number of other nodes. This may be due to processing ability, bandwidth, and the like. The subset of the preferred participant node set to which the node connects may be selected based upon the aforementioned node characteristics (e.g., bandwidth, latency, battery, processing power, and the like).

In an example, when retrieving event information or file information, a particular node may broadcast the request (e.g., a request for an event history, or a request for a file block) to all connected nodes and may fulfill the request from the first node that replies. In other examples, the node may select a node to fulfill the request from the group of nodes that responds. The node used to fulfill the request may be selected based upon a node's device characteristics. The use of device characteristics to select a node to fulfill the request may ensure that the request is not being filled by a node with a low latency and low bandwidth. A node with low latency may respond quickly (and therefore may respond first), but because of its low bandwidth the node may require a large amount of time to fulfill a request for content.

Figure 14:
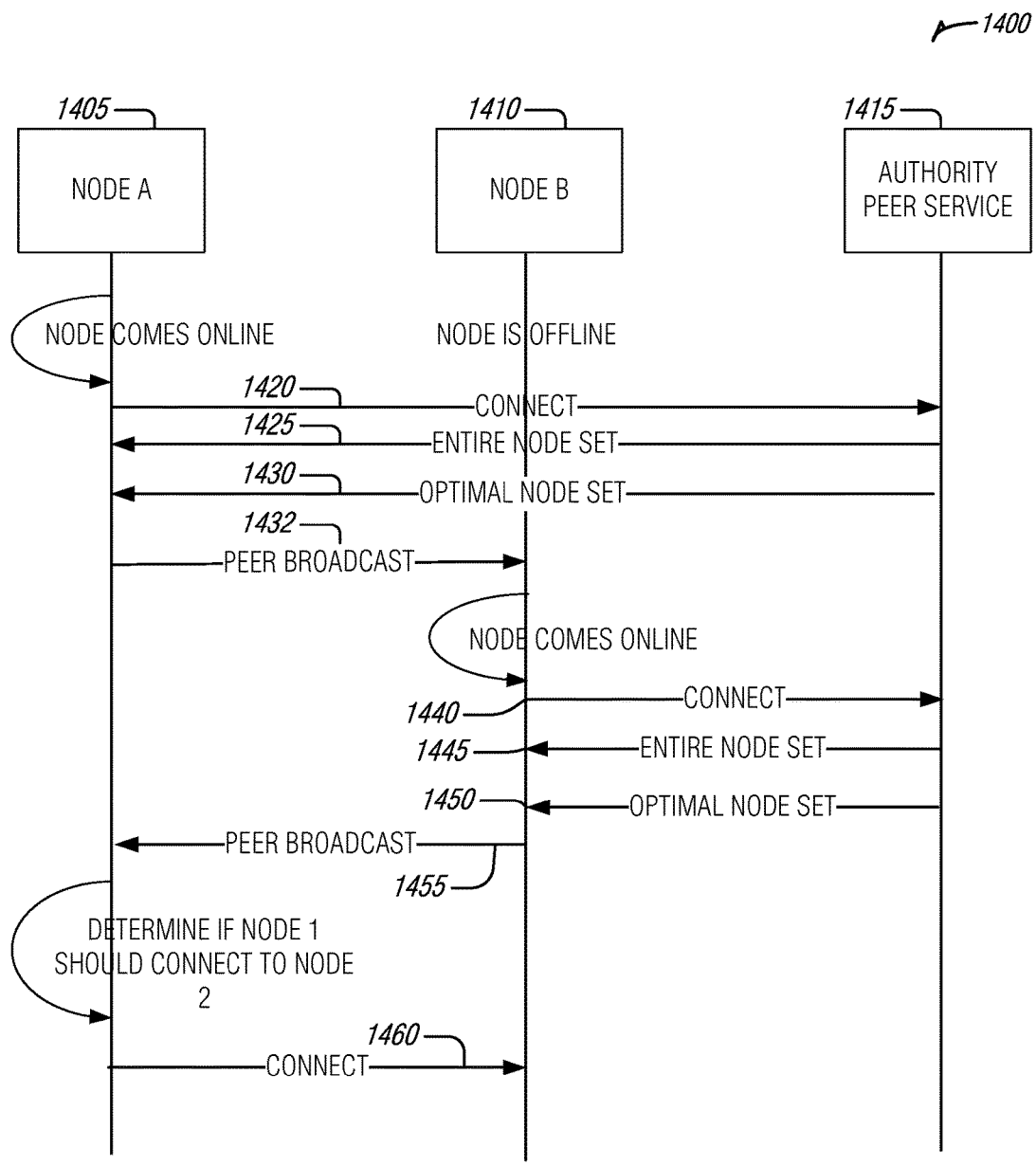
FIG. 14 is a flowchart that illustrates a method of connecting to participant nodes, according to an example.

FIG. 14 illustrates a flow diagram 1400 for a method of connecting to other participant nodes. Node A 1405 comes online and sends a connect message 1420 to a peer service, for example, a peer service 1415 operated by an authority. (In other examples, a peer management or coordination service may execute or operate on another dedicated server, on a store point server, or on another participant node (e.g., a node selected by an election algorithm)). The authority peer service may facilitate the node-to-node connection process by responding with a list of nodes in the entire node set for the collection with message 1425. In some examples, the authority peer service 1415 may calculate a set of preferred nodes for Node A 1405 to connect with. This preferred set of nodes may be sent to Node A 1405 with message 1430. In some examples, messages 1425 and 1430 may be combined. Once Node A 1405 receives the list of entire node sets, Node A 1405 may attempt to discover which nodes are participating (e.g., which nodes are online). Node A 1405 may do this by sending a peer broadcast message 1432 to the other nodes. These messages may be sent to the IP addresses indicated for the nodes in the messages 1425 and 1430. In other examples, these messages may be sent to a broadcast address that may be specific to a particular collection or a particular service. As shown in the earlier portion of the flow diagram 1400, 14, Node B 1410 is not yet online, so Node B 1410 does not respond to message 1455. At this time, only Node A 1405 is participating.

Once Node B 1410 comes online, Node B 1410 also sends a connect message 1440 to the authority peer service 1415. The authority peer service 1415 may respond with a list of nodes in the entire set with message 1445. In some examples, the authority peer service 1415 may calculate a set of preferred nodes for participant node B 1410 to connect with. This preferred set of nodes may be sent to Node B 1410 with message 1450 and may differ from the preferred set of nodes sent to Node A. In some examples, messages 1445 and 1450 may be combined. Once Node A 1410 receives the lists of node sets, the Node B 1405 may attempt to discover which nodes are online and participating. The Node B 1405 may do this by sending a peer broadcast message 1455 to the other nodes. These messages may be sent to the IP addresses indicated for the nodes in the messages 1445 and 1450. In other examples, these messages may be sent to a broadcast address that may be specific to a particular collection or a particular service.

As shown in FIG. 14, Node A 1405 is online and participating. In the example illustrated in FIG. 14, both nodes A and B are listed in the set of all nodes in the collection and both are on each other's preferred list. Node A 1405 then determines whether to connect with Node B 1410, because Node B 1410 is now also a participant node after coming online. As already noted, device characteristics of Node B 1410 may determine whether or not Node A 1405 makes this connection. In an example, device characteristics may be exchanged between Node A 1405 and Node B 1410 at this time. For example, Node B 1410 may send these device characteristics in the Connect Request 1460. In another example, Node B 1410 and Node A 1405 may utilize a shared scoring algorithm that may factor in one or more device characteristics. Rather than reporting on a multitude of statuses, each node may score itself according to the scoring algorithm and communicate only the score to each other. If Node A 1405 determines to connect with Node B 1410, then Node A 1405 will send a connect message 1460.

In some examples, each participating node may connect only to particular other participating nodes in order to impart structure on the node-to-node connections. In an example, this structure may be configured as a ring structure network topology. (A ring structure is one example of a network topology configuration specifying how a subset of nodes will connect to only a subset of other nodes, but it will be understood that other types of network topology and configurations may be used, including bus, star, rig, circular, tree, and line configurations). For example, each particular participating node may maintain two connections to other online, participating nodes. Each node may have a unique node identifier. The first connection may be made by searching for a participating node that has a unique id that is the smallest unique id for participating nodes that is still greater than the particular node's unique id. This may be termed the "high" connection. The second connection may be made by searching for the online node that has a unique id that is the greatest unique id that is still smaller than the particular node's unique id. This may be termed the "low" connection. Unique id's may be assigned by an authority when the node first connects to the collection.

In order to ensure that a participating node has at least two connections, if no participating nodes have unique id's that are higher than the unique id of the particular node, then the particular node may connect high to the lowest participating node. Similarly, if no participating nodes have unique id's that are lower than the unique id of the particular node, then the particular node may connect low to the highest online node in the list. In all cases, new participating nodes coming online may cause changes in the connections made.

Figure 15A:
FIG. 15A is a diagram that illustrates a connection between two participant nodes, according to an example.
Figure 15B:
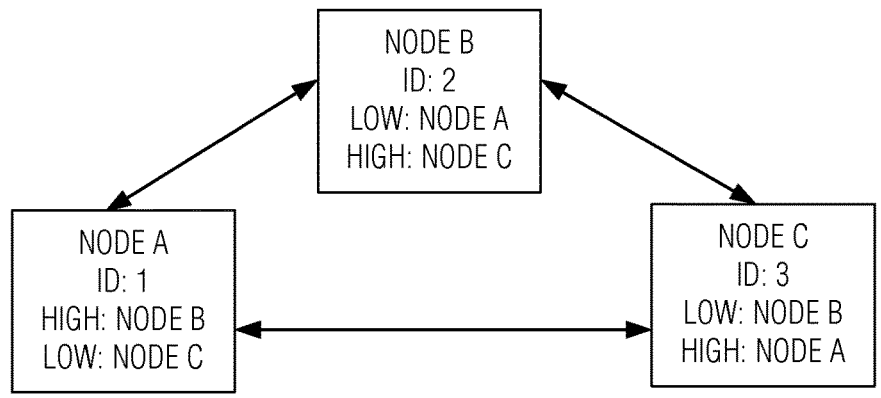
FIG. 15B is a diagram that illustrates a connection between three participant nodes, according to an example.

As an example, suppose the list of preferred participating nodes contained four nodes—A, B, C, and D, with IDs 1-4 respectively. If Node A and Node B are the only nodes currently participating, Node B may connect low to Node A and Node A may connect high with Node B. This result is shown in FIG. 15A. Now if Node C comes online, Node C will attempt to connect low with Node B since Node B has the highest unique id (2) that is still lower than Node C's unique id (3). Node B will connect high with Node C because Node C's unique id (3) is the lowest unique id that is still higher than Node B's (2). Because there are no nodes online with a higher unique ID than Node C (Node D is offline), Node C's search for a high connection with use of the ring structure will reach the end of the node list, at which point Node C will wrap-around the node list and connect high with Node A. Node A will connect low with Node C because there is no node that has a lower unique id than Node A, so Node A will wrap around to the highest unique id in the list—which is Node C. This result is shown in FIG. 15B.

Figure 15C:
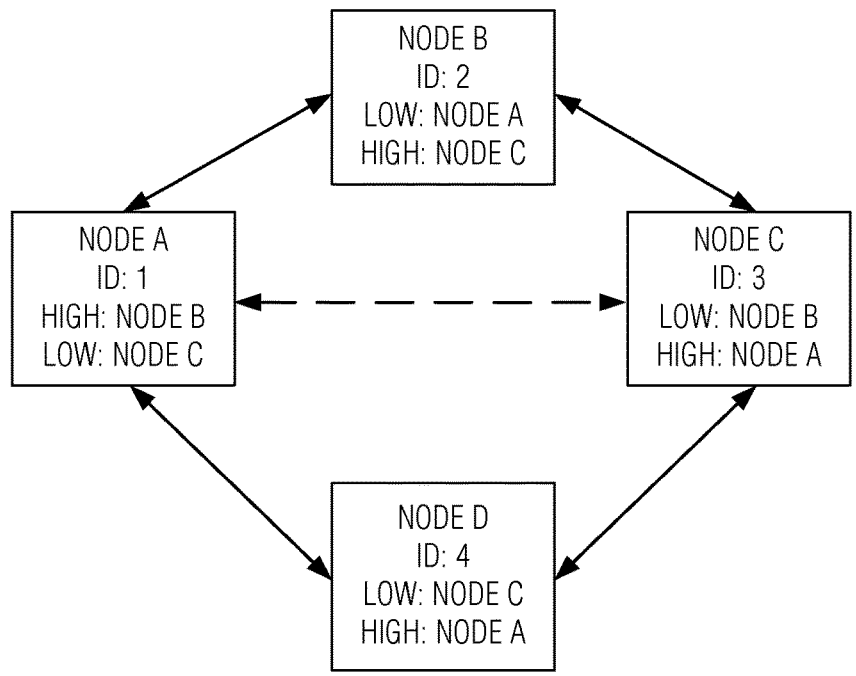
FIG. 15C is a diagram that illustrates a connection between four participant nodes, according to an example.

If Node D comes online, then Node D will connect low with Node C. Node D will also connect high with Node A. Node C will then disconnect with Node A, as Node A is now connected to both Node B and Node D, and Node C is connected to Node B and Node D. This result is shown in FIG. 15C. The disconnection is shown as a dotted arrow. In FIG. 15C each node has two connections and the network forms a ring. Any new nodes will insert themselves in the ring in position based upon their unique ids and the surrounding nodes may reconfigure their connections to connect with the new node. Similarly, when a node goes offline and ceases to participate in the data distribution system, the remaining nodes may reconfigure the connection. (It will be understood that variations to the techniques described in connection FIGS. 15B and 15C may be implemented based upon user, administrator, and network settings, and that other operations for identifying high connections will be performed for other, non-ring-based network topologies).

Figure 16:
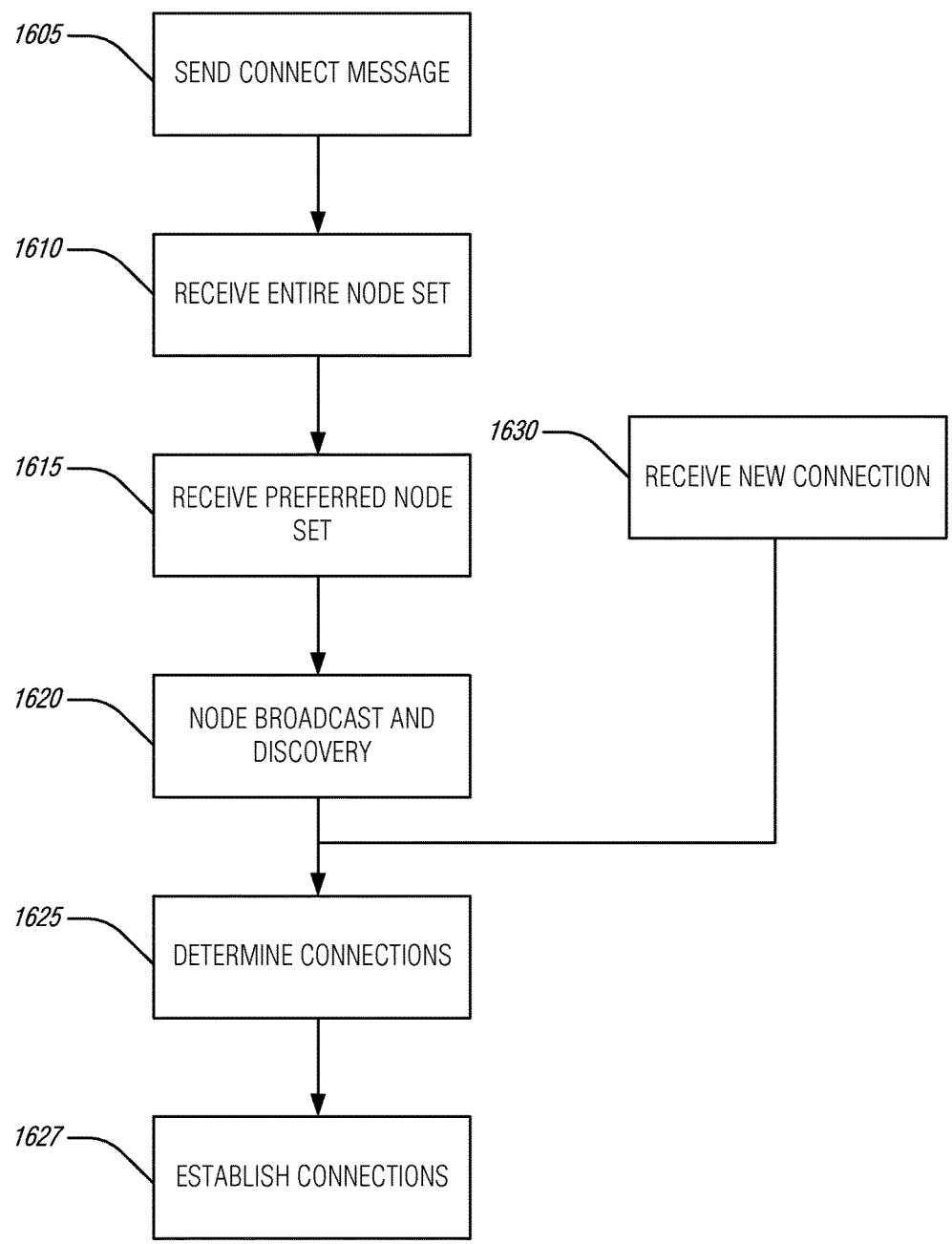
FIG. 16 is a flowchart that illustrates a method of connecting to other participant nodes, according to an example.

FIG. 16 illustrates a flowchart 1600 of an example method performed by a node to connect to another participating node according to some examples of the present disclosure. As shown, the participating node may go online and send a connection message to a peer service such as an authority peer service (operation 1605). As already noted, the peer service may operate on an authority, although in other implementations the peer service may operate with use of a store point node, another participating node, or the like. The participating node may receive information on the all the nodes in the collection (operation 1610). In some examples, the entire node set may be exchanged only upon first joining a collection. In these examples, the message received at operation 1610 may include any changes to the list since the participating node last connected with the authority peer service. The authority peer service may calculate a preferred set of other nodes for the node to connect to (operation 1615). The node may broadcast its presence to other nodes in either or both of the entire node set and the preferred node set and discover the nodes in either or both sets (operation 1620). Based upon the participant nodes in the entire node set or the preferred node set, the node may determine the connections that it will make (operation 1625). The node may then establish those connections (operation 1627). If, at any time, the participating node discovers new connections, such as at operation 1630, the participating node may repeat operations 1625 and 1627. In an example, the particular node may first try connecting to participant nodes in the preferred set before attempting to make connections with participating nodes not in the preferred set that are in the set of all nodes in the collection. If a new connection is received (operation 1630) the node's connections may be re-evaluated (operation 1625) and any connection changes may be made (1627).

Figure 17:
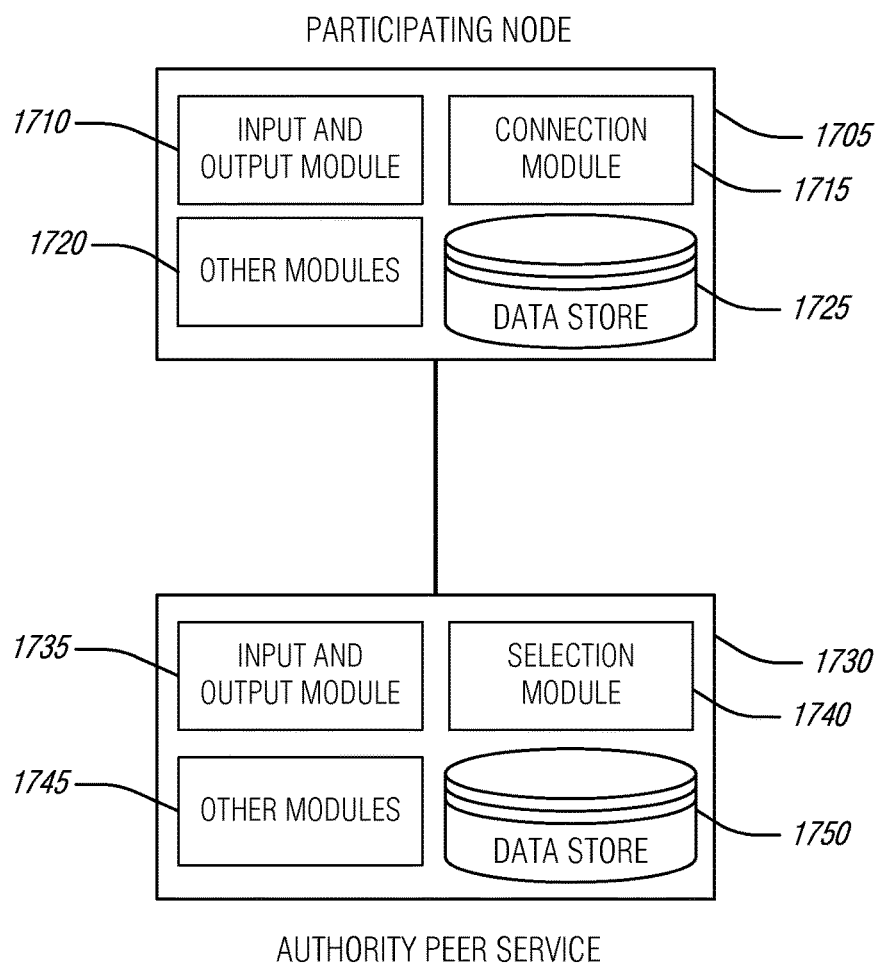
FIG. 17 is a block diagram that illustrates modules at a participant node and an authority peer management service that implement the participant node connections, according to an example.

FIG. 17 shows a schematic block diagram 1700 of a participating node 1705 and an authority peer service 1730 establishing peer connectivity according to some examples of the present disclosure. Input and Output module 1710 at the participating node 1705 may establish communications with other participant nodes, the authority peer service 1730, store point nodes (and, as applicable, nodes running other a peer services). Input and Output module 1710 may send connection broadcasts, receive connection broadcasts, establish connections, receive node lists, and the like. Connection module 1715 may receive the entire node set and the preferred node set from the authority via the input and output module 1710. Connection module 1715 may also receive information on which nodes are currently participating from the input and output module 1710. Connection module 1715 may utilize this information to determine which nodes to connect with. Input and output module 1710 may then make the connections determined by the connection module 1715. Data store 1725 may store the entire node list, the preferred node list and connection information. Other modules 1720 may perform one or more of the other functions disclosed herein.

Input and Output Module 1735 at the authority may receive connection messages from participating nodes and send preferred and entire node set lists in response. Selection module 1740 may determine a set of preferred nodes according to the algorithms disclosed herein. Other modules 1720 may perform one or more of the other functions disclosed herein. Data store 1750 may store the participating nodes, one or more preferred node sets for one or more nodes, and device characteristics for nodes. The device characteristics may be utilized by the selection module 1740 to determine the preferred node sets.

Client-Side File Replication and Transfer Deduplication

In connection with the data distribution architecture previously described, various actions may occur among the nodes of system 100 to synchronize and transfer file system elements (e.g., data for implementing folders and files). The following describes various techniques for implementing client-side "deduplication" techniques for the data transfers occurring among the various file system nodes.

As referred to herein, these deduplication techniques involve the general concept of fingerprinting file system elements that are being shared and transferred, and dividing each file into separate units referred to as "blocks" or "chunks." These blocks may be shared, transmitted, received, and in some cases stored as separate, unique units. The deduplication techniques when applied to data transfers as described herein provide a mechanism to prevent duplication of unnecessary data transfers, and to reduce the amount of bandwidth, processing power, and memory that is used to synchronize and transfer data.

Existing deduplication techniques in storage file systems (such as archival file management systems) apply fingerprinting and file system chunking/blocking for purposes of storing fewer copies of duplicate data blocks. Thus, the term deduplication is typically applied to mechanisms that prevent the duplicate storage of data. As described herein, such deduplication concepts may also be applied for purposes of file replication and file system data transfers across networks and among nodes (e.g., peers) of a data distribution system. Because individual data files are divisible into blocks, the events used to propagate the changed data files can relate to the access and transfer of individual file blocks within the changed data files.

As further detailed herein, the use of deduplication techniques to identify blocks for data transfers can enable the usage of data blocks from any of a plurality of collections. This is because the deduplication operations that occur at a local node do not require a key for accessing a particular collection, and a deduplicated index of known blocks across multiple collections can be maintained for purposes of managing the file data. As a result, file deduplication chunking/blocking techniques may utilize indexed block data to assist a participating node in independently building a same picture of a file from data in multiple collections.

As previously described with reference to FIG. 5A and FIG. 5B, the data store that is associated with a particular client node (e.g., data store 520A, limited data store 520B) may be accompanied by a block index 525. This block index can be used to identify file blocks that will recreate files or portions of files. For example, if as part of a synchronization of file system data for a particular collection, the node 505A or 505B is instructed to add a new file to the collection A or collection B, the node 505A or 505B can check whether one or more of the file blocks needed to recreate the new file are already stored in the block index 525. Blocks already stored in the block index 525 need not be transferred over the network, and can be used with other blocks in the block index 525 to recreate the new file. In some examples, the block index 525 may include indexing data for multiple collections (e.g., multiple shared collections, a personal collection, and a backup collection). Thus, the block index 525 may serve to catalog a large number of blocks existing throughout the file system storage on the particular node.

Figure 18:
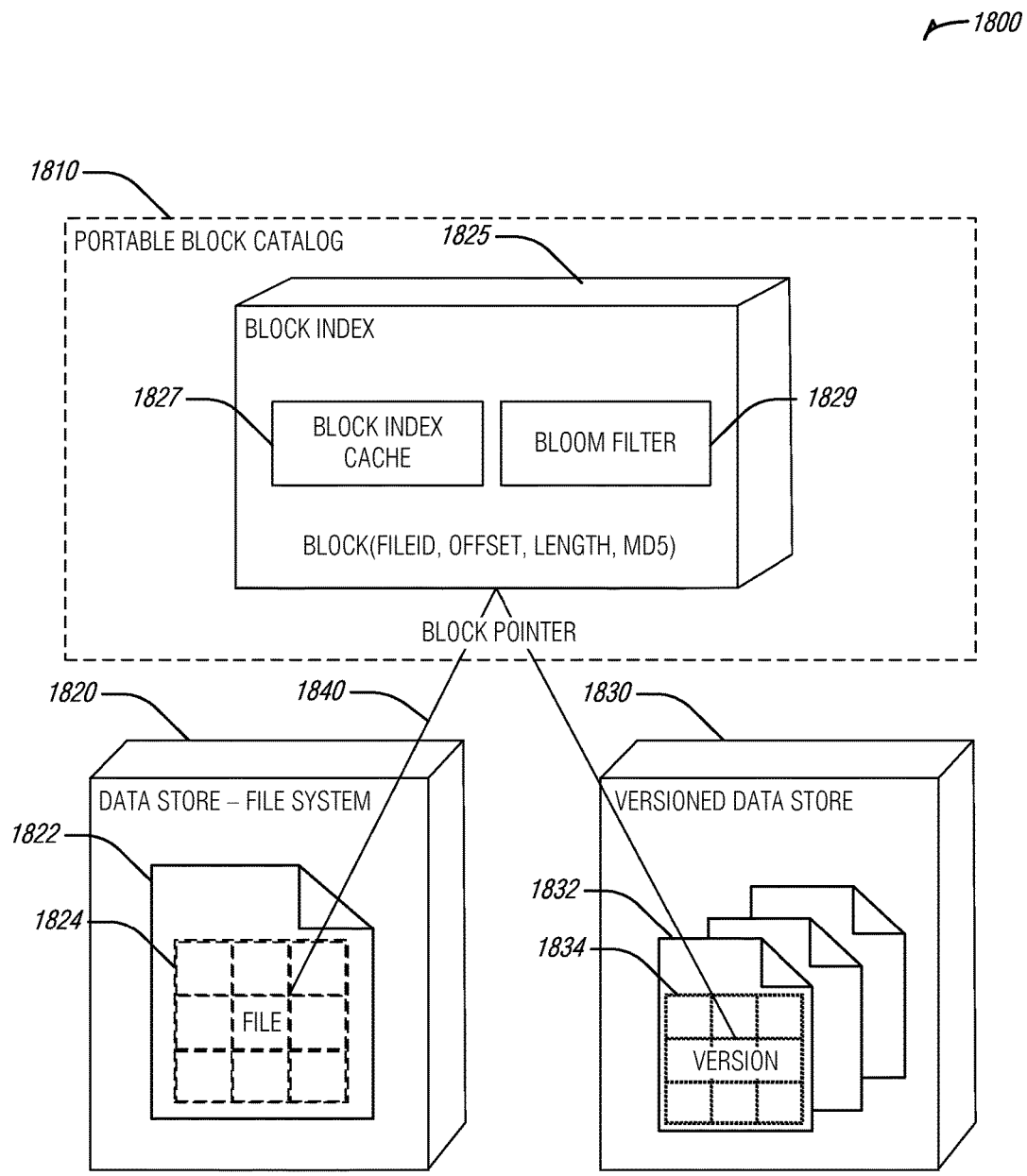
FIG. 18 is a diagram that illustrates a block tracking and indexing mechanism used in nodes implementing a block-based data distribution mechanism, according to an example.

FIG. 18 illustrates a more detailed example of a block tracking and indexing mechanism used in a node of a distributed data storage system according to one example. As shown, the portable block catalog 1810 is provided for cataloging data within the storage system. The portable block catalog 1810 provides a schema for determining, managing, and storing block meta data in a uniform fashion throughout the distributed data storage system, and can provide identification of node-specific uses of known blocks (either in a file system data store 1820 or versioned data store 1830). This portable block catalog 1810 may exist on each participating node in the distributed data system 100, for example.

As shown in the example of FIG. 18, the portable block catalog 1810 includes a block index 1825 used to store entries of known file blocks from a plurality of files. The blocks are linked from the block index 1825 by a block pointer 1840 to the particular storage location in the data store. For example, a block pointer stored in the block index 1825 may include a reference to a combination of: a file identifier (of the file providing the block), an offset (within the file providing the block), a length (of the block within the file), and a hash value identifier (e.g., an MD5 hash of the intended block for verification purposes). The block index 1825 further includes a block index cache 1827 used to load and persist a subset of block identifier cache entries which are likely to be used and accessed (e.g., indexing information for contiguous blocks of a particular file).

The block index 1825 further includes a bloom filter 1829 used for determining whether a particular file system block is located in the block index 1825. The bloom filter 1829 operates as a space-efficient probabilistic data structure that can be used to quickly determine whether a particular block is not present in the block index (and thus is not present in the data store or other source location). The bloom filter 1829 may be placed and loaded into memory or other fast access storage, and used as a mechanism to avoid checking the entire contents of the block index 1825, and to avoid the need to load the entire contents of the block index 1825 into memory (or repeatedly access the disk to check values in the block index 1825). The bloom filter 1829 may be configured to take a portion of the hash value of a block as a key, even assuming that a collision among multiple hashes is possibility. (A bloom filter is useful for determining whether the particular block is not present—because a no is always a no, and a yes is a "possibly". Thus, a collision among multiple hashes does not directly cause adverse consequences, because the "possibly" result will be checked when retrieved.) The bloom filter 1829 may be used to provide an indication of a match for the full contents of the block index 1825, or for portions of the block index 1825 (such as tracking whether a particular block is stored in the block index cache 1827 or another intermediate cache).

In an example, a particular block may be embodied by storage on a file system data store 1820 (e.g., within a hierarchical file system of an endpoint node), or storage within a versioned data store 1830 (e.g., within a block-based store of a store point node). Within the file system data store 1820, a particular file 1822 is constructed from one or more blocks 1824. Within the versioned data store 1830, a particular file version 1832 of a particular file is also made up of one or more blocks 1834. In some examples, the versioned data store 1830 may implement file storage deduplication techniques to remove or reduce the number of duplicate blocks and duplicate files. For example, file storage deduplication techniques may be extended across duplicate blocks of a file, duplicate blocks of a particular machine or file system, duplicate blocks of a particular user or user group, duplicate blocks of a particular shared collection, duplicate blocks of enterprises, or globally within the versioned data store.

As previously described with reference to FIG. 10A and FIG. 10B, the data store that is associated with a particular store point node 1005A, 1005B may include a versioned data store 1015. This versioned data store 1015 may be embodied by a block-based file system collection, providing storage for blocks in groups of blocks and meta data to track the blocks provided by the various file versions. For example, the versioned data store 1015 may provide storage of numerous blocks in a separate or consolidated versioned data store for a plurality of collections, users, devices, or enterprises.

Figure 19:
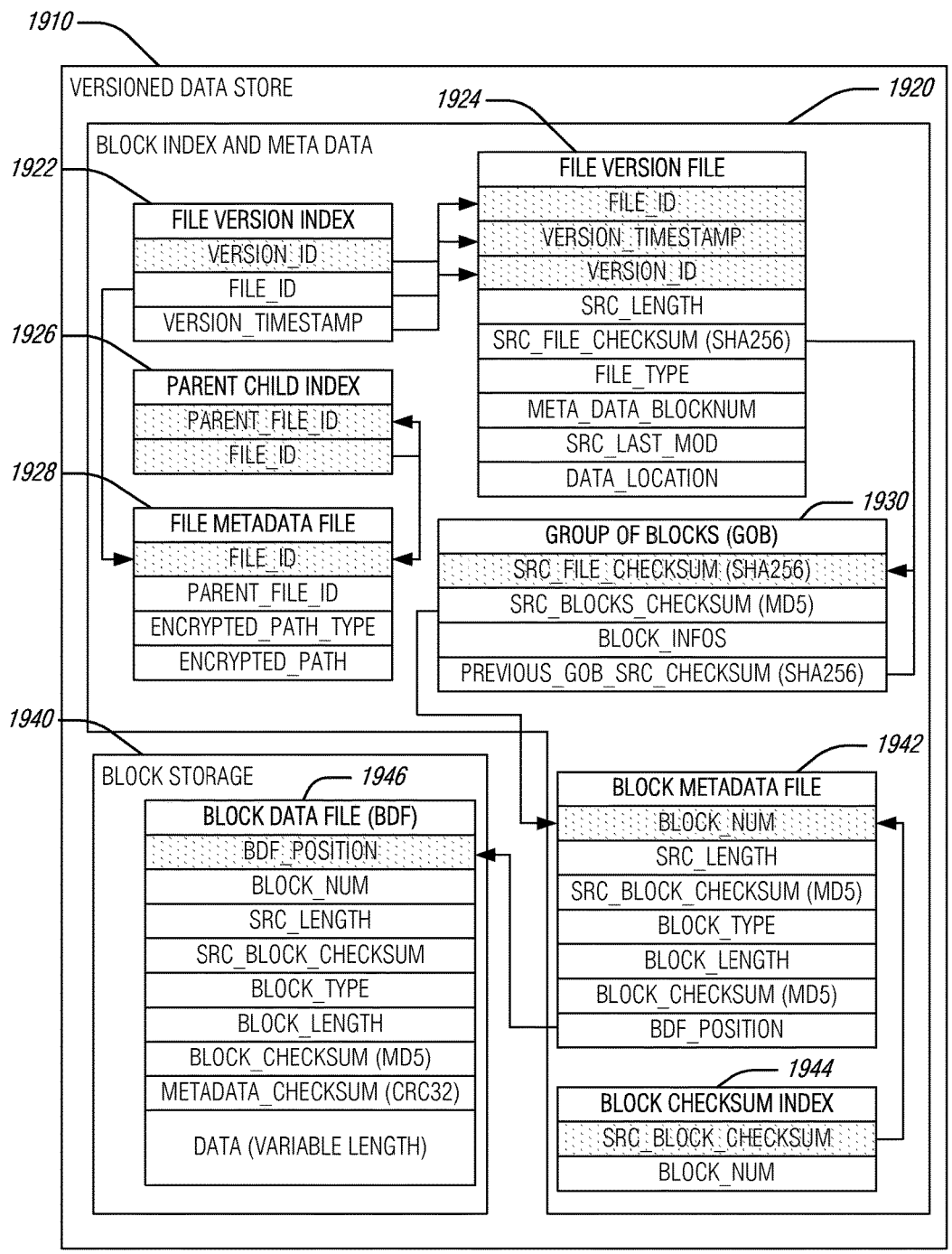
FIG. 19 is a diagram that illustrates a relational data schema for a versioned data store, according to an example.

FIG. 19 provides an illustration of a relational data schema 1900 for a versioned data store 1910, indicating the relationship and data fields among fields for versions of a plurality of blocks. The plurality of blocks may be tracked with entries in the block index and meta data 1920 as the blocks are stored within a block storage structure 1940. As shown in FIG. 19, the block storage structure 1940 at the versioned data store 1910 is embodied by an instance of a block data file (BDF) 1946 which includes a plurality of data attributes. For example, the BDF may be embodied as a 4 GB silo of raw data (with numerous BDFs used to store data for a particular collection). As also shown in FIG. 19, the block index and meta data 1920 at the versioned data store 1910 is represented by relationships among a file version index 1922, a file version file 1924, a parent child index 1926, a file metadata file 1928, a group of blocks index 1930, a block metadata file 1942, and a block checksum index 1944. Each of the file structures to store the data schema information may be implemented as a separate database (e.g., a separate LevelDB database). The relationship between various data fields in the block index and the meta data 1920 is further indicated in FIG. 19, although it will be understood that other data structures and schemas (including non-relational data structures) could be used to track and maintain similar meta data fields.

The use of block indexing and block tracking for individual files enables the block-level benefits of deduplication to be applied for synchronized data transfers between a variety of file systems, including in hierarchical file systems that store a plurality of duplicate files in multiple locations. In addition, when requesting data for a file synchronized via a data distribution mechanism, the data may be fulfilled at least in part with the use of individual blocks stored locally on a data store of a node. Because each node maintains a mapping of stored data files and data file blocks within its data store, an event for the data distribution mechanism can be fulfilled (and verified) from the data and meta data already maintained for the identical blocks on the node data store.

Figure 20:
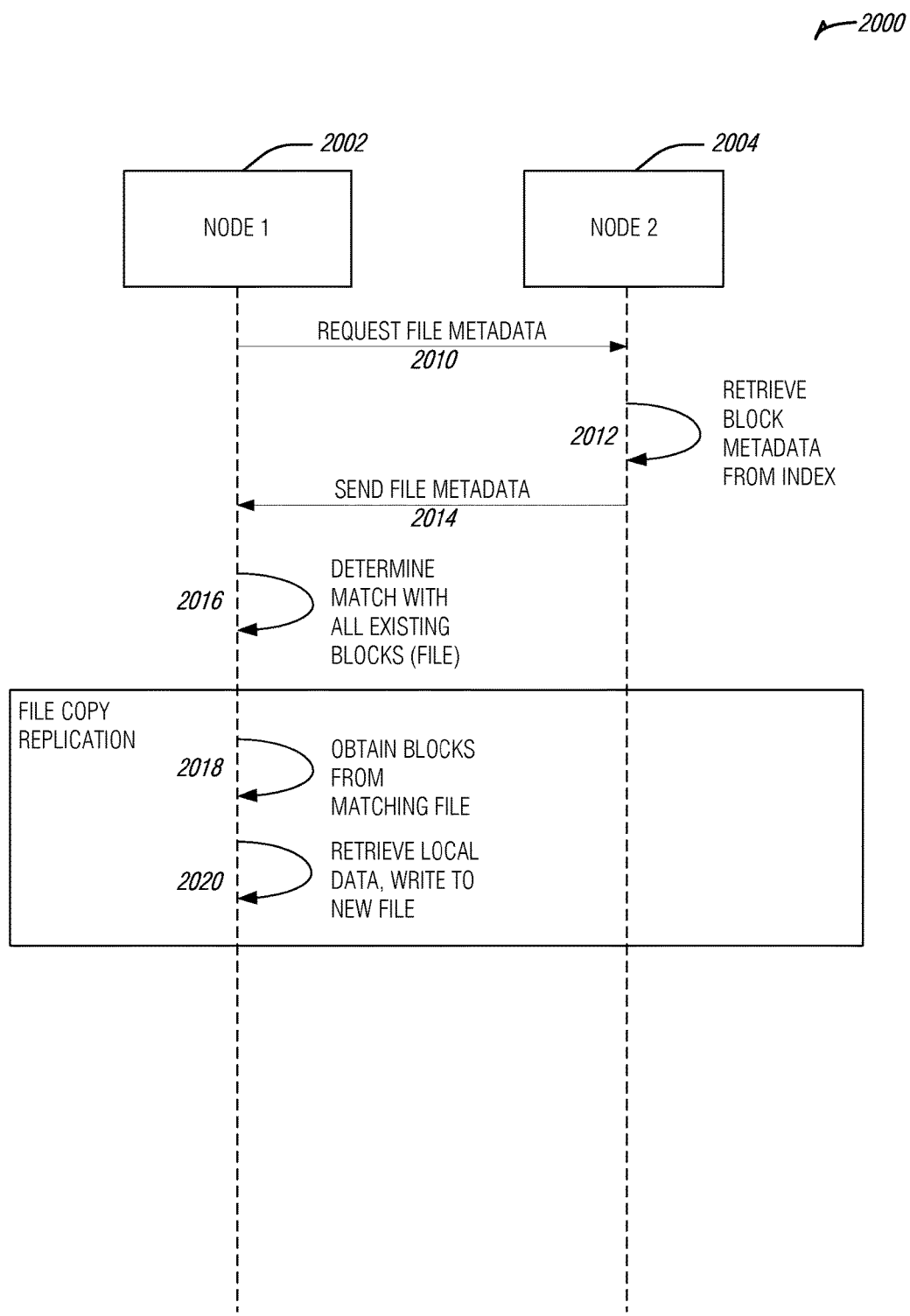
FIG. 20 is a diagram that illustrates processing for a file system event using block deduplication techniques for a file, according to an example.

FIG. 20 provides an illustration of a file system event sequence 2000 using block deduplication techniques for a file according to one example, for a scenario where all of the file blocks for a particular file are available and stored locally. As shown, a first node, Node 1 2002, intends to fulfill a synchronized file system event for the particular file, and Node 1 2002 requests file meta data (operation 2010) from a second node, Node 2 2004. Node 2 2004 performs operations to retrieve block meta data for the particular file from a local block index (operation 2012). Node 2 2004 then returns the file block meta data to Node 1 2002 for further processing (operation 2014), with the file block meta data containing an identification (e.g., hash or fingerprint keys of the various blocks, such as produced by an MD5 hash algorithm) of all blocks for the desired file. Node 1 2002 can determine, from the received file meta data, that it already has a matching file with all matching blocks (operation 2016) (or, alternatively, that all matching blocks exist on the file system but are sourced from more than one file). If all blocks from the desired file match entries in the block index of Node 1 2002 (e.g., from a duplicate file on the local file system), then the file copy replication process will operate to locally replicate the file. This replication involves obtaining blocks from the matching file indicated by the block index (operation 2018) and retrieving and writing the blocks to the new file (operation 2020).

Figure 21:
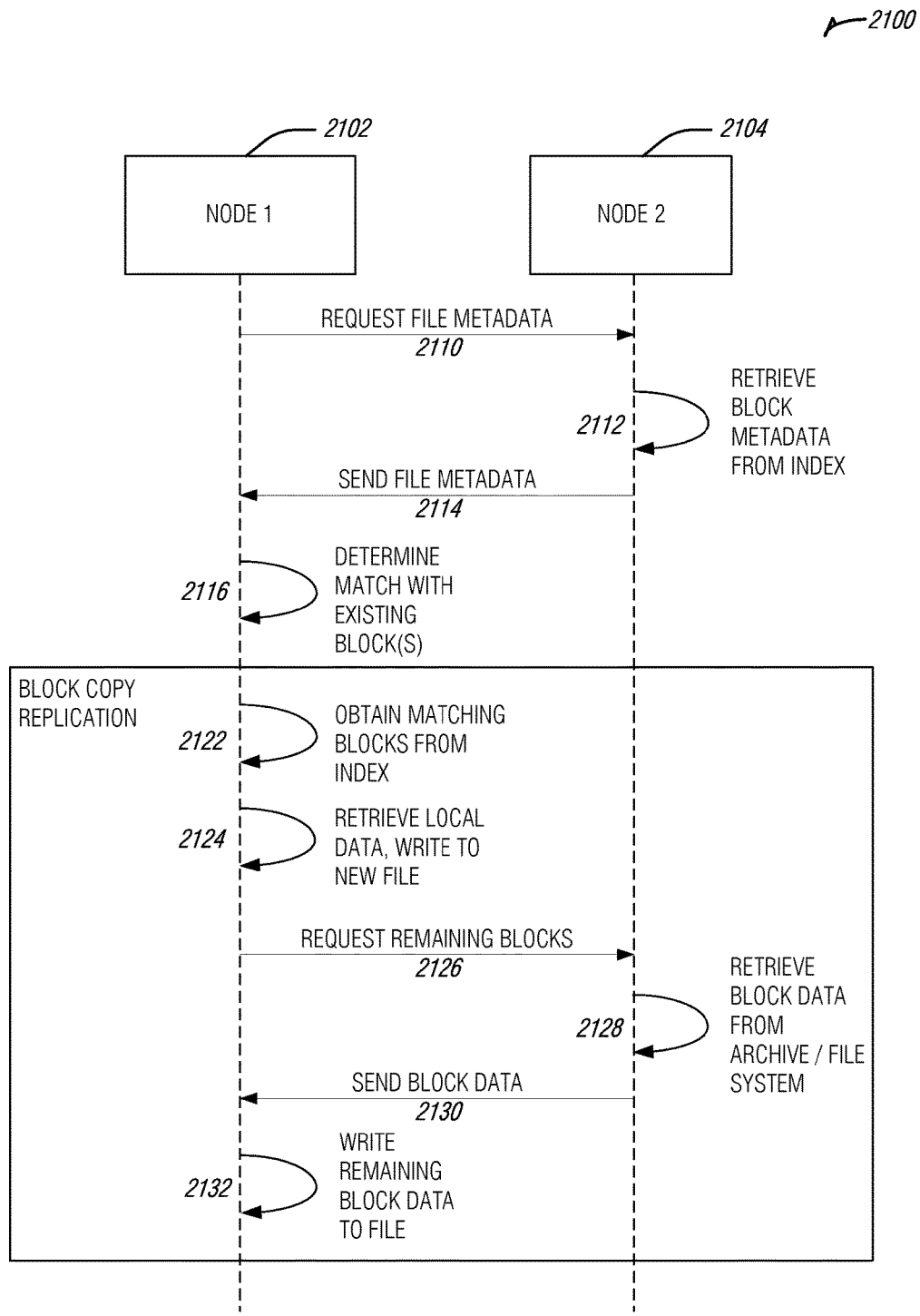
FIG. 21 is a diagram that illustrates processing for a file system event using block deduplication techniques for a transfer of file blocks, according to an example.

FIG. 21 provides an illustration of a file system event sequence 2100 using block deduplication techniques for transfer of file blocks according to one example, for a scenario where some (but not all) of the file blocks for a particular file are stored locally. As shown, a first node, Node 1 2102, intends to fulfill a synchronized file system event for the particular file, and Node 1 2102 requests file meta data (operation 2110) from a second node, Node 2 2104. Node 2 2104 performs operations to retrieve block meta data for the particular file from a local block index (operation 2112). Node 2 2104 then returns the file block meta data to Node 1 2102 for further processing (operation 2114), with the file block meta data containing an identification (e.g., hash or fingerprint keys of the various blocks, such as produced by an MD5 hash algorithm) of all blocks for the desired file. At this point, Node 1 2102 can determine from the file meta data that it already has one or more matching blocks (operation 2116). The file copy replication process will operate to locally replicate as much of the file as possible, by determining from the block index whether the matching blocks are stored locally (operation 2122), and retrieving and writing the locally stored blocks to the new file (operation 2124). The file copy replication process will also replicate the remaining blocks at Node 1 2102 by requesting the remaining blocks from another node (operation 2126), retrieving the block data at Node 2 2104 from a data store (e.g., an archive or file system data store) (operation 2128), and receiving the block data for the particular file from Node 2 2104 (operation 2130). Node 1 2132 will then write the remaining block data to the file (operation 2132). The reconstructed file(s) may be subsequently validated with a hash algorithm (e.g., a SHA-256 checksum of the entire file) for post construction accuracy. (It will be understood that the file request and write operations may occur in a different sequence than that depicted in FIG. 21, as operations to write synchronized data may occur prior to retrieving local data.)

Figure 22:
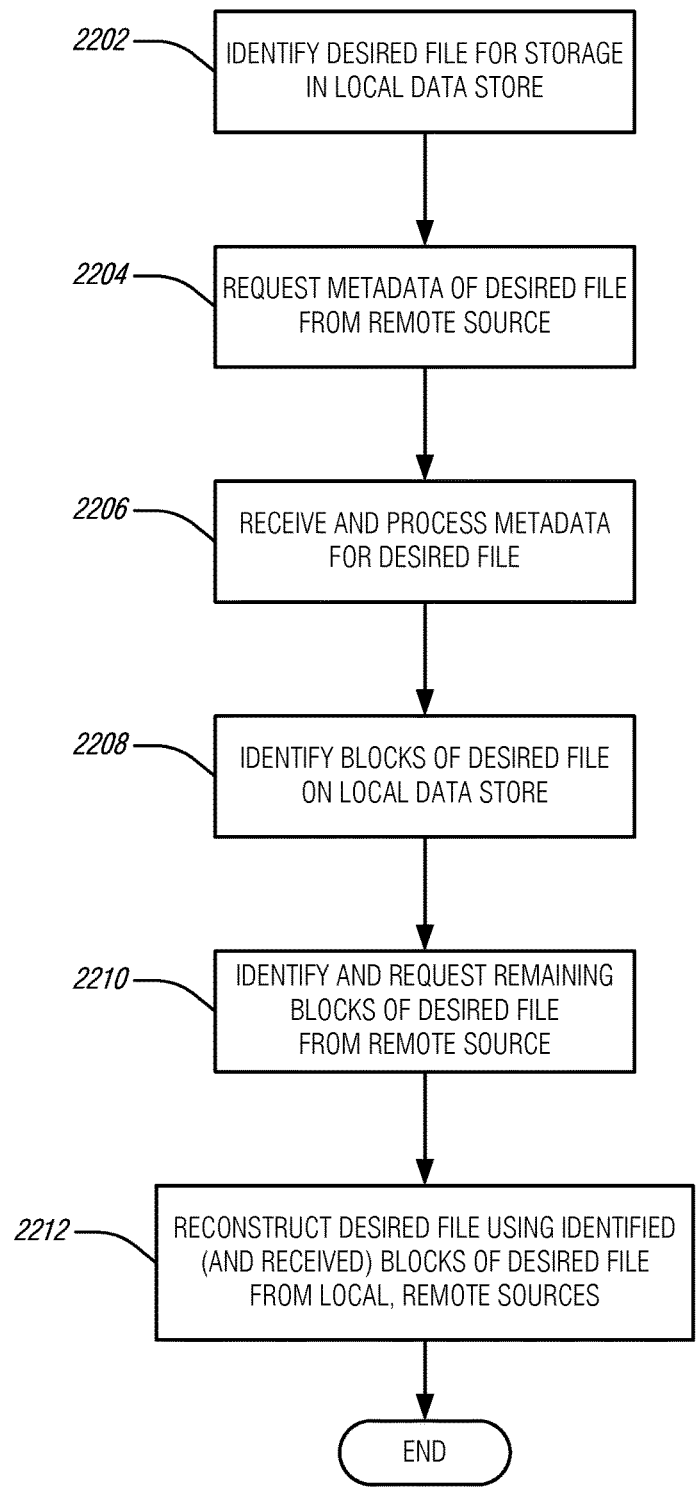
FIG. 22 is a flowchart that illustrates client-side node operations for performing a file replication using block deduplication techniques, according to an example.

FIG. 22 depicts a flowchart 2200 of node operations (e.g., client or endpoint node operations) for performing a deduplicated file replication according to one example. These operations may be performed in the system 100 implementing a data distribution mechanism, for example, at a destination node in response to a synchronized event stream indicating information for a particular file.

As shown in flowchart 2200, the desired file for storage is identified in a local data store or data source of a node (operation 2202). For example, this desired file may be identified as part of an event received from a distributed data synchronization collection, or may be a particular version of the file selected by the user for restoration. The node then requests the meta data of the desired file from a remote source, such as another node or a store point node (operation 2204). Meta data for the desired file is then received from the remote source and processed (operation 2206). For example, this meta data may indicate the hash values or other unique (or nearly-unique) identifiers of individual blocks of the desired file. The meta data then can be used by a receiving node to select the blocks that the node needs in order to reconstruct the file.

The desired file for storage may be reconstructed from the use of locally available blocks and remotely received blocks. Locally available blocks may be identified on a local data store (operation 2208), such as with use of a bloom filter, predictive data element, or other cache stored in memory that provides an indication of whether the blocks are indexed (e.g., exist in a block index) in a location of a local data store. The locally unavailable blocks may be identified and requested from a remote source (operation 2210). The combination of the locally identified and remotely identified and received blocks then can be used to reconstruct the desired file (operation 2212).

Figure 23:
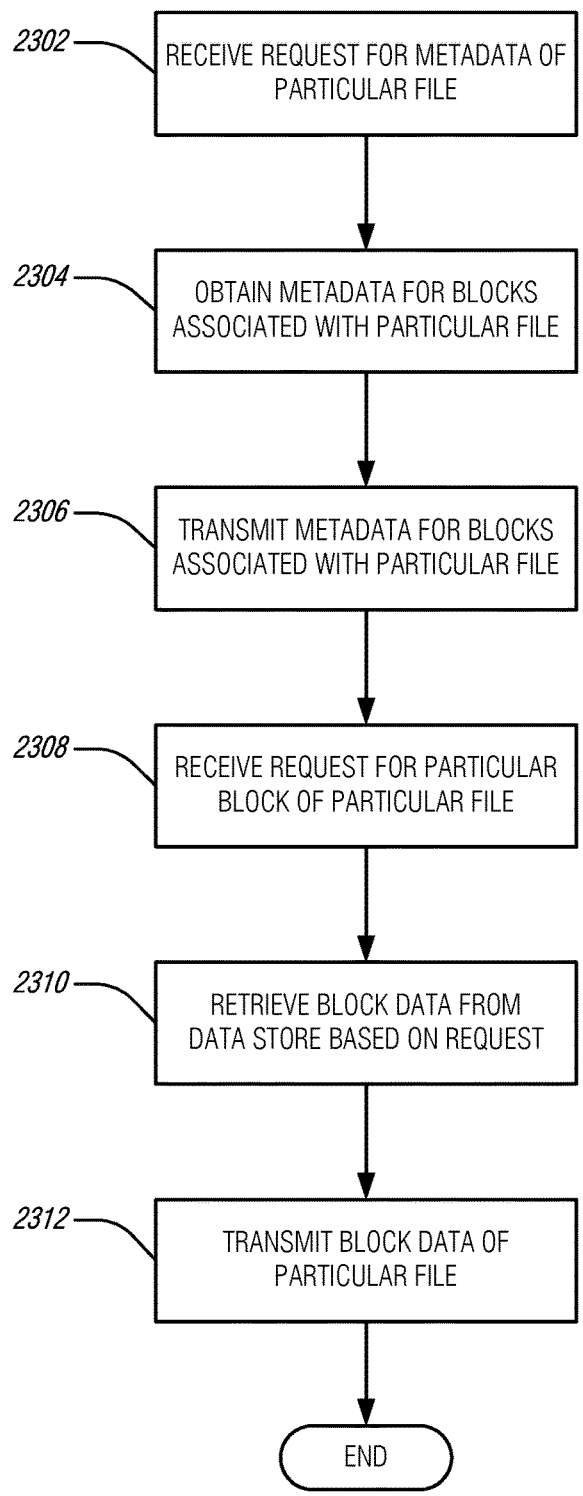
FIG. 23 is a flowchart that illustrates serving-side node operations for performing a file replication using block deduplication techniques, according to an example.

FIG. 23 depicts a flowchart 2300 of node operations (e.g., server or store point node operations) for providing data for a deduplicated replication of a particular file according to one example. These operations may be performed in response to a request for a particular file that is designated to be distributed to a destination node in the distributed data synchronization architectures described herein. In some examples, multiple nodes may provide the operation of the flowchart 2300 (for example, with a first node providing meta data for a particular file in operations 2302, 2304, 2306, and a second node providing block data for the particular file in operations 2308, 2310, 2312).

As shown in flowchart 2300, a request for meta data of the particular file is received (operation 2302). This request, if received by a store point node, may indicate the particular version to be retrieved. The request is processed to obtain meta data for the blocks associated with the particular file (operation 2304). The meta data for the blocks associated with the particular file is then transmitted to the requesting node (operation 2306).

Further operations to provide one or more blocks of the particular node include the processing of the request for the blocks indicated by the meta data. This may include the receipt of the request for one or more particular blocks of the desired file (operation 2308), and retrieving the block data from a data store based on the request (operation 2310). This processing may also involve the use of a bloom filter, other predictive data element, or other cache stored in memory to determine whether all of the blocks are already stored or available at the data store. The block data of the particular file is then transmitted to the requesting node (operation 2312).

The presently described techniques for block identification and deduplicated file transfers may also be applied in connection with the transfer of versioned files. For example, a newer version of a file that exists on an endpoint node may be constructed from unchanged locally available blocks and changed remotely available blocks, thus only requesting a transfer of the changed blocks. Further, requests for versioned file blocks for a particular collection may be obtained from a store point node or other participating node in a system implementing a data distribution mechanism.

The division or "chunking" of the file into various blocks may be based on any number of techniques or algorithms. In one example, a Rabin algorithm is used to identify boundaries of potential blocks in a predictable yet variable sized manner. (The block size provided to the Rabin algorithm may vary based on implementation or file sizes, but may include an average of 32K for large files, for example). Once the blocks are divided, the blocks can then be individually fingerprinted with a hash algorithm (such as MD5), and this hash algorithm value serves as the identifying key of the block that is exchanged in meta data for a listing of blocks of the desired file.

In further examples, the deduplication of blocks at storage nodes (such as store point nodes) may be performed in connection with duplication among multiple collections of data (e.g., plans). These may be used to facilitate efficient file transfer operations in a number of file synchronization scenarios. For example:

In a scenario where a subject file is moved (or renamed) to result in a change of the membership of the subject file from a first collection to a second collection, a node may perform operations to access and copy the underlying blocks as indicated by the local block index. As will be evident, in a file system move or rename operation, the blocks of the subject file do not change and are available on the local data store. Thus, operations may be performed so that a node retrieves no blocks from a remote node, but instead copies blocks available to the node in the local data store to recreate the subject file.

In a scenario where a subject file is added to a collection, but where existing blocks of the subject file already exist locally and are indexed (e.g., the blocks are indexed as part of another local collection), the node may request only missing blocks to fulfill the file system events for the collection. In this manner, the node may request as few as one new block for addition of the subject file to the collection.

In a scenario where different collections use different encryption keys, the use of a multiple-collection block index at the node allows retrieval and use of blocks among the different collections at the same node. This is particularly useful when creating identical files where all blocks for the file exist locally (but may be stored or associated within another collection). Thus, the use of the block index enables identification and retrieval of blocks from across collections in the original data store data, regardless of key constraints on the collection.

In a scenario where data files from a node are provided to a versioned data store, the use of deduplicated block transfers enables a reduction in bandwidth and processing to store information in an archived data collection. In this fashion, the deduplicated file transfer will be enabled to deduplicate blocks according to version history (and not require transfer of blocks that are identical to other version(s) of the blocks already stored). In a similar fashion, if the destination has access to the keys, the deduplicated file transfer will be enabled to deduplicate blocks across plans that share the same key (such as personal and archive collections). The storage of the block at the version data store, with one instance within an archive, satisfies the data needed for all plans within the archive.

Figure 24:
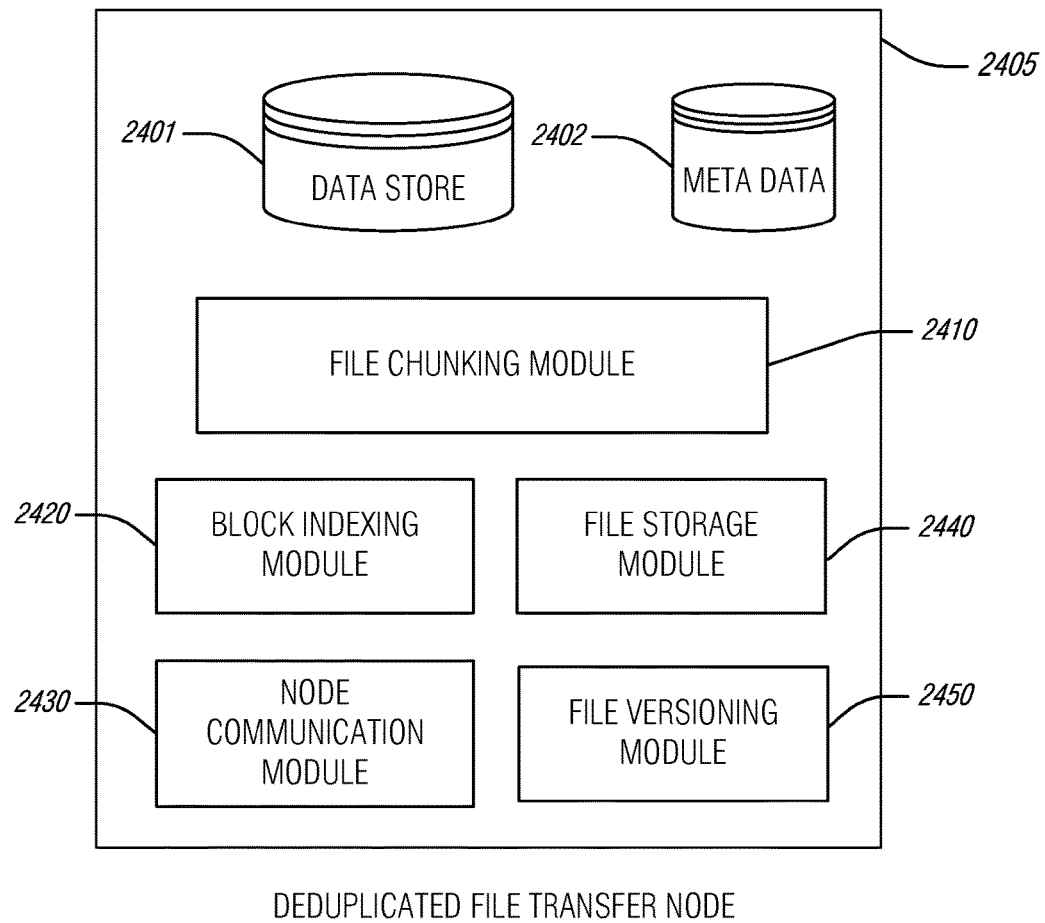
FIG. 24 is a block diagram that illustrates a system configured for performing a file replication using block deduplication techniques, according to an example.

FIG. 24 is a block diagram 2400 that illustrates a system including a node 2405 configured for performing a file replication using block deduplication techniques, according to an example. The modules described in FIG. 24 may implement the deduplicated file transfer functions as described herein and the modules may be in addition to, or instead of the modules described in other sections in this specification. As shown, the node 2405 includes a data store 2401 storing the data files (e.g., in a hierarchical file system), and a meta data index 2402 including information on the data files. The node 2405 includes a file chunking module 2410 that is configured to divide the file into blocks (chunks), to produce blocks with use of a Rabin algorithm or other variable size algorithm. The node 2405 further includes a block indexing module 2420 configured to perform block indexing to identify and track the various blocks in the data store 2401, including maintaining information in the meta data index 2402. The node 2405 further includes a node communication module 2430 configured to initiate (or fulfill) data requests with other nodes in connection with deduplicated block transfers among the nodes, a file storage module 2440 configured to perform local storage of the various transferred blocks into files, and a file versioning module 2450 configured to manage versioning of the files (and to request or transfer versioned data blocks in connection with the retrieval or storage of blocks from particular file versions).

Anticipatory Storage

As already noted with respect to FIG. 5B, some nodes may be limited in storage space. Other nodes may be limited in network bandwidth, processing power, or other characteristics. As such, to save resources, a particular node may store the contents of only a subset of the elements of the collection on local storage of a node. As previously noted, the set of elements of the collection that is locally stored is called the locally available set of elements. In examples in which the available set of elements consists of a subset of elements in the collection, the system must determine which elements of the collection to keep locally available.

In some examples, the locally available set of elements may be the set of elements of the collection that the data distribution system determines to have the highest probability of being accessed in the future by the user of the node. Elements in the collection that are not in the set of locally available elements may be referred to herein as non-locally available elements. Unlike for members of the locally available set, the actual contents of non-locally available elements may not be stored in local storage of the node, however meta data corresponding to the non-locally available elements (e.g., name, size, and the like) may be stored to allow users to select and retrieve the contents should the user desire.

Both locally available and non-locally available elements may be accessible to users through a user interface corresponding to the data distribution system. When a user selects a locally available element the user's interaction experience is identical to a locally stored file system element because it is locally stored. When a user selects a non-locally available element, the node first obtains it over a network from another node or server in the data distribution system. Because the non-locally available element is not locally stored, interacting with a non-locally available element requires a network connection.

This predictive storage system thus achieves a balance between consumption of local resources and timely access of important elements in the collection by keeping some items that are likely to be used in local storage for convenient access and allowing users to access the remaining items over a network, thus saving local storage space and memory usage. This is in contrast to systems that store all contents of all shared items at all times (which may utilize enormous storage resources) and systems that only provide meta data about elements and retrieve those elements on-demand from users (which require a network connection at the time the user desires the content).

In order to determine the locally available set, the system may employ predictive algorithms that may utilize one or more signals which indicate a likelihood that the user will interact with a particular element of the entire collection in the future. The signals may include the usage history of elements in the collection, user interest information, user context information corresponding to the usage history, the current context of the user, and the like.

The elements in the locally available set may vary over time as usage history, user preferences, context, and device characteristics change. For example, elements that have fallen into disuse may be demoted from the locally available set into the non-locally available set, and elements used frequently in the recent past may be promoted from the non-locally available set to the locally available set. An element that is demoted from the locally available set may be removed from local storage of the node. In addition, the free space of a device may vary over time. For example, as free space of the device decreases, the system may shrink the size of the locally available set to free up additional space for other user application. Likewise, if the free space of the device increases, elements from the non-locally available set may be promoted to the locally available set.

Figure 25:
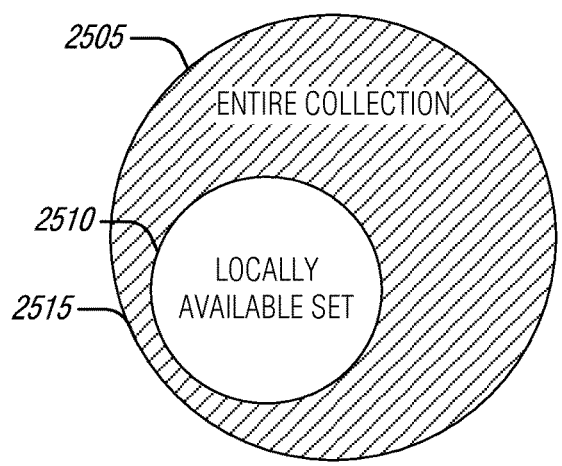
FIG. 25 is a set diagram illustrating elements of a collection compared to elements of a locally available set, according to an example.

FIG. 25 is a set diagram 2500 illustrating the elements of the collection compared to elements of the locally available set according to some examples of the present disclosure. FIG. 25 shows the entire set of elements of a collection represented by the entire area of the circle 2505. Locally available set 2510 is a subset of the entire set of elements in the collection. The non-locally available set of elements 2515 is shown as the elements in the collection that are not in the locally available set and is represented by the diagonal stripes.

Figure 26:
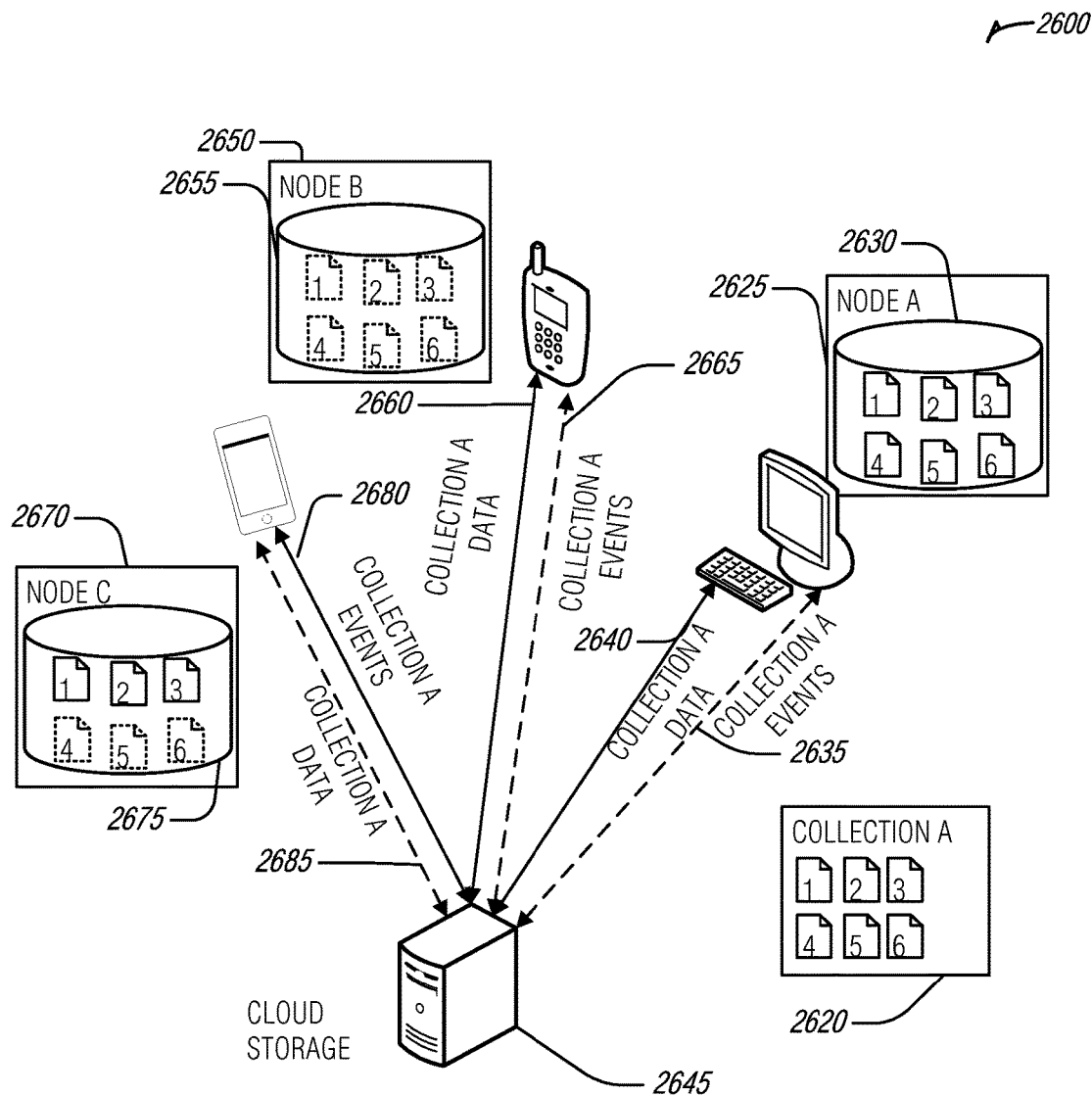
FIG. 26 is a system diagram illustrating a data distribution system utilizing predictive storage, according to an example.

FIG. 26 is a system diagram illustrating a data distribution system utilizing predictive storage according to some examples of the present disclosure. The file system elements of collection A are files 1-6 shown at 2620. In some examples, certain types of nodes may store and synchronize all elements of the collection. An example of such a node might be a desktop computer, such as Node A 2625. Node A, for example, includes data store 2630 with all six files stored. The locally available set for Node A 2625 thus constitutes the entirety of collection A. The non-locally available set for Node A 2625 has no members. Node A 2625 receives both event data 2635 and file system data 2640 for collection A. For example, an event may notify Node A 2625 that file 6 has been added to collection A. Node A 2625 may download file 6 from cloud storage 2645. In other examples, the events and data shown in FIG. 26 that are being exchanged with the cloud storage 2645 may be exchanged with another peer node. In some examples Node A 2625 also stores events corresponding to files 1 through 6 on data store 2630. In these cases, nodes that store all elements of a collection may not run the prediction algorithms that predict the set of elements that a user is likely to need in the future.

Node B 2650 for example may be a mobile device with limited functionality. Node B 2650 may have a limited data store, or was not configured by a user to store any of the six files of the collection. Instead, Node B 2650 monitors information about collection A, such as received events data 2665. For example, Node B may store in data store 2655 the events corresponding to elements of the collection, but not the elements themselves. This is represented by the dashed line representation of files one through six in data store 2655. In this example, the locally available set is empty and the non-locally available set constitutes the entirety of collection A. If the user of Node B 2650 wishes to interact with any one of files one through six, Node B 2650 may download the file from the cloud storage 2645 or from another node that has the desired file. For example, messages including collection A data 2660 may include portions of one or more of files one through six that were sent in response to a request for one or more of the files by user of Node B 2650.

Node C 2670 for example may be a mobile device with more advanced capabilities than Node B 2650. Node C has a limited data store 2675 in that is able to, or configured to, store only files 1-3 from the collection in data store 2675. Thus the locally available set constitutes files 1-3 and the non-locally available set constitutes files 4-6. Each node in the data-distribution system may have different characteristics that determine how many elements from the collection are in the locally available set and which elements from the collection are in the non-locally available set. For example, data store 2675 on Node C may be larger than data store 2655 of Node B, enabling additional local storage of elements in the collection (and thus an increased locally available set). In other examples, user preferences for Node C may allocate more space to collection A than the user preferences for Node B 2650 allocates to collection A on Node B 2650. Node C 2670 receives events data 2665 for elements in the collection and data for files 1-3. If the user of Node C 2670 wishes to interact with files 4-6, the node may obtain one or more of those files if the node has network connectivity. In this instance, if there is not enough storage space on Node C to store a selected file from the non-locally available set, one of the files currently stored in local storage (e.g., files 1-3) may be overwritten with the selected file.

As already noted, in order to determine which elements of the collection are in the locally available set and which elements are in the non-locally available set, the system may utilize one or more predictive algorithms. These algorithms determine which members of the collection a user has a high probability of interacting with during a future timeframe. The predictive algorithms may utilize one or more signals to make this determination. Interacting with an element of the collection may include opening the element, editing the element, modifying the element, deleting the element, moving the element, or the like. The future timeframe for the prediction may be any desired future timeframe. Examples include the timeframe extending from the time the prediction is calculated to a predetermined amount of time afterwards. The predetermined amount of time may include infinity (no time limit) or other timeframes. For example, the algorithms may determine which members of the collection has the highest probability of a user interaction in the next hour, the next two hours, the next day, the next week, the next month, and the like.

Signals (e.g., factors), as used in the context of predictive storage, are data that is collected or observed by the data distribution system and that may be used to determine a locally available set. The term signal is not used in the sense of a transmitted signal or carrier wave (although the signal may be communicated as such), but rather a piece of information that may indicate that a user is more or less likely to access an element of the collection in a particular timeframe. These signals may include the usage history of the elements in the collection, user interest information, information on user context associated with the usage history, information on the current context of the user and the like. The predictive algorithm may use multiple different types of signals and each different type may be weighted or used differently. These signals may relate to the user of the node, relate to all users of the collection, or both. In some examples, certain signals may relate to only the user of the node and other signals may relate to all users of the collection. For example, if a particular element is opened frequently by other users in the collection, it may be more likely that the particular user of the node will open that element.

Usage history signals may include past interactions with an element. This may be determined by analyzing events on the event stream. As already noted, the system may utilize one or both of the usage history of the specific user of the node and the usage history of other users in the collection. In some examples, prior usage history corresponding to the user of the node may have greater predictive weight than the prior usage history of other users of the collection. Using history of the other users of a collection allows the system to move elements into the locally available set that the user of the node has not interacted with in the past, but is likely interested in based upon interest of other users of the collection.

User context information may be any information about the circumstances of a user. Context information may include the date, time, location of the user device, a user's schedule, a user's biometric information, and the like. User context information may be correlated to usage history to provide the context around a user's (either the node user or any other user in the collection, or both) interaction with the elements in the collection. In this manner, user context information may correspond to past usage history. For example, the date of a past interaction, the time of a past interaction, the location of a past interaction, and the like may allow the prediction algorithms to make accurate predictions about which elements a user is likely to interact with given the user of the node's current context. For example:

Time of day: at certain times of day a user may be more likely to interact with certain elements of the collection. For example, a user may be more likely to interact with a bedtime story at night. If the system detects a pattern of interaction with particular elements of the collection at certain times of day, it may move those elements to the locally available set just before the particular time of day.

Date: certain elements may be more likely to be interacted with on certain dates, or seasons. For example, a user may be more likely to interact with a holiday recipe around the time of the holiday. If the system detects a pattern of interaction with particular elements of the collection at certain dates, it may move those elements to the locally available set just before the particular date.

The user's schedule: elements of a collection may relate to certain events of the user. For example, documents associated with a scheduled meeting are likely to be interacted with during the meeting or just before. If the system detects that particular elements of the collection correspond to the user's schedule, it may move those elements to the locally available set just before the particular date.

A physical location: certain documents may be more likely to be interacted with when the user is in a certain physical location. For example, a user may be more likely to interact with a digital ticket to an event when the user is near the stadium. If the system detects that particular elements of the collection correspond to a particular event or location, it may move those elements to the locally available set just before the particular event or just before the user travels to that location.

User interest information may include signals which indicate topics or elements that a user is interested in. For example, the user may explicitly indicate certain files that are to be maintained in the locally available set. In other examples, the system may learn topics the user is interested in and score elements of the collection that are associated with that topic higher than other elements. The system may analyze the contents of past elements that a user has interacted with to determine topics associated with those collection elements. Collection elements that score highly for topics that were interacted with most in the past may then be more likely to be moved to the locally available set. These calculations may be time weighted such that collection elements relating to topics recently accessed by the user would be rated more highly than collection elements relating to topics accessed by the user further back in time. Determining topics of elements of the collection may be done automatically using algorithms such as Latent Dirichlet Algorithms (LDA), or manually through document tagging. Using latent topics to derive interests allows the system to move elements into the locally available set that the user of the node has not interacted with in the past based upon a predicted interest.

Other sources of information may also or instead be used to deduce a user's interests. For example, skills information associated with a social networking account may relate to topics. Job titles may relate to topics of interest (e.g., if a person is a computer programmer, elements which relate to computer programming may be scored higher). Documents and topics discussed on social media websites and blogs frequented by the user may be scored higher. A user may provide access to an email, social networking, or other user profile account which may be analyzed for topics of interest. Text may be analyzed for topics using algorithms such as LDA or manually through tagging.

The signals used in the predictive algorithms may be determined from a variety of sources. For example, such sources may involve internal sensors on the node or external sensors communicatively linked to the node. Example sensors may include global positioning system (GPS) sensors, accelerometers, biometric sensors, cameras, microphones, and the like. Other signals may be determined based upon communications with other applications on the node, or other applications on other nodes or other computing devices. For example, a user's schedule may be obtained through communication with a calendar application (either on the node or another computing device). A user's social networking data may be accessed by accessing a social networking service through an application programming interface, and the like. Usage signals may be determined based upon event data such as event data 2635, 2665, and 2680.

Figure 27:
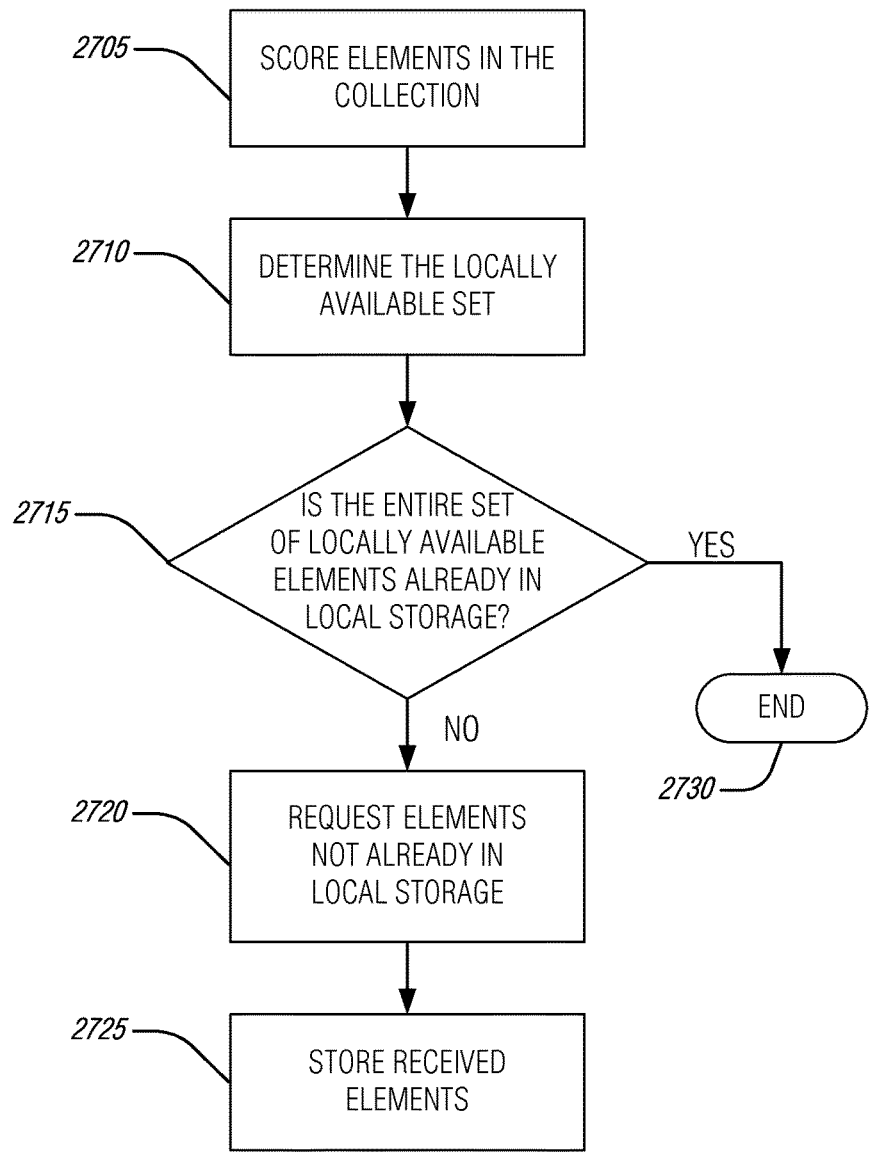
FIG. 27 is a flowchart of a method illustrating a data distribution system utilizing predictive storage, according to an example.

Turning now to FIG. 27, a flowchart 2700 of a method illustrating a data distribution system utilizing predictive storage according to some examples of the present disclosure is shown. As illustrated, a predictive algorithm may score elements in the collection based upon an assessment of how probable the user is to interact with that element in the future (operation 2705).

In an example, the score for each element may utilize one or more of the following formulae which utilize one or more signals:

Subscore$A$=100−((the number of days since the element was last opened by the user)*0.5)

Subscore$B$=100−(the number of days since the element was last explicitly retrieved by the user)

Subscore$C$=75−(the number of days since the element was last modified by the user)

Subscore$D$=50−(the number of days since the element was last modified by other users of the plan).

In one example, one or more of the above formulae are utilized in combination. For example, the subscores may be added together to form a total score:

Total score for an element of the collection=weight $A$*|Subscore $A$|+weight $B$*|Subscore $B$|+weight$C$*|Subscore $C$|+weight$D$*|Subscore $D$|.

weightA, weightB, weightC, and weightD may have a value of one to weight all the subscores the same, or may be weighted differently. One or more of weightA, weightB, weightC, and weightD may have a value of zero to nullify any contribution from that signal. The weights may change dynamically over time in response to additional usage history information. For example, if the user is consistently selecting elements of the collection that are in the non-locally available set as opposed to the locally available set, the system may compare the scores for each subscore between the locally available set and the recently selected items on the non-locally available set and adjust the subscores such that the recently selected items from the non-locally available set would have been selected. The constant values (e.g., 100, 75, 50, 0.5) are simply examples to aid the reader's understanding and one of ordinary skill in the art with the benefit of this disclosure will understand that other values may be possible and are within the scope of the disclosure. In some examples, the constants may change depending on the timeframe that the prediction is based upon. For example, if the prediction is made such to predict in the near future, the constants may be shrunk so that usage history in the distant past drops out of the prediction faster (e.g., it takes less time for a previous interaction to drop to zero in the calculations).

Other formulas and weightings are also possible and within the scope of the present disclosure. For example, machine learning algorithms may be used to score the elements in the collection by learning usage patterns and scoring elements based upon a calculated probability that the user is likely to interact with each element. For example, a predictive model may be built using past signals and may output scores for elements of the collection based upon new signals. The scoring may also be modified or manipulated by an end user or network administrator according to user preferences, network policies, and the like.

Signals used to construct the model may be specific to a collection, or may be from all collections the user is a member of, or may be from all user data system wide across all collections. In some examples the model may be built by an individual node for use on that node. In other examples, nodes such as the authority, a cloud node, or a node with sufficient processing power may build the model. The model may then be distributed to one or more nodes participating in the collection. In other examples, the node or server which builds the model may keep the model and make the predictions for each node and inform each node on which files to download based upon event streams and other signals that may be communicated to the node that builds the model.

Once the model is constructed, various signals may be collected by the nodes and used to make predictions using the model by scoring the elements of the collection. Example machine learning algorithms that may be used may include neural networks, decision tree algorithms, linear regression, logistic regression, support vector machine, Bayesian networks and naïve Bayesian algorithms, K-nearest neighbors, and the like. In some machine-learning algorithms, a score may be a binary—yes or no—that is, the binary result answers the question: given the signal data, is this file likely to be accessed by the user in the future? In these examples, the score may be binary.

In other examples, a plurality of different algorithms may be combined to produce the score. Each algorithm's individual score for an element may be normalized, weighted, and combined with scores from the other algorithms. For example, each item score may be generated by calculating a first score from a neural network and a second score from a decision tree for each item and the calculating a final score for the item by summing the first and second scores. As noted, the first score may be weighted with a first value and the second score may be weighted with a second value.

Once the scores for the elements in the collection are determined (operation 2705) the set of locally available elements may be chosen based upon the scores assigned to elements of the collection (operation 2710). Which elements and how many elements to choose may involve a selection algorithm. The selection algorithm may include as input the node's device characteristics, user preferences, and the scores for the elements in the collection.

Device characteristics may include a size for the locally available set. For example, the system may take the top N scoring elements (where N is a predetermined number that is greater than or equal to zero). In other examples, the system may take the top N % of elements (where N is a predetermined percentage that is greater than or equal to zero). In yet other examples, the system may have a size quota that specifies the maximum size that the locally available collection can take up on local storage. The size for the locally available set may be set by user preferences, the free space available on local storage of the node, or a combination of both. For example, a user may specify that the locally available set may take up a percentage of available local storage.

The selection algorithm may start at the highest scoring elements and work down to the lowest scoring elements until the quota is filled. In some examples, if the quota has not yet been met, but the next highest scoring element will exceed the quota if stored in local storage, the system may continue checking elements in descending order of score for the highest scoring element that fits under the quota. For example, if the quota is 500 MB, the locally available set is currently at 498 MB, and the remaining items in the non-locally available list are as follows:

Directory "x" with a size of 6 megabytes (MB) and a score of 74;

File "y" with a size of 1.5 MB and a score of 67;

File "z" with a size of 1 MB and a score of 65.

In this example, the system will bypass directory "x" as it exceeds the storage quota and will instead select file "y" for local storage as it is the next highest scoring element.

In still other examples, a maximization function may seek to maximize the combined scores of the elements in the locally available set given the constraint of the quota size. Thus, the elements of the collection may be:

Directory "x" with a size 6 MB and a score of 74;

File "p" with a size of 5 MB and a score of 73;

File "y" with a size of 1.5 MB and a score of 67;

File "z" with a size of 1 MB and a score of 65;

If the quota size is 7 MB, rather than selecting directory "x" and file "z" for a combined score of 139, the system may select file "p" and file "y" which lead to combined score of 140.

Once the set of locally available elements is determined, the system may determine whether any elements of the locally available are already in local storage (operation 2715). For example, if the locally available set is empty (e.g., the node just joined the collection), or if an element in the collection was newly promoted to the locally available set, one or more elements may need to be retrieved. If no elements need to be retrieved, the present flow ends (at operation 2730). If new elements need to be obtained the node may request the elements not already in the node's local data store (operation 2720). The new elements may be stored (operation 2725). If elements have been demoted from the locally available set to the non-locally available set, the demoted elements may be removed from the local data store and replaced by the newly received elements.

The method described in FIG. 27 may be executed or deployed when the device first adds or joins the shared storage plan. In addition, the method may be executed or deployed at regular time intervals or in response to predetermined conditions. For example, if the algorithms that are used calculate scores based upon a granularity of days (e.g., the number of days since the last access, since creation, etc. . . . ), then the scores may be calculated and evictions may happen daily. If the algorithms use a finer granularity (e.g., hours), then the periodicity between score calculations and evictions may be more frequent (e.g., the periodicity may match the granularity). In some examples, the methods illustrated in FIG. 27 may be executed or deployed in response to receiving an event indicating a change in an element of the collection.

The method of FIG. 27 may be executed on the nodes themselves, and indeed, the algorithms used may be customized based upon each node. For example, on a mobile device such as a smartphone, the limited screen display and the more difficult text entry may make editing more difficult. Therefore, users of these devices may use the device more for viewing content and less for editing content. In these examples, content that is viewed more often may be a more powerful signal that the user is server nodes, or on one or more peer clients.

In some examples, one or more operations of FIG. 27 may be performed by one node for a different node. For example, a mobile device may have limited processing power and limited battery available for the necessary computations to calculate the set of nodes that should be locally available. Thus a more powerful node with better power supply (e.g., a store point node, a peer node, or the like) may calculate the set of locally available elements or any other operation of FIG. 27. Example nodes include peer nodes, server nodes, and the like.

Figure 28:
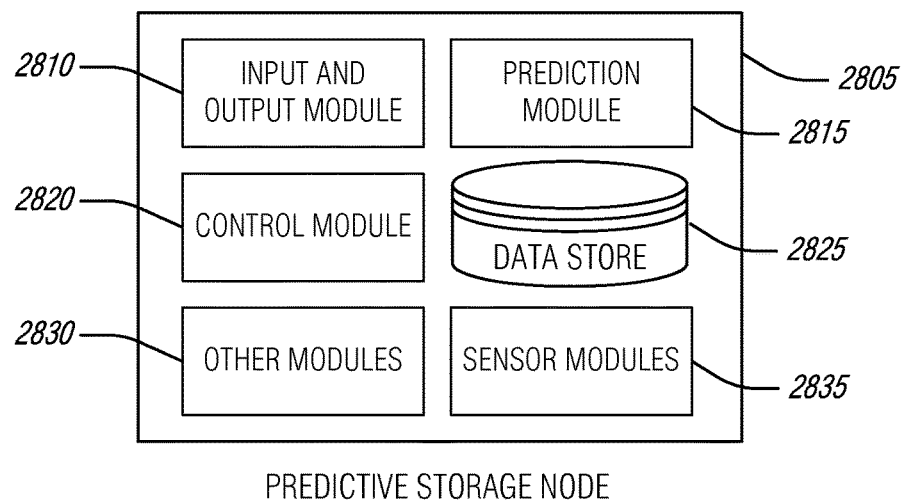
FIG. 28 is a block diagram that illustrates a system configured for performing predictive storage techniques, according to an example.

FIG. 28 shows an example logical diagram 2800 of a node 2805 according to some examples of the present disclosure. The modules described in FIG. 28 may implement the predictive storage functions as described herein and the modules may be in addition to, or instead of the modules described in other sections in this specification. Input and output module 2810 may communicate with other nodes, including peer nodes, the authority, and server nodes. Input and output module 2810 may request and receive items in the collection as well as events corresponding to items in the collection. In some examples, input and output module 2810 may receive one or more predictive models, user preferences, signals, or other information. Input and output module 2810 may communicate with other applications on the node, and may communicate with other computing devices. For example input and output module 2810 may request and receive signal information from these external sources.

Prediction module 2815 may utilize signals and event information received from input and output module 2810 to score one or more items in the collection according to the configured prediction algorithm. For example, prediction module 2815 may utilize past usage history of items in the collection to score the items. In other examples, prediction module 2815 may build a predictive model based upon observed usage history and signals. Once the model is built, the prediction module may calculate scores for the collection, update scores based upon new signals, and the like.

Control module 2820 may utilize the scores for the elements generated by the prediction module 2815 to run a selection algorithm to select the set of locally available elements. In some examples, the set of locally available elements may be limited to a particular number or size. The size or number of elements may be set by user preferences on the node or by node device characteristics. The user preferences may be setup through a user interface provided by input and output module 2810. In other examples the size or number of elements may be set based upon an algorithm that may consider the individual node's characteristics. For example, the algorithm may determine the size of the set of locally available elements based upon the available data store 2825. For example, the algorithm may choose a size that utilizes up to X % of available local storage (where X may be a predetermined or user configurable number). In some examples, the size of the set of locally available elements may fluctuate as the available local storage fluctuates.

To calculate the set of locally available elements, in some examples, the scores of each element may be utilized. As used herein, elements with high scores are considered elements that are determined by the system to have a high probability of the user of the node interacting with in the future. Whether the scores are organized such that lower numerical scores represent the highest probabilities or higher numerical scores represent the highest probabilities, it is understood that herein, highest scores indicates the highest probabilities.

In some examples, the node may fill the set of locally available elements with the highest scoring elements and work down until the maximum number of items is filled or until the space allocated for the locally available set is filled. In other examples, the node may utilize a maximum utility function to maximize the total scores of all the elements in the locally available set.

Control module 2820 may also request, through input and output module 2810, elements to be downloaded to the node. For example, elements that are requested added to the locally available set may include elements that are not currently stored in the node's local storage. Control module 2820 may also overwrite any element stored in data store 2825 with a newly downloaded element if necessary. Control module 2820 may also be responsible for triggering a re-scoring of one or more elements in the collection responsive to receiving one or more events via the input and output module 2810. Control module 2820 may also re-score the elements in the collection periodically. The period of this re-score may be predetermined by the system, set by a user, or may be dynamically alterable. For example, the control module 3020 may re-score the elements in response to a determination that, over a predefined period of time, the user has attempted to interact with a predetermined number of elements in the non-locally available set of items. This may indicate that the set of locally available items is not optimal and may need to be recalculated. Feedback on the number of items selected from the non-locally available-set and the locally available set may also be used by the prediction module 2815 to refine the weightings used in the scorings, or used to refine the model (e.g., adjust neural network weightings, and the like).

Data store 2825 may comprise any local storage on the node. Examples include solid state memory, flash memory, magnetic media, hard drives, volatile memory, such as Random Access Memory, and the like. Sensor modules 2835 may provide signals to the prediction module 2815 and in some examples control module 2820. Sensors may include global positioning system (GPS) sensors, accelerometers, g-force meters, compasses, biometric sensors, light sensors, microphones, image capture devices, and the like.

Collection Events and User Interface Interactions

The aforementioned details can be combined into a collection-managed data distribution mechanism. In such a mechanism, the collection is used to drive data distribution of file system elements amongst participant nodes. The following examples typically are described from the perspective of a single node and its interactions with other entities (e.g., store point, authority, or other endpoint nodes).

Figure 29:
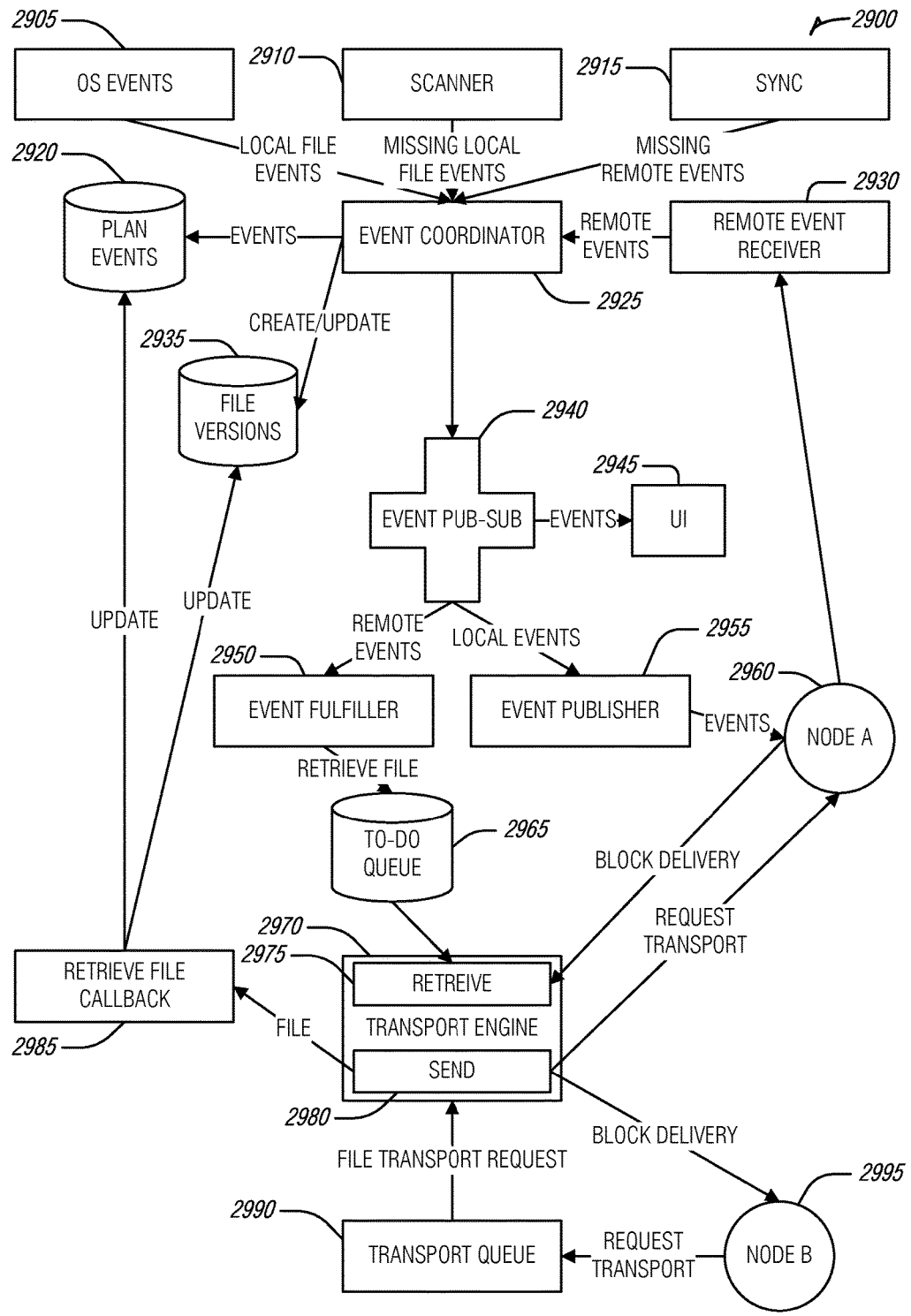
FIG. 29 is a functional block diagram that illustrates event coordination and processing in a node of a distributed data system, according to an example.

FIG. 29 illustrates a diagram showing event coordination and processing in a distributed data system 2900, according to an example. The distributed data system 2900 can include a number of sensors to determine local file system element changes that can result in file system element events. These sensors can include OS events 2905 (e.g., direct communications from the file system), a scanner 2910 (e.g., to scan file system elements for locations or changes), and event synchronization 2915 (e.g., modifications from other nodes). Remote events occurring after initial synchronization (i.e., ad-hoc events), can be received via the remote event receiver 2930. Events can be pushed through an event coordinator 2925, which can store them into the plan events database 2920, modify a file system element version database 2935, and post them to a publish/subscribe facility 2940 for further processing. The publish/subscribe facility 2940 can provide events to the user interface 2945, an event publisher 2955 for remote consumption by other nodes (e.g., Node A 2960), and an event fulfiller 2950 to address events that require action on the distributed data system 2900.

The event fulfiller 2950 can store the locally processed events in a queue 2965 that can feed the transport engine 2970. The transport engine 2970 can manage reception and transmission of file system element contents, such as block data. The transport engine 2970 can include a retrieve CS 2975 and a send CS 2980 to respectively handle reception and transmission of the contents data. Whereas the queue 2965 feeds the transport engine 2970 with local events, remote requests for contents data can be fed through a remote transport queue 2990. Such remote events can originate from other nodes, such as Node B 2995. Finally, the retrieve file callback 2985 can receive verifications or failures of contents data operations from the transport engine 2970 to update the plan events database 2920, the versions database 2935, or other entities interested in consuming this information.

The framework described above can interact with users in a variety of ways. The interactions can include creating a collection, adding file system elements to a collection, removing file system elements from a collection, and leaving a collection entirely (other issues, such as changes to files, and the like are handled by observing file system events or changes to the files directly and do not use user input specifically directed to that end). In an example, a user access point can be monitored to receive user input and a UI can be provided in response to that user input. In an example, the user access point can be a click (e.g., a right click) on a file system element in a file browser to bring up a contextual menu including a collections menu. The UI is the result of the collections menu selection. In an example, the access point can be a URI or local collections fat-client.

The UI can include elements corresponding to any one or more actions to create a collection, leave a collection, share a file system element, or change collection affiliation (including removal from a collection) of a file system element. Upon selection of one of these elements, contextual data can be collected and distributed (e.g., as discussed above with respect to FIG. 29) to collection participant nodes. The following example includes creation of a collection, however, similar techniques will be used for other operations.

After the UI is provided, an indication to create a collection can be received via the UI. A collection type can be identified based on the indication and a context of the UI. For example, the UI can include a choice to create a backup, personal, or multi-user collection when a file system element is right-clicked in a file browser. The indication can include the user's selection of one of these options. In an example, the context of the indication (e.g., files with a copy restriction, etc.) can be used to further limit available collection types. For example, a personal or backup collection can be available when such a copy restriction is in place but a multi-user collection is not available. In an example, the size of the file system element can be a context derived attribute that can limit collection types (e.g., a backup collection can take a large file while the personal or multi-user collections cannot). In this example, a set of predetermined sizes can correspond to available collection types.

After the collection type is identified, a collection schema can be obtained. In an example, each collection type corresponds to a different collection schema. In an example, a plurality of collection types correspond to the same collection schema. As described above, the collection schema can include data definitions used to manage data distribution for file system elements in the collection. Accordingly, the receipt of an identification of the set of file system elements that are part of collection allows collection-managed data distribution. In an example, this identification can be derived from the context of the UI (e.g., which file system element was right-clicked, etc.). Further data definition fields of the collection schema can be populated in accordance with the user indication, the UI, and the file system element identifications. Thus, required data definitions can be fulfilled via context, the user interface (e.g., prompting the user for the data, such as the collection name), or the identified set of file system elements themselves. Finally, a portion of the collection definitions of the collection schema can be communicated to a plurality of nodes participating in the collection. A variety of details of node participation is described above, but generally entails the inclusion of devices that have authenticated to an authority for the collection, as well as the node that created the collection. The portion of the collection definitions can be limited to endpoint node information. Thus, for example, the local root data for a first node is not communicated to a second node.

The example above described the creation of a collection. Leaving a collection or removing a file system element from a collection is generally a simpler process because the collection-specific information is already known. In these examples, the mechanisms to identify collection schemas and populate the data definitions can be replaced with transmitting an indication of the change or deletion.

After a collection is created and communicated to a node, the node can use the collection to manage data distribution. This can include receiving the portion of the collection schema and synchronizing a local event stream with participant nodes as identified in the portion of the collection schema data definitions. As described above, the specific nodes to which the event stream will be synchronized are the nodes that the present node(s) decides to connect to, and may not include every participant node in the collection.

A state of a local file system element identified in the set of file system elements can be identified. This state can correspond to a plurality of pre-defined states, such as changed, deleted, version number, etc. A communication can be issued to the list of participant nodes in response to this state identification. In an example, the local state is determined after a remote event is received from another node. In this example, the communication is one to retrieve the file system element contents needed by the node in order to satisfy the event. After the communication is issued, a response from another participant node (not necessarily the one who initiated the event) can be received and used to complete the data distribution event (e.g., to make the local file system element current to the most recent version of the file system element at the event initiating node).

In an example, the local state is determined as a matter of course, such as via a local file system event or monitoring by the node. In this example, the most recent version of the file system element is local and has not yet been distributed to other participant nodes. The communication can be the event indicating the current state of the file system element, such as its version and contents. The response from the participant node, to the communication, can be a request for the contents needed by the participant node. The node can complete the data distribution event by transferring the requested contents.

Figure 30A:
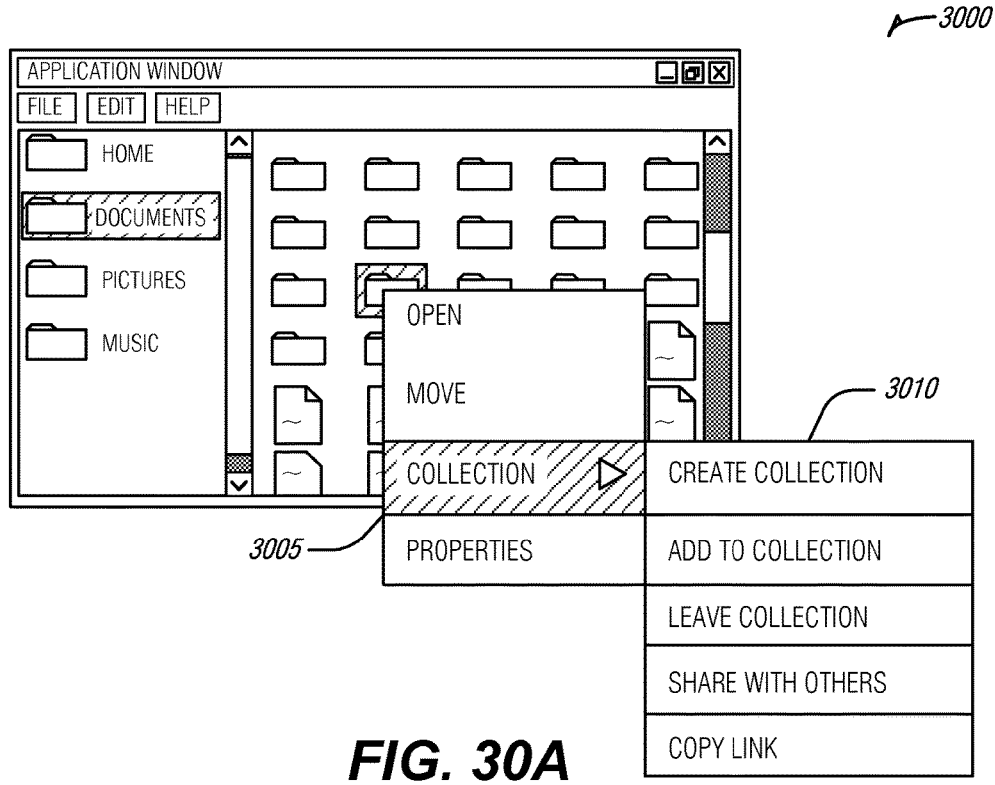
FIG. 30A is an example user interface that illustrates collection management operations in a file system viewer, according to an example.

FIG. 30A is an example user interface that illustrates collection management operations in a file system browser 3000, according to an example. As described above, a file system browser 3000 can provide a user action point to initiate collection actions. This has the advantage of conveniently locating the collection operations in the user interface that users generally employ to manage file system elements. The contextual menu 3005 includes a collection option, which is the user action point. User indications at the user action point (e.g., clicking on, moving the pointer to that menu option, etc.) can activate the UI 3010 that provides the user the option to create the collection, among other available actions. In an example, an additional UI can be triggered by the elements of the UI 3010 to, for example, accept additional user input specific to each of the illustrated options.

Figure 30B:
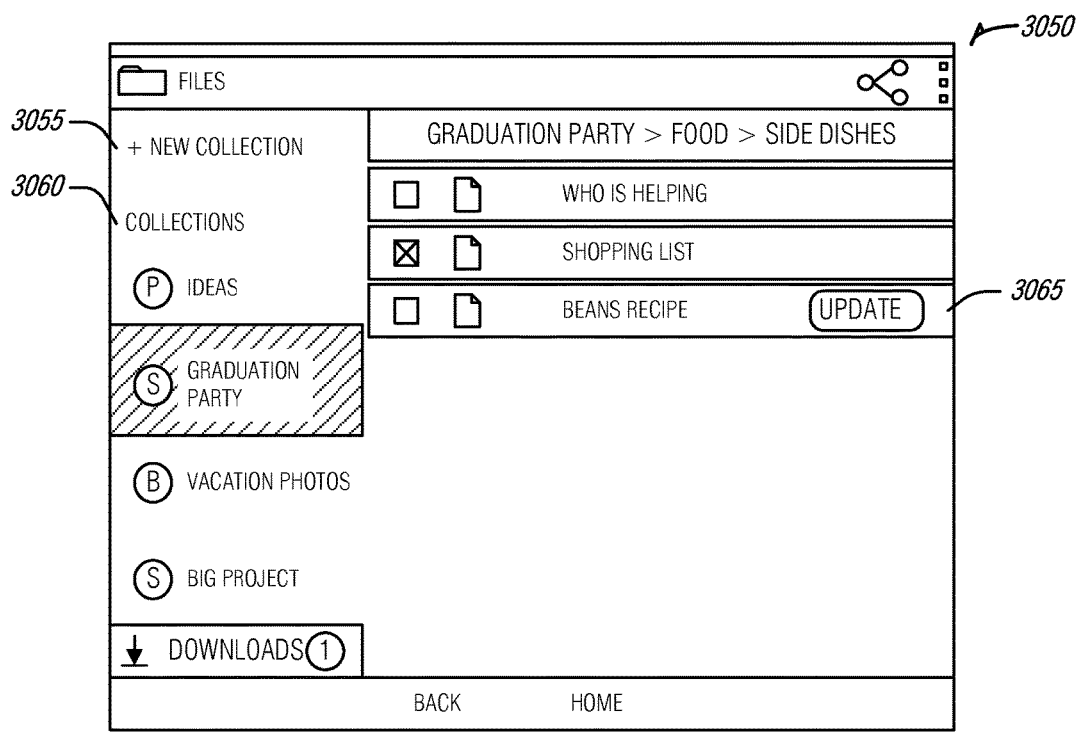
FIG. 30B is an example user interface that illustrates collection management operations in a collection graphical user interface, according to an example.

FIG. 30B is an example user interface that illustrates collection management operations in a mobile graphical user interface (GUI) 3050, according to an example. Many mobile platforms (e.g., phones, tablets, etc.) are designed for application rather than file centric manipulation by users and also use small screens (often effectively limiting UI choices that are available on desktops). The mobile GUI 3050 illustrates a compact organization to address these common issues with mobile platforms. In this example, opening the mobile application (e.g., resulting in the mobile GUI 3050) is the user access point. The mobile GUI 3050 can include a new collection element 3055, as well as a list of current collections 3060 (in this example illustrating "P" corresponds to a persona collection, "S" to a multi-user collection, and "B" to a backup collection, although in practice different visual or other indications can be used, or no distinguishing indication can be used), and a collection file system element viewing area 3065. Similar options, however, to those discussed above with respect to FIG. 30A can be present and operate in a similar manner.

Figure 31A:
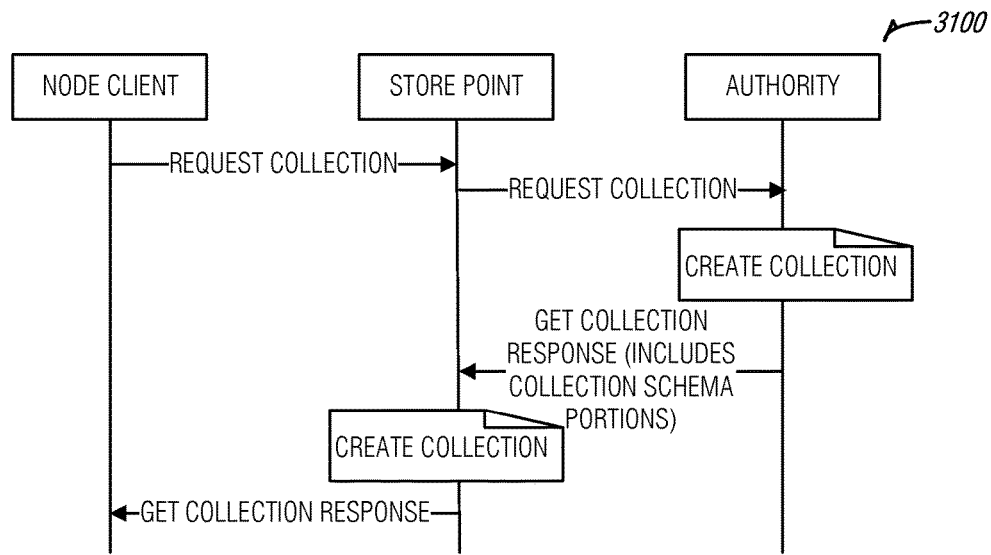
FIG. 31A is a sequence diagram that illustrates operations to create a collection, according to an example.

FIG. 31A is a sequence diagram that illustrates operations 3100 to create a collection, according to an example. As noted previously, an Authority and a store point node can participate in collection managed data distribution. In this example, the store point serves as a remote data backer for the node client and the Authority maintains its role in provisioning collections. The node client makes a collection request to the store point. The store point forwards that request on to the Authority. In an example, the request is transmitted directly to the Authority. In the example of collection creation, the Authority identifies the collection schema, populates the data definitions, and communicates the portion of the data definitions to the various participant nodes. Thus, the Authority creates the collection.

After the collection is created, or other action is completed by the Authority (e.g., leaving a collection by the node client, a user, etc.), a response is generated and transmitted back to the node client via the store point, in an example. As the store point receives the collection request response, it performs the requested action. Thus, for a creation of a collection, the store point creates the local data of the collection from the response. Finally, the response arrives at the node client, which can indicate to the user that the collection is created. In an example, where the Authority is unavailable, the collection request (e.g., collection creation) would fail and the user can be notified of the failure.

Figure 31B:
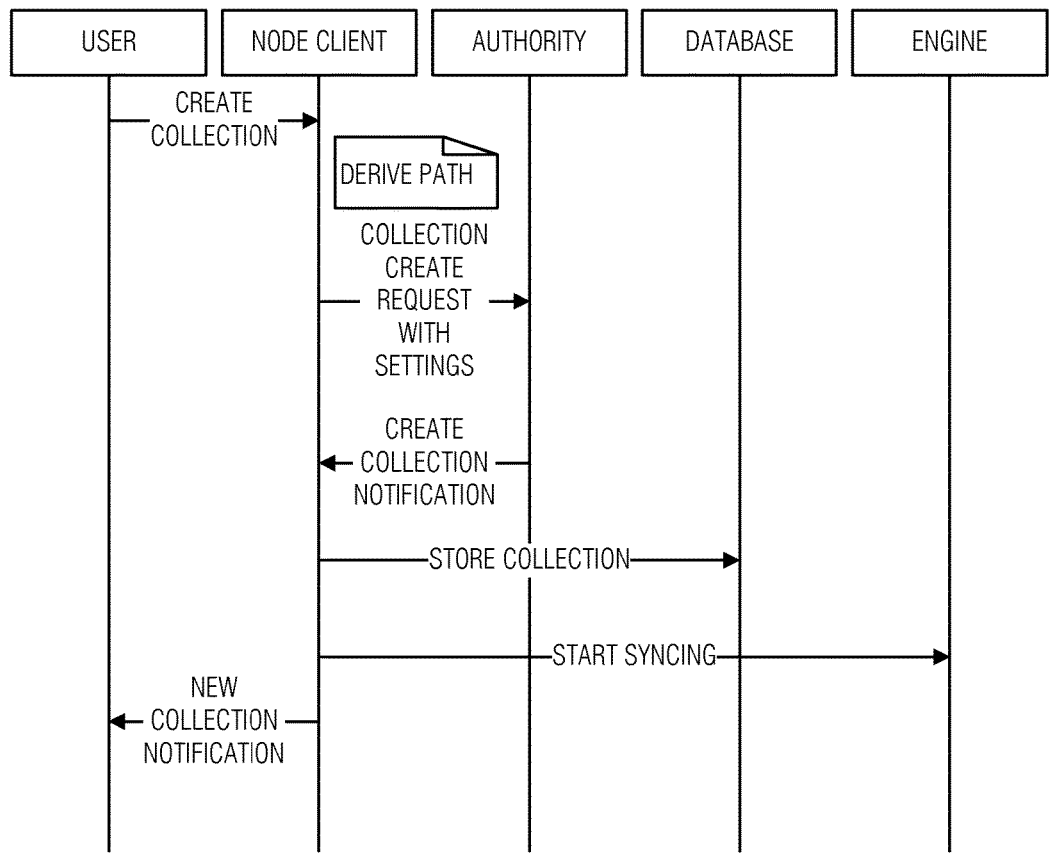
FIG. 31B is a sequence diagram that illustrates operations to create and synchronize a collection, according to an example.

FIG. 31B is a sequence diagram that illustrates operations to synchronize a collection, according to an example. The operations of FIG. 31B are similar to those of FIG. 31A, but include more detail on an example starting with user input to create the collection, and following with collection creation and synchronization to a variety of nodes. Further, FIG. 31B illustrates the derivation of the local data path by the node client. This is a context variable for the creation of the collection that can be used to reduce user input.

Figure 32:
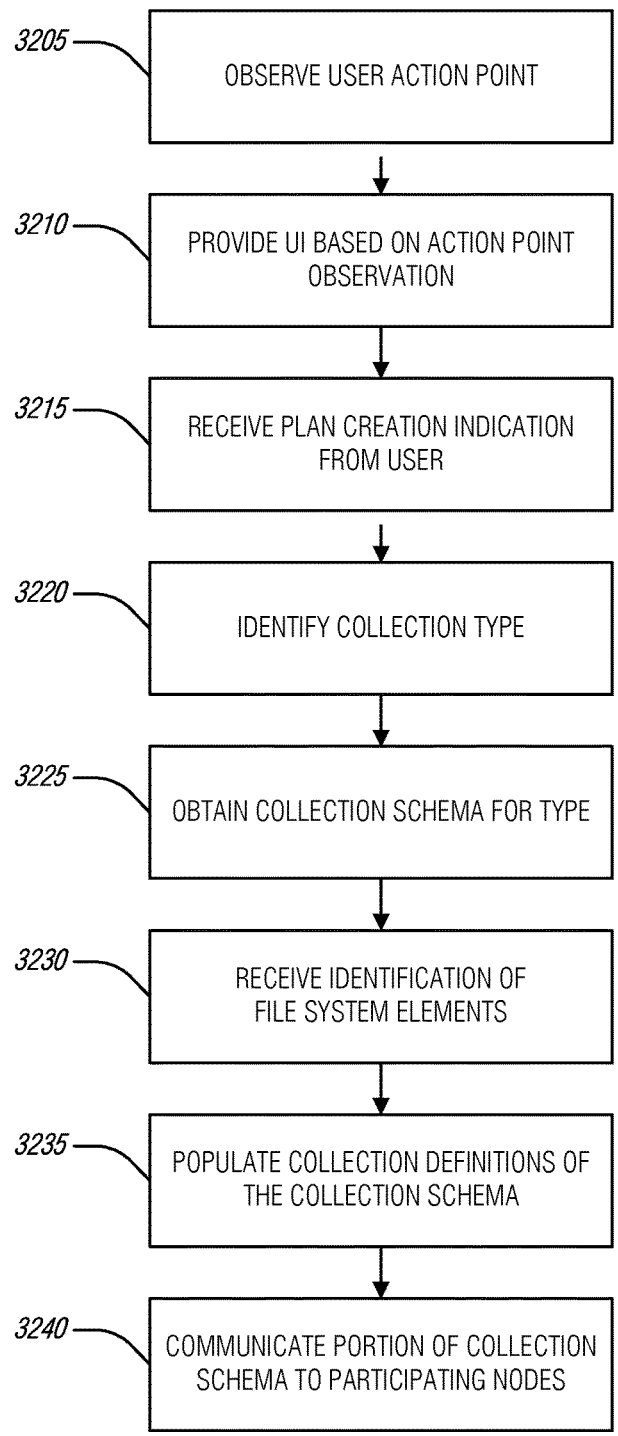
FIG. 32 is a flowchart of a method illustrating creation of a collection, according to an example.

FIG. 32 is a flowchart of a method 3200 illustrating a creation of a collection, according to an example. Operations of the method 3200 can be performed by any appropriate computer system element described above. At operation 3205, a user action point can be observed. At operation 3210, a UI can be provided to a user based on the user indication received via the action point observation. At operation 3215, a plan creation (or other modification) indication can be received from the user via the UI of operation 3210.

At operation 3220, a collection type can be identified based on any of the indication of operation 3215 or a context of the UI of operation 3210. At operation 3225, a schema for the collection type identified at operation 3220 can be obtained (e.g., from a local or remote data store or service). At operation 3230, identification of file system elements for the collection can be received. This identification may be explicit, or can be either based on the context of the UI of operation 3210 (e.g., which elements were selected when the creation indication was received) or be explicitly identified by the user (e.g., via a web browser after the creation indication is received).

At operation 3235, collection definitions of the collection schema can be populated by any or all of the UI context (e.g., including user, location, or local file system element information), the identified file system elements themselves (e.g., contents of the file system elements such as shared user identification), or the explicit instructions of the user via the UI indication. At operation 3240, a portion of the collection schema data definitions can be communicated to participant nodes. In an example, the operations 3215 can be performed by an Authority distinct from the client node.

Figure 33:
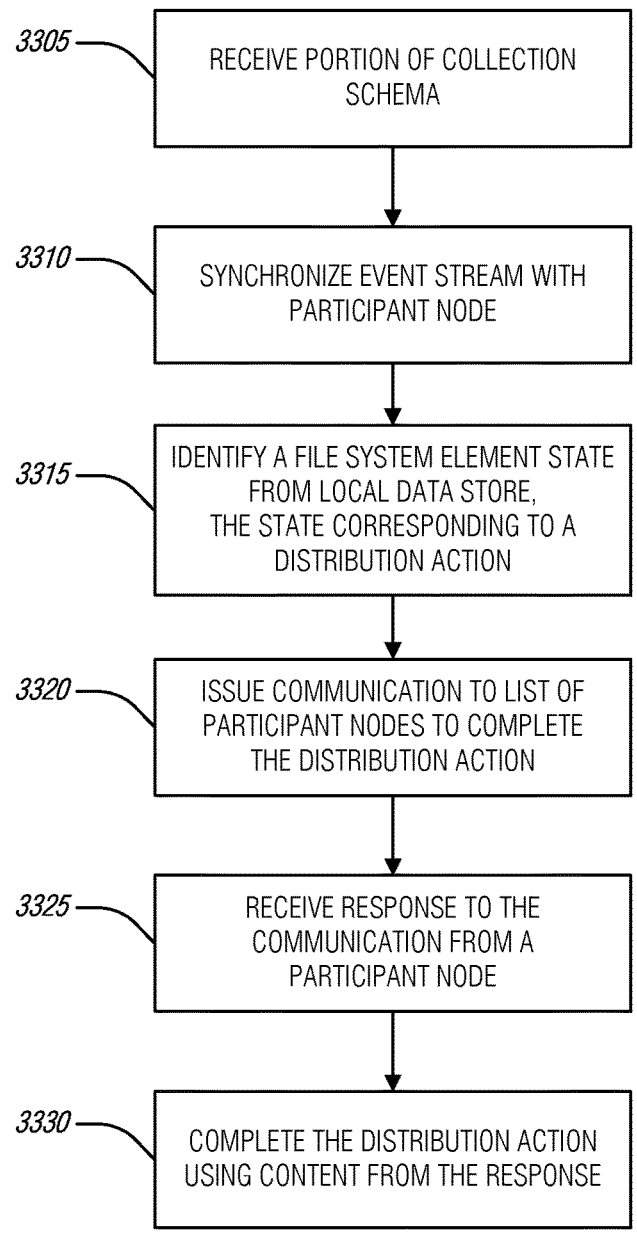
FIG. 33 is a flowchart of a method illustrating a synchronization of a collection, according to an example.

FIG. 33 is a flowchart of a method 3300 illustrating a synchronization of a collection, according to an example. At operation 3305, a portion of collection schema data definitions for a collection can be received (e.g., at a node from an Authority). At operation 3310, an event stream can be synchronized with one or more participant nodes (e.g., as indicated by the portion of the data definitions from operation 3305).

At operation 3315, a file system element state can be identified from a local data store. In an example, the file system element state can be one of the following: changed (e.g., contents or meta data), old (e.g., not the latest version), deleted, added, or changed permissions. The state can correspond to data distribution events. For example, if the file system element is changed, the data distribution event can include notifying other participant nodes. In an example, if the state is old, the data distribution event can include retrieving the new version (or parts needed thereof) to make the local file system element equivalent to the newest version amongst the participant nodes.

At operation 3320, a communication can be issued to a list of the participant nodes in furtherance of completing (e.g., to move towards completing) the data distribution action. At operation 3325, a response to the communication of operation 3320 can be received. At operation 3330, the data distribution event can be completed using information from the response of operation 3325. Thus, the response may include content data to update a local version of the file system element, or the response can include a request for the changed content data and completed by sending that data to the participant node.

Figure 34:
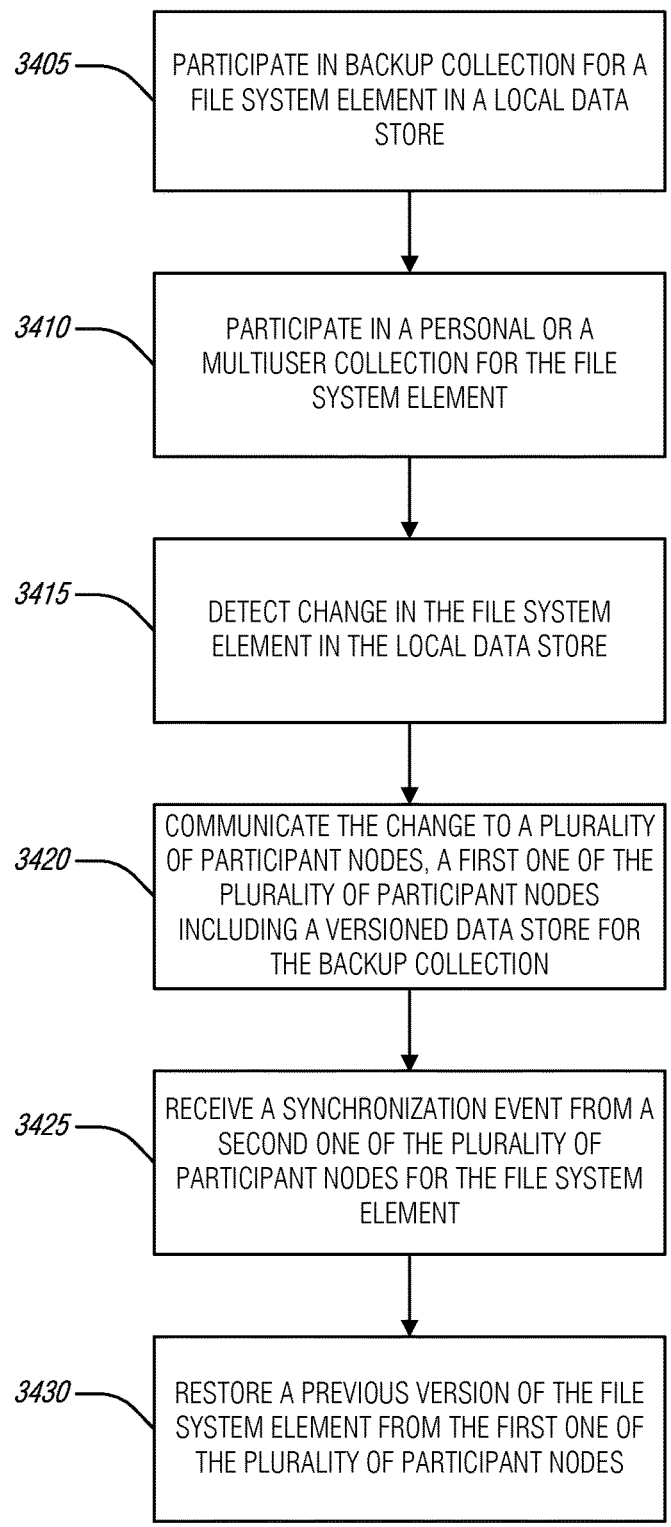
FIG. 34 is a flowchart of a method illustrating a synchronization of a collection, according to an example.

FIG. 34 is a flowchart of a method 3400 illustrating a synchronization of a collection, according to an example. Throughout this description, discussion of particular collection types (e.g., backup, personal, multi-user) is generally unnecessary because the collection mechanics, including inter-node communication generally do not vary between the various collection types. For example, the network topology described with respect to FIG. 6 does not change when versioned data stores (e.g., in store point nodes) are added to allow versioned backups, as described with respect to FIGS. 11-13. In fact, the same communications, data deduplication, and security mechanism can be used, without modification, between a backup and a non-backup collection. Thus, the method 3400 illustrates just such a hybrid operation on a single communications platform, from the perspective of a node.

At operation 3405 the node can participate in a backup collection for a file system element in a local data store. That is, at least one file system element in the local data store is managed by a backup collection. At operation 3410 the node also participates in a personal or multi-user (e.g., non-backup) collection for the same file system element.

At operation 3415, the node can detect a change in the file system element in the local data store. At operation 3420 the change can be communicated to a plurality of participant nodes, at least one of which includes a versioned data store. The versioned data store is also a participant in the backup collection.

At operation 3425 the node can receive a synchronization event from a second one of the plurality of participant nodes (i.e., not the one with the versioned data store). At operation 3430 the node can restore a previous version of the file system element from the node with the versioned data store. For operation 3430, an additional UI element on the node can be provided to allow for previous version browsing, etc., allowing the user to select a previous version to restore.

An advantage of this hybrid system includes responsive backup without having to batch operations or duplicate data that is already being synchronized. Moreover, the dual use of many elements in the data distribution mechanism can increase efficiency (e.g., by removing redundant running programs or redundant transfer of data), and reduce cost.

Computer System Implementation Examples

Figure 35:
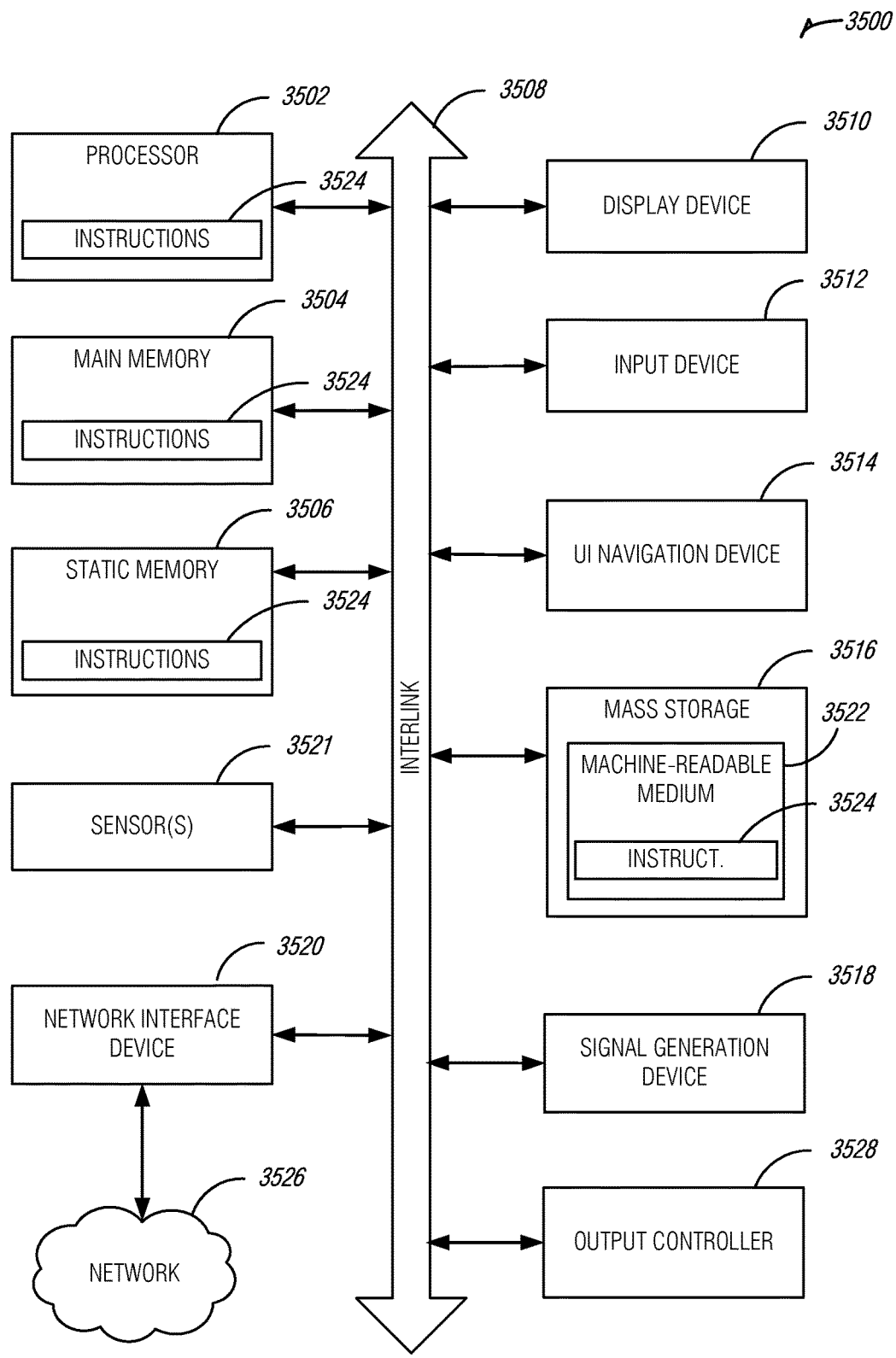
FIG. 35 is a block diagram that illustrates components of a machine according to various examples of the present disclosure.

FIG. 35 illustrates a block diagram of an example machine 3500 upon which any one or more of the techniques (e.g., methodologies) discussed herein may perform. In some examples, the machine 3500 may operate as a stand-alone device or may be connected (e.g., networked) to other machines. In a networked deployment, the machine 3500 may operate in the capacity of a server machine, a client machine, or both in server-client network environments. In an example, the machine 3500 may act as a peer machine in peer-to-peer (P2P) (or other distributed) network environment. The machine 3500 may be a personal computer (PC), a server computer, a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, modules, or mechanisms including circuit sets. Circuit sets are a collection of circuits implemented in hardware (e.g., simple circuits, gates, logic, etc.). Circuit set membership may change based on time or underlying hardware availability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 3500 may include a hardware processor 3502 (e.g., a central processing unit (CPU), a graphics processing unit (GPU), a hardware processor core, or any combination thereof), a main memory 3504 and a static memory 3506, some or all of which may communicate with each other via an interlink (e.g., bus) 3508. The machine 3500 may further include a display unit 3510, an alphanumeric input device 3512 (e.g., a keyboard), and a user interface (UI) navigation device 3514 (e.g., a mouse). In an example, the display unit 3510, input device 3512 and UI navigation device 3514 may be a touch screen display. The machine 3500 may additionally include a storage device (e.g., drive unit) 3516, a signal generation device 3518 (e.g., a speaker), a network interface device 3520, and one or more sensors 3521, such as a global positioning system (GPS) sensor, compass, accelerometer, or other sensor. The machine 3500 may include an output controller 3528, such as a serial (e.g., universal serial bus (USB), parallel, or other wired or wireless (e g, infrared (IR), near field communication (NFC), etc.) connection to communicate or control one or more peripheral devices (e.g., a printer, card reader, etc.).

The storage device 3516 may include a machine readable medium 3522 on which is stored one or more sets of data structures or instructions 3524 (e.g., software) embodying or utilized by any one or more of the techniques or functions described herein. The instructions 3524 may also reside, completely or at least partially, within the main memory 3504, within static memory 3506, or within the hardware processor 3502 during execution thereof by the machine 3500. In an example, one or any combination of the hardware processor 3502, the main memory 3504, the static memory 3506, or the storage device 3516 may constitute machine readable media. While the machine readable medium 3522 is illustrated as a single medium, the term "machine readable medium" may include a single medium or multiple media (e.g., a centralized or distributed database, and/or associated caches and servers) configured to store the one or more instructions 3524.

The term "machine readable medium" may include any medium that is capable of storing, encoding, or carrying instructions for execution by the machine 3500 and that cause the machine 3500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a physical machine readable medium comprises a machine readable medium with a plurality of particles having invariant (e.g., rest) mass. Accordingly, machine-readable media are not transitory propagating signals. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 3524 may further be transmitted or received over a communications network 3526 using a transmission medium via the network interface device 3520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., networks implemented according to the Institute of Electrical and Electronics Engineers (IEEE) 802.11 family of standards known as Wi-Fi®, the IEEE 802.16 family of standards known as WiMax®, the 3GPP family of standards including Long Term Evolution (LTE)/LTE-Advanced, or the IEEE 802.15.4 family of standards), machine-to-machine/device-to-device/peer-to-peer (P2P) networks, among others. In an example, the network interface device 3520 may include one or more physical jacks (e.g., Ethernet, coaxial, or phone jacks) or one or more transceivers and antennas to connect to the communications network 3526. In an example, the network interface device 3520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 3500, and includes digital or analog communications signals or other intangible medium to facilitate communication of such software.

SPECIFIC NOTES AND EXAMPLES

Implementation examples of the previously described subject matter correspond to apparatuses, hardware configurations, and related computer programs that carry out the above-described methods. The following examples are provided as illustrative embodiments of the previously described subject matter, with reference to specific operations and structures. It will be understood that significant variation and combination of the following examples may exist to define the scope of the presently described embodiments and any claims encompassing the presently described embodiments.

Collection Data Distribution Examples

Example A1

Subject matter (such as a device, instructions, or a method) for collection managed data distribution comprising: observing a user action point, the user action point to receive user input; providing a user interface to a user to create a collection in response to receipt of the user input at the user action point; receiving an indication from the user to create the collection via the user interface; identifying a collection type based on the indication and a context of the user interface; obtaining a collection schema for the collection type; receiving identification of a set of file system elements for the collection; populating a plurality of collection definitions of the collection schema in accordance with the indication, the context, and file system element identifications for the set of file system elements; communicating a portion of the collection schema to a plurality of nodes participating in the collection, the portion including a list of participant nodes and the file system element identifications; receiving, at a data distribution mechanism of a node from the plurality of nodes, the portion of the collection schema;

synchronizing, by the node, an event stream with a participant node in the list of participant nodes, the event stream including indications of changes of the file system elements between the participant nodes; identifying, from a local data store of the node, a state of a file system element identified in the file system element identifications, the state being one of a plurality of states, the state corresponding to a distribution action; issuing, by the node in response to identifying the state, a communication to the list of participant nodes to complete the distribution action; receiving a response to the communication from a participant node in the list of participant nodes; and completing the data distribution action using content from the response.

Example A2

The subject matter of Example A1, wherein observing the user action point and providing the user interface are performed by the node.

Example A3

The subject matter of any of Examples A1-A2, wherein the user action point is a user interface element added to a file browser application.

Example A4

The subject matter of any of Examples A1-A3, wherein the user action point is a user interface element provided by the data distribution mechanism.

Example A5

The subject matter of any of Examples A1-A4, wherein the user action point is a web interface.

Example A6

The subject matter of any of Examples A1-A5, wherein the collection type is one of a backup collection, a personal collection, or a multi-user collection.

Example A7

The subject matter of any of Examples A1-A6, wherein retrieving a collection schema, receiving identification of the set of file system elements, populating the plurality of collection definitions, and communicating the portion of the collection schema are performed by an authority, the authority being a computer system that is distinct from the node.

Example A8

The subject matter of any of Examples A1-A7, wherein: the state of the file system element indicates that the file system element is not current in the local data store; the data distribution action includes causing the file system element to be current in the local data store; the communication is a request for contents of a current version of the file system element; the response to the communication includes at least a portion of the contents; and completing the data distribution action includes using the at least a portion of the contents to establish the current version of the file system element in the local data store.

Example A9

The subject matter of any of Examples A1-A8, wherein the at least a portion of the contents are incremental differences between the current version of the file system element and a present version of the file system element.

Example A10

The subject matter of any of Examples A1-A9, wherein: the state of the file system element indicates that the file system element has changed in the local data store; the data distribution action includes notifying the list of participant nodes about the file system element change; the communication is an event published to the list of participant nodes; the response is a request for contents of the file system element; and completing the data distribution action includes transmitting the contents to the participant node.

Example A11

A computer system comprising modules configured to perform the operations of any one or more of examples A1-A10.

Example A12

A non-transitory computer readable medium comprising instructions that when executed by a processor of a computing system configures the computing system to perform operations of any one or more of examples A1-A10.

Node-to-Node Data Distribution Examples

Example B1

Subject matter (such as a device, instructions, or a method) to create a data distribution network comprising: at a first computing device using one or more processors to perform operations of: sending a connection message to an authority node over a computer network; receiving information on a first set of nodes from the authority node, the first set of nodes being a subset of an entire set of nodes that are participating in a file system element collection of the data distribution network; discovering a second set of nodes based upon network messaging with respective nodes of the second set of nodes and based upon the received information on the first set of nodes, the second set of nodes comprising members of the first set of nodes that are communicatively reachable; connecting to a first node and a second node of the second set of nodes, the first and second nodes selected from the second set of nodes according to a predetermined connection algorithm; synchronizing an event stream with at least one of the first and second nodes; and responsive to synchronizing the event stream, downloading at least one file system element corresponding to a file system event of the synchronized event stream from at least one of the first and second nodes.

Example B2

The subject matter of Example B1, wherein the connection algorithm comprises selecting the first and second nodes from the second set of nodes based upon a unique node id of each node in the second set and a unique identification of the first computing device.

Example B3

The subject matter of any of Examples B1-B2, wherein selecting the first and second nodes comprises: searching the second set of nodes for a particular node with a unique identification that is the smallest unique identification that is still greater than the unique identification of the first computing device; and responsive to finding the particular node, selecting the particular node.

Example B4

The subject matter of any of Examples B1-B2, wherein selecting the first and second nodes comprises: searching the second set of nodes for a particular node with a unique identification that is the smallest unique identification that is still greater than the unique identification of the first computing device; responsive to determining that no such node in the second set of nodes exists, selecting the node with the lowest unique identification in the second set of nodes.

Example B5

The subject matter of any of examples B1-B4, wherein selecting the first and second nodes comprises: searching the second set of nodes for a particular node with a unique identification that is the largest unique identification that is still smaller than the unique identification of the first computing device; and responsive to finding the particular node, selecting the particular node.

Example B6

The subject matter of any of examples B1-B4, wherein selecting the first and second nodes comprises: searching the second set of nodes for a particular node with a unique identification that is the largest unique identification that is still smaller than the unique identification of the first computing device; responsive to determining that no such node in the second set of nodes exists, selecting the node with the highest unique identification in the second set of nodes.

Example B7

The subject matter of any one of examples B1-B6, wherein the connection algorithm connects to all nodes in the second set of nodes including the first and second nodes.

Example B8

The subject matter of any one of examples B1-B6, wherein the connection algorithm connects to a subset of all the nodes in the second set of nodes including the first and second nodes.

Example B9

The subject matter of any one of examples B1-B8, wherein downloading at least one file system element corresponding to a file system event of the synchronized event stream from at least one of the connected nodes comprises: determining that the first node is on a same local area network as the computing device and the second node of the at least two connected nodes is not on the same local area network and in response, downloading the at least one file system element from the first node.

Example B10

A computer system comprising modules configured to perform the operations of any one or more of examples B1-B9.

Example B11

A non-transitory computer readable medium comprising instructions that when executed by a processor of a computing system configures the computing system to perform operations of any one or more of examples B1-B9.

Deduplicated Data Distribution Examples

Example C1

Subject matter (such as a device, instructions, or a method) for establishing a deduplication-based reconstruction of file system data, the method comprising operations performed by at least one processor of a first computing system, and the operations including: transmitting, to a second computing system, a request for metadata of a desired file; receiving, from the second computing system, the metadata of the desired file, the metadata indicating respective identifiers of each block of the desired file; identifying, at the first computing system with use of the metadata, one or more blocks of the desired file on a data store associated with the first computing system; and reconstructing the desired file at the first computing system from the one or more blocks of the desired file on a data store, the reconstructing performed with use of the metadata received from the second computing system.

Example C2

The subject matter of Example C1, wherein each of the blocks of the desired file are stored in a matching source file on the data store associated with the first computing system, the operations of reconstructing the one or more blocks of the desired file comprising: retrieving each of the blocks of the desired file from the matching source file on the data store associated with the first computing system; and writing each of the blocks retrieved from the matching source file to a file system location in a destination data store associated with the first computing system.

Example C3

The subject matter of Example C1, wherein one or more of the blocks of the desired file are not stored in the data store associated with the first computing system, the operations for reconstructing the one or more blocks of the desired file comprising: transmitting, to the second computing system, a request for the one or more of the blocks of the desired file that are not stored in the data store associated with the first computing system, the request indicating respective identifiers of the one or more blocks of the desired file that are not stored in the data store associated with the first computing system; receiving, from the second computing system, the one or more of the blocks of the desired file that are not stored in the data store associated with the first computing system; writing the one or more of the blocks of the desired file received from the computing system to a destination data store on the first computing system; retrieving at least one remaining block of the desired file from a source file located in the data store associated with the first computing system; and writing the at least one remaining block of the desired file to a file system location in a destination data store associated with the first computing system.

Example C4

The subject matter of Example C1, the operations comprising: determining, from an index associated with the first computing system, that one or more other blocks of the desired file do not exist on the data store associated with the first computing system, the determining performed using the metadata received from the second computing system; obtaining the one or more other blocks of the desired file from the second computing system; and obtaining the one or more blocks of the desired file from the data store associated with the first computing system; wherein the operations of reconstructing the desired file at the first computing system include reconstructing the desired file from the one or more blocks of the desired file obtained from the data store associated with the first computing system and the one or more other blocks of the desired file obtained from the second computing system.

Example C5

The subject matter of Example C4, wherein the determining that the one or more other blocks of the desired file do not exist on the data store associated with the first computing system is performed with use of a bloom filter cache, the bloom filter cache operated using at least a portion of the respective identifiers of each block of the desired file.

Example C6

The subject matter of any of Examples C1-C5, wherein identifying the one or more blocks of the desired file is performed with use of a block index, the block index providing respective identifiers of a plurality of blocks located within files stored on the data store associated with the first computing system.

Example C7

The subject matter of any of Examples C1-C6, the operations comprising: validating the desired file in response to the reconstructing, the validating performing a comparison of a digital signature of the desired file that is provided from the reconstructing with a digital signature of the desired file that is provided from the metadata of the desired file.

Example C8

The subject matter of Example C7, wherein the respective identifiers of each block of the desired file is based at least in part on an MD5 hash value of each block and wherein the digital signature for the desired file is based at least in part on an SHA-2 hash value of the desired file.

Example C9

A computer system comprising modules configured to perform the operations of any one or more of examples C1-C8.

Example C10

A non-transitory computer readable medium comprising instructions that when executed by a processor of a computing system configures the computing system to perform operations of any one or more of examples C1-C8.

Predictive Storage Examples

Example D1

Example D1 includes subject matter (such as a method, means for performing acts, machine readable medium including instructions that, when performed by a machine, cause the machine to perform acts, or an apparatus configured to perform) for predictive data storage on a data distribution system comprising: scoring respective ones of a plurality of file system elements of a collection of the data distribution system based upon a calculated probability that a user of a node is likely to interact with the respective element; determining an on-demand subset of the collection based upon the scores of the respective plurality of elements, wherein the on-demand subset contains fewer elements than the collection; determining that at least one file system element of the on-demand subset is not already in a local storage of the node; and responsive to determining that the at least one of the on-demand subset is not already in the local storage of the node, requesting the element from a second node in the data distribution system over a computer network.

Example D2

In example D2, the subject matter of example D1 may optionally include wherein the second node is a peer node.

Example D3

In example D3, the subject matter of example D1 may optionally include wherein the second node is an authority node.

Example D4

In example D4, the subject matter of any one or more of examples D1-D3 may optionally include wherein scoring comprises utilizing prior usage history corresponding to at least one of the plurality of file system elements.

Example D5

In example D5, the subject matter of example D4 may optionally include wherein the prior usage history is specific to the user of the node.

Example D6

In example D6, the subject matter of example D4 may optionally include wherein the prior usage history is a usage history corresponding to all users of the collection.

Example D7

In example D7, the subject matter of any one or more of examples E1-E6 may optionally include wherein prior usage history corresponding to the user of the node is weighted greater than the prior usage history of other users of the collection.

Example D8

In example D8, the subject matter of any one or more of examples D1-D7 may optionally include wherein scoring comprises utilizing contextual data specifying a context corresponding to a prior usage history.

Example D9

In example D9, the subject matter of any one or more of examples D1-D8 may optionally include wherein the prior usage history comprises an interaction by a particular user of the collection with one of the plurality of elements in the collection and wherein the contextual data signals a particular situation in which the particular user was in when the particular user interacted with the one of the plurality of elements.

Example D10

In example D10, the subject matter of any one or more of examples D1-D9 may optionally include building a machine learning model; and wherein scoring comprises using the machine learning model.

Example D11

In example D11, the subject matter of any one or more of examples D1-D10 may optionally include wherein determining an on-demand subset of the collection based upon the scores of the respective plurality of elements comprises selecting the highest scoring elements in the on-demand set.

Example D12

In example D12, the subject matter of any one or more of examples D1-D11 may optionally include wherein selecting the highest scoring elements in the on-demand set comprises selecting the highest scoring elements in the on-demand set until a predetermined limit on one of: a local storage size and a number of elements in the on-demand set has been reached.

Example D13

In example D11, the subject matter of any one or more of examples D1-D12 may optionally include wherein determining an on-demand subset of the collection based upon the scores of the respective plurality of elements comprises selecting a combination of the respective plurality of elements that results in the highest combined score of selected elements given one of: a size constraint on the maximum number of elements in the on-demand set and a size constraint on the maximum total size of the elements in the on-demand set.

Example D14

In example D14, the subject matter of any one or more of examples D1-D13 may optionally include receiving the element from the second node; and responsive to receiving the element from the second node, storing the element in the local storage of the node.

Example D15

A computer system comprising modules configured to perform the operations of any one or more of examples D1-D14.

Example D16

A non-transitory computer readable medium comprising instructions that when executed by a processor of a computing system configures the computing system to perform operations of any one or more of examples D1-D14.

What is claimed is:

1. A method of predictive data storage for a node device in a data distribution system, the method comprising using at least one processor to perform operations of:
    scoring each particular file system element of a plurality of file system elements of a collection of the data distribution system, the scoring using a calculated probability that a user of the node device is likely to interact with the particular file system element;
    calculating an on-demand subset of the collection based upon the scores of the plurality of file system elements, wherein the on-demand subset includes fewer elements than the collection, wherein calculating the on-demand subset includes selecting a combination of the plurality of file system elements that results in a highest combined score of selected file system elements given a file system element size constraint on a maximum total size of the elements in the on-demand subset; and
    causing at least one file system element of the on-demand subset to be placed in local storage of the node device in response to a determination that the at least one file system element of the on-demand subset is not already in the local storage of the node device.

2. The method of claim 1, wherein scoring each particular element of the plurality of file system elements includes utilizing prior usage history corresponding to at least one of the plurality of file system elements.

3. The method of claim 2, wherein the prior usage history includes information describing interactions of all users of the collection with the at least one of the plurality of file system elements.

4. The method of claim 3, wherein a component of the prior usage history corresponding to the user of the node device is weighted greater than a component of the prior usage history corresponding to other users of the collection.

5. The method of claim 1, wherein scoring each particular element of the plurality of file system elements includes utilizing contextual data specifying a context corresponding to a prior usage history.

6. The method of claim 5, wherein the prior usage history indicates an interaction by a particular user of the collection with one of the plurality of file system elements in the collection and wherein the contextual data signals a particular situation in which the particular user was in when the particular user interacted with the one of the plurality of file system elements.

7. The method of claim 1, the operations further including:
    building a machine learning model;
    wherein scoring includes using the machine learning model.

8. The method of claim 1, wherein causing the at least one file system element to be placed in local storage on the node device includes:
    requesting the at least one file system element from a second node device in the data distribution system over a computer network;
    receiving the at least one file system element from the second node device; and
    responsive to receiving the at least one file system element from the second node device, storing the at least one file system element in the local storage of the node device.

9. A system for predictive data storage for a node device in a data distribution system, the system comprising:
    a prediction module comprising circuitry to:
        score each particular file system element of a plurality of file system elements of a collection of the data distribution system, the score based upon a calculated probability that a user of the node device is likely to interact with the particular file system element;

a control module comprising circuitry to:
calculate an on-demand subset of the collection based upon the scores of the plurality of file system elements, wherein the on-demand subset includes fewer elements than the collection, wherein calculating the on-demand subset includes selecting a combination of the plurality of file system elements that results in a highest combined score of selected file systems elements given a file system element size constraint on a maximum total size of the elements in the on-demand subset: and
cause at least one file system element of the on-demand subset to be placed in local storage of the node responsive to a determination that the at least one file system element of the on-demand subset is not already in the local storage of the node device.

10. The system of claim 9, wherein the prediction module s configured to score each particular element of the plurality of file system elements by at least utilizing prior usage history corresponding to at least one of the plurality of file system elements.

11. The system of claim 9, wherein the prediction module is configured to score each particular element of the plurality of file system elements by at least utilizing contextual data specifying a context corresponding to a prior usage history.

12. The system of claim 11, wherein the prior usage history indicates an interaction by a particular user of the collection with one of the plurality of file system elements in the collection, and wherein the contextual data signals a particular situation in which the particular user was in when the particular user interacted with the one of the plurality of file system elements.

13. The system of claim 9, wherein the prediction module is configured to build a machine learning model, and wherein the prediction module is configured to score by at least using the machine learning model.

14. A non-transitory machine-readable medium, for predictive data storage for a node device in a data distribution system, the machine-readable medium including instructions, which when performed by the machine, cause the machine to perform operations of:
scoring each particular file system element of a plurality of file system elements of a collection of the data distribution system, the scoring using a calculated probability that a user of the node device is likely to interact with the particular file system element;
calculating an on-demand subset of the collection based upon the scores of the plurality of file system elements, wherein the on-demand subset includes fewer elements than the collection, wherein calculating the on-demand subset includes selecting a combination of the plurality of file system elements that results in a highest combined score of selected file system elements given a file system element size constraint on a maximum total size of the elements in the on-demand subset; and
causing at least one file system element of the on-demand subset to be placed in local storage of the node device in response to a determination that the at least one file system element of the on-demand subset is not already in the local storage of the node device.

15. The machine-readable medium of claim 14, wherein the operations of scoring each particular element includes utilizing prior usage history corresponding to at least one of the plurality of file system elements.

16. The machine-readable medium of claim 15, wherein the prior usage history includes information describing interactions of all users of the collection with the at least one of the plurality of file system elements.

17. The machine-readable medium of claim 16, wherein a component of the prior usage history corresponding to the user of the node is weighted greater than a component of the prior usage history corresponding to other users of the collection.

18. The machine-readable medium of claim 14, wherein the operations of scoring each particular element includes utilizing contextual data specifying a context corresponding to a prior usage history.

19. The machine-readable medium of claim 18, wherein the prior usage history indicates an interaction by a particular user of the collection with one of the plurality of file system elements in the collection and wherein the contextual data signals a particular situation in which the particular user was in when the particular user interacted with the one of the plurality of elements.

20. The machine-readable medium of claim 14, wherein the operations include building a machine learning model; and
wherein the operations of scoring include using the machine learning model.

21. The machine-readable medium of claim 14, wherein the operations of causing the at least one file system element to be placed in local storage on the node includes:
requesting the at least one file system element from a second node device in the data distribution system over a computer network;
receiving the at least one file system element from the second node device; and
responsive to receiving the at least one file system element from the second node device, storing the at least one file system element in the local storage of the node device.

* * * * *

UNITED STATES PATENT AND TRADEMARK OFFICE
CERTIFICATE OF CORRECTION

PATENT NO. : 9,727,423 B2  
APPLICATION NO. : 14/587142  
DATED : August 8, 2017  
INVENTOR(S) : Dornquast et al.

Page 1 of 1

It is certified that error appears in the above-identified patent and that said Letters Patent is hereby corrected as shown below:

In the Claims

In Column 57, Line 12, in Claim 9, delete "systems" and insert --system-- therefor In Column 57, Line 15, in Claim 9, delete "subset:" and insert --subset;-- therefor Signed and Sealed this  
Fifth Day of January, 2021

Andrei Iancu  
*Director of the United States Patent and Trademark Office*